United States Patent [19]

Okuno et al.

[11] Patent Number: 5,455,941
[45] Date of Patent: Oct. 3, 1995

[54] SYSTEM FOR DETECTING IMPROPER REWRITES OF DATA SYSTEM FOR USING SEPARATE READER WRITER PASSWORDS

[75] Inventors: Yasuhiro Okuno, Kawasaki; Tadashi Yamakawa, Yokohama; Masaaki Nagashima, Kawasaki; Takayuki Sasaki; Takahiro Kurosawa, both of Yokohama, all of Japan

[73] Assignee: Canon Kabushiki Kaisha, Tokyo, Japan

[21] Appl. No.: 842,917

[22] Filed: Feb. 27, 1992

[30] Foreign Application Priority Data

| Feb. 27, 1991 | [JP] | Japan | 3-032897 |
| Feb. 27, 1991 | [JP] | Japan | 3-032898 |
| Mar. 15, 1991 | [JP] | Japan | 3-051273 |
| Mar. 15, 1991 | [JP] | Japan | 3-051276 |
| Mar. 15, 1991 | [JP] | Japan | 3-051277 |
| Mar. 15, 1991 | [JP] | Japan | 3-051279 |

[51] Int. Cl.$^6$ .................................................. G06F 17/30
[52] U.S. Cl. .................. 395/600; 380/4; 380/25; 366/DIG. 1; 366/282.1; 366/286.4
[58] Field of Search ........................ 395/600; 380/4, 380/25

[56] References Cited

U.S. PATENT DOCUMENTS

| 3,920,976 | 11/1975 | Christensen et al. | 235/153 AM |
| 4,941,176 | 7/1990 | Matyas et al. | 380/21 |
| 5,018,096 | 5/1991 | Aoyama | 395/575 |
| 5,050,212 | 9/1991 | Dyson | 380/25 |
| 5,121,345 | 6/1992 | Lentz | 364/550 |
| 5,144,659 | 9/1992 | Jones | 350/4 |
| 5,202,982 | 4/1993 | Gramlich et al. | 395/600 |
| 5,224,067 | 6/1993 | Harada | 380/4 |
| 5,237,678 | 8/1993 | Kuechler et al. | 395/600 |
| 5,239,294 | 8/1993 | Flanders et al. | 340/825.34 |
| 5,289,540 | 2/1994 | Jones | 380/4 |
| 5,311,595 | 5/1994 | Bjerrim et al. | 380/25 |

OTHER PUBLICATIONS

Lewis et al., "Shared Books: Collaborative Publication Management for an Office Information System", 1988 Conf. on Office Info. Systems, pp. 197–204.

Almes et al., "The Eden System: A Technical Review", IEEE Transactions on Software Eng., vol. SE–11, (Jan. 1985), pp. 43–59.

Fish et al., "Quilt: A Collaborative Tool for Cooperative Writing", 1988 Conf. on Office Info. Systems, pp. 31–37.

*Primary Examiner*—Thomas G. Black
*Assistant Examiner*—Wayne Amsbury
*Attorney, Agent, or Firm*—Fitzpatrick, Cella, Harper & Scinto

[57] ABSTRACT

In storing data in one file, consisting of a plurality of blocks of data, a first code is generated by converting a password and a predetermined portion of each of the blocks of data. This portion may be, for example, the data block itself or identification information such as a name. The code is stored in correspondence to the stored data. In reading the stored data, a second code is generated by performing the same conversion on the password and the predetermined portion of the stored data. A comparison is made between the generated second code and the first code stored. Failure of the two to match indicates that an improper rewrite has occurred. In such a case, that occurrence may simply be noted, access to the data may be prohibited; more generally, what processing is performed, or is permitted, is varied according to the result of the comparison.

26 Claims, 39 Drawing Sheets

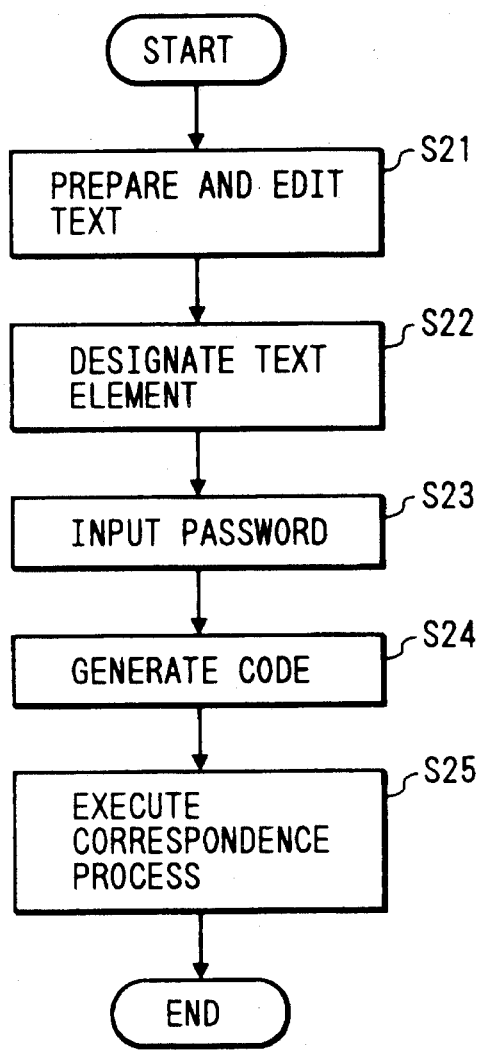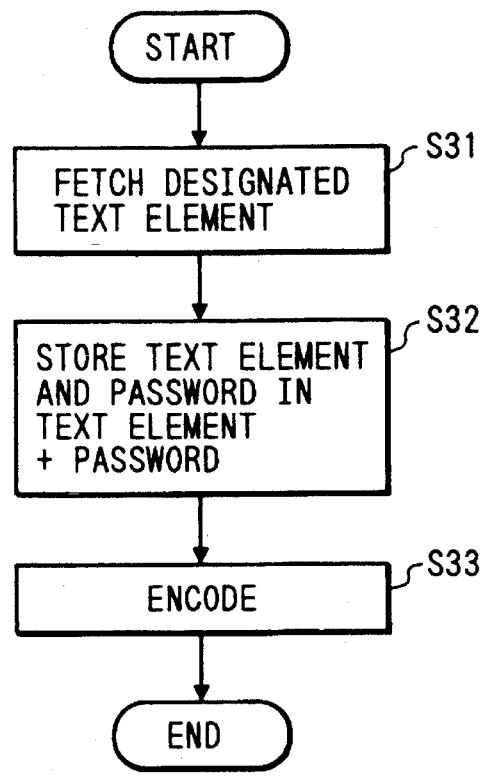

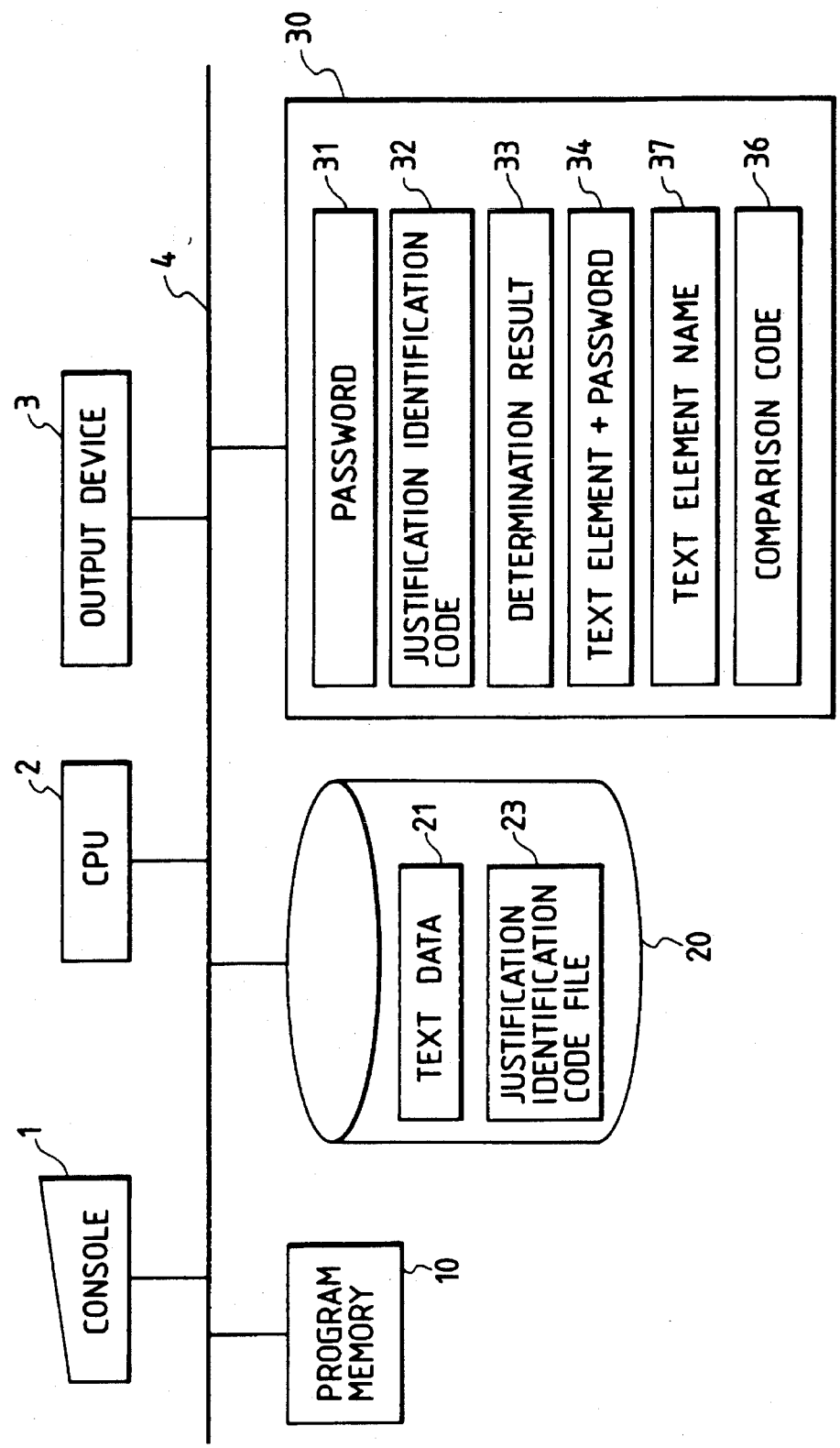

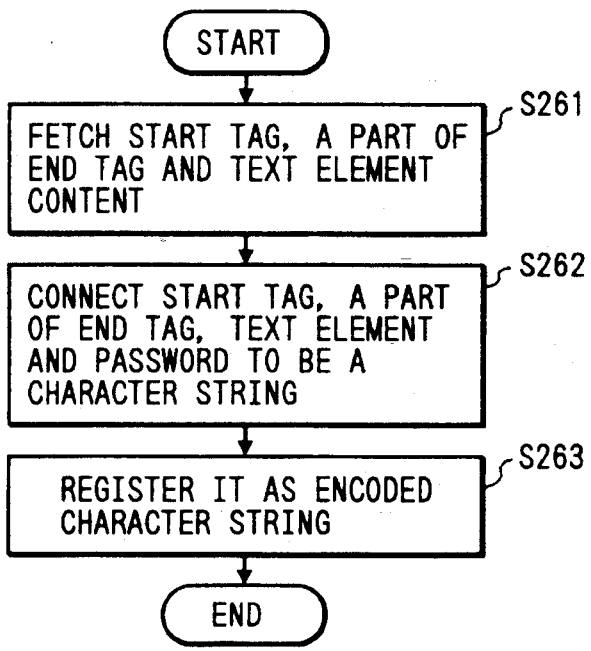
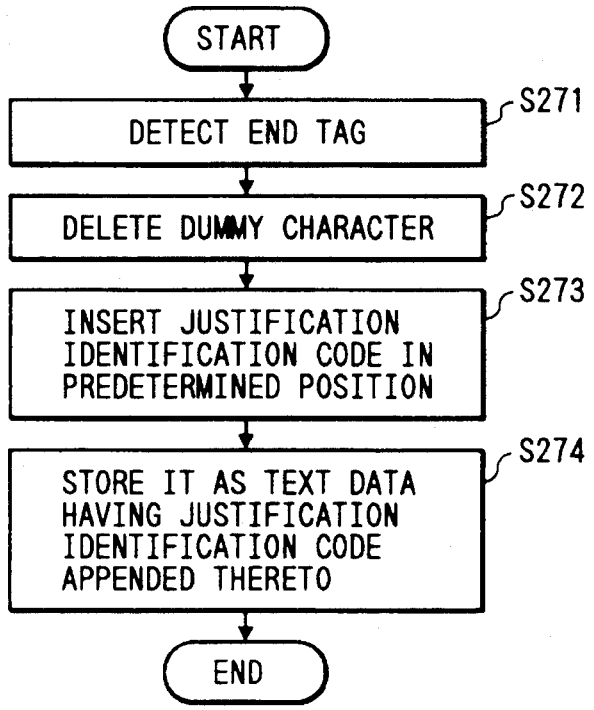

FIG. 30

{
⟨a⟩
A B C D E F G
H I J K L M N
O P Q R S T U
V W X Y Z
⟨/a xxx⟩
⟨b⟩
a b c d e f g
h i j k l m n
o p q r s t u
v w x y z
⟨/b yyy⟩
}

FIG. 32A

⟨a⟩
A B C D E F G
H I J K L M N
O P Q R S T U
V W X Y Z
⟨/a xxx⟩

FIG. 32B

⟨a⟩
A B C D E F G
H I J K L M N
O P Q R S T U
V W X Y Z
⟨/a xxx⟩
⟨b⟩
a b c d e f g
h i j k l m n
o p q r s t u
v w x y z
⟨/b yyy⟩

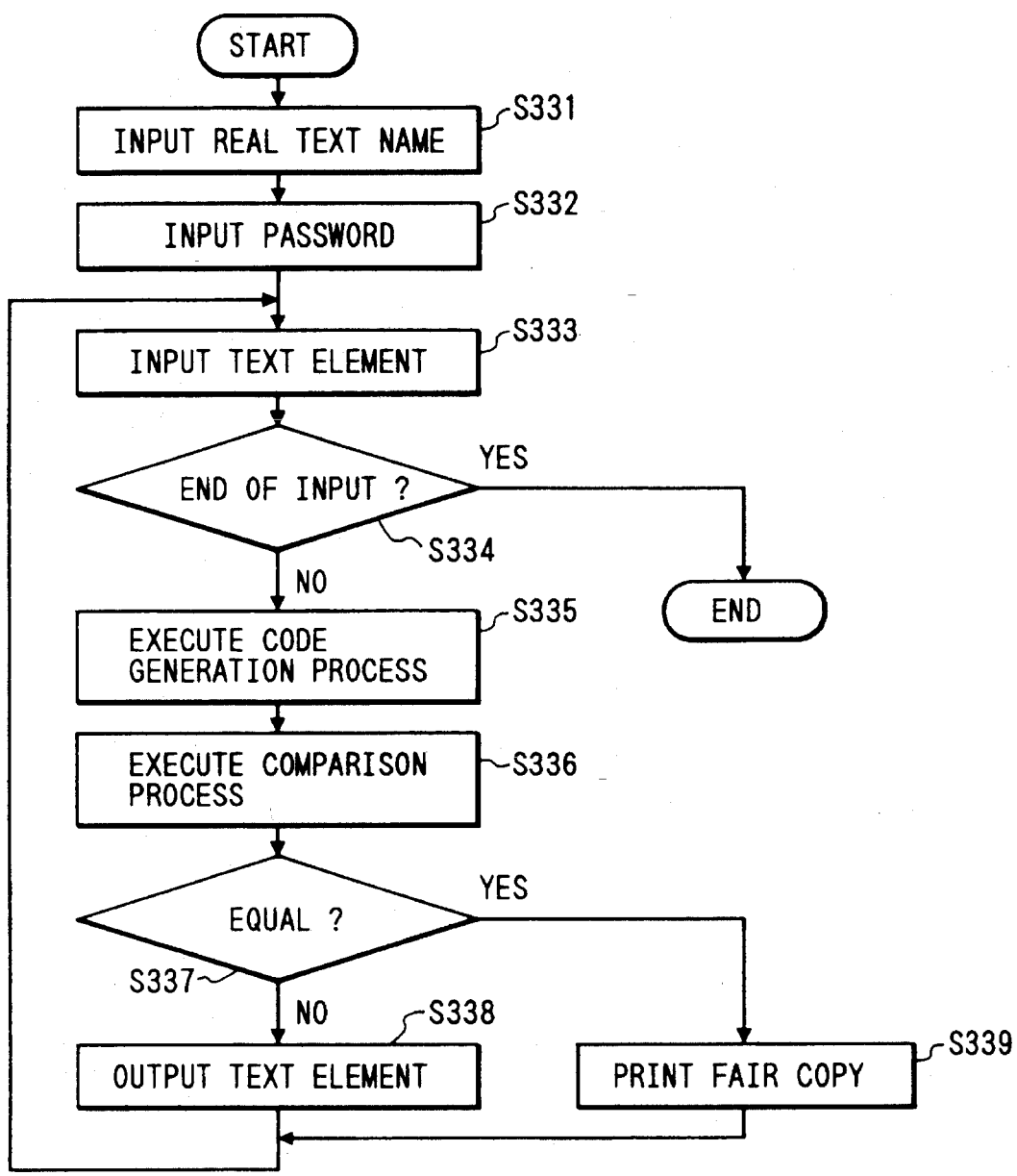

FIG. 34A

```
⟨document⟩
⟨title⟩ A B C ⟨/title⟩
⟨paragraph⟩
A B C D E F G
H I J K L M N
⟨/paragraph⟩
⟨paragraph⟩
O P Q R S T U
V W X Y Z
⟨/paragraph⟩
⟨/document VVV⟩
⟨document⟩
⟨title⟩ a b c ⟨/title⟩
⟨paragraph⟩
a b c d e f g
h i j k l m n
⟨/paragraph⟩
⟨paragraph⟩
o p q r s t u
v w x y z
⟨/paragraph⟩
⟨/document VVV⟩
```

FIG. 34B

```
⟨document⟩
⟨title⟩ A B C ⟨/title⟩
⟨paragraph⟩
A B C D E F G
H I J K L M N
⟨/paragraph⟩
⟨paragraph⟩
O P Q R S T U
V W X Y Z
⟨/paragraph⟩
⟨/document VVV⟩
⟨document⟩
⟨title⟩ a b c ⟨/title⟩
⟨paragraph⟩
a b c d e f g
h i j k l m n
⟨/paragraph⟩
⟨paragraph⟩
o p q r s t u
v w x y z z
⟨/paragraph⟩
⟨/document VVV⟩
```

```
⟨document⟩
⟨title⟩ a b c ⟨/title⟩
⟨paragraph⟩
a b c d e f g
h i j k l m n
⟨/paragraph⟩
⟨paragraph⟩
o p q r s t u
v w x y z z
⟨/paragraph⟩
⟨/document VVV⟩
```

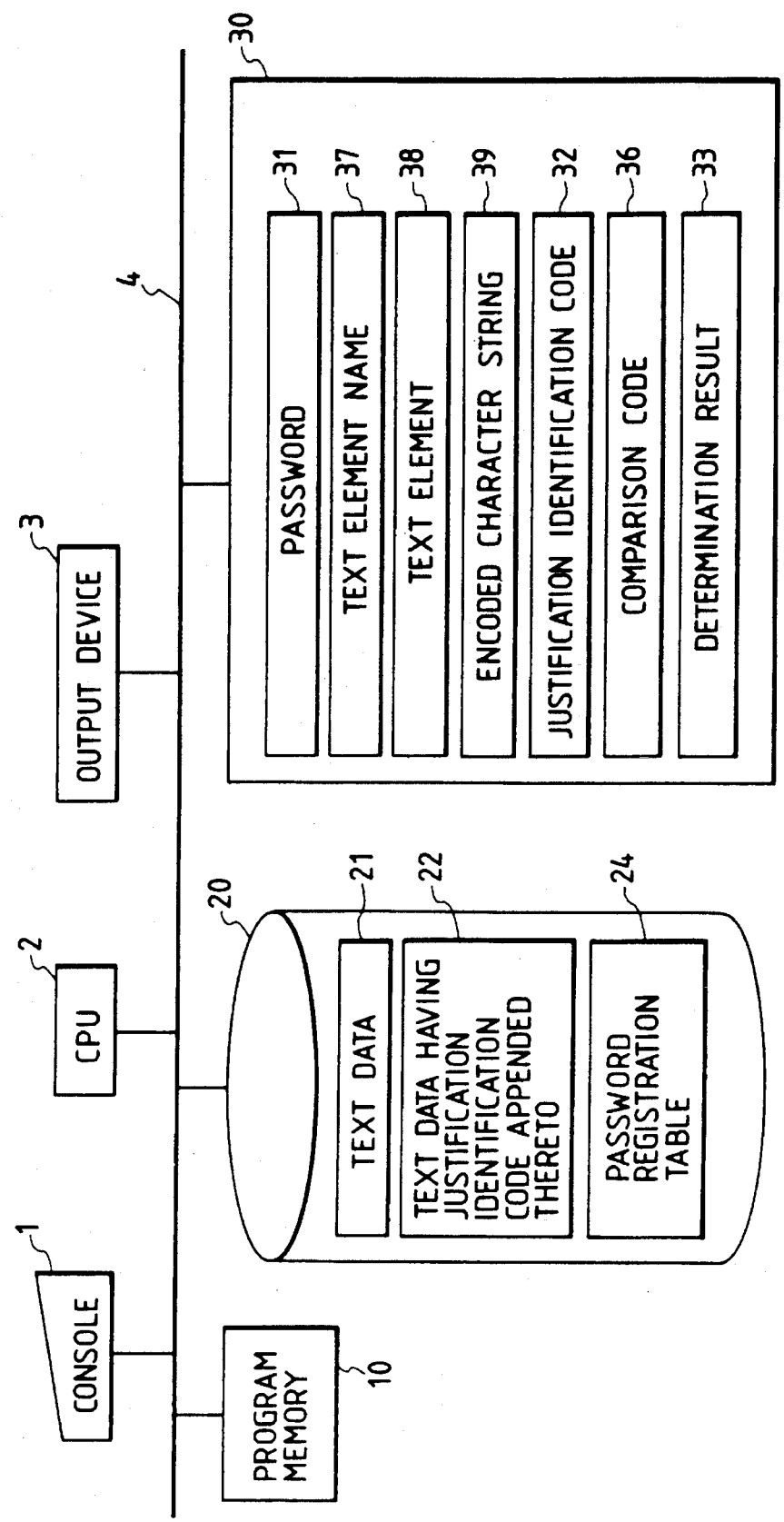

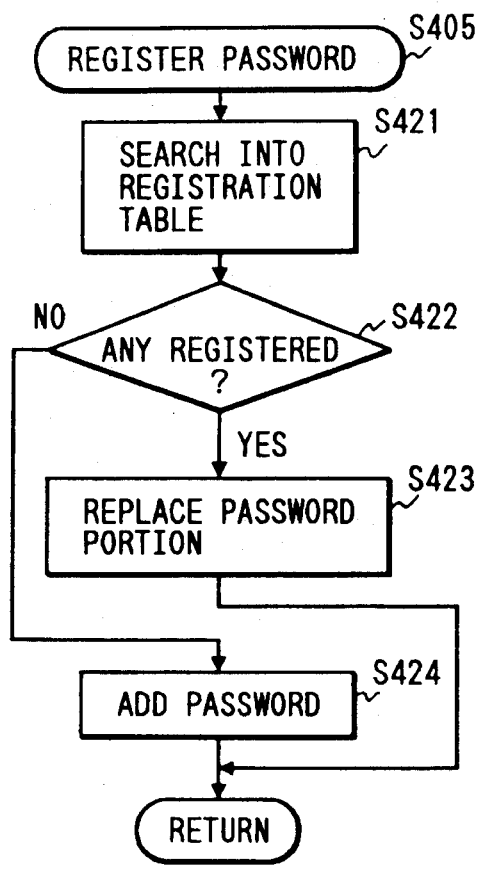
FIG. 42
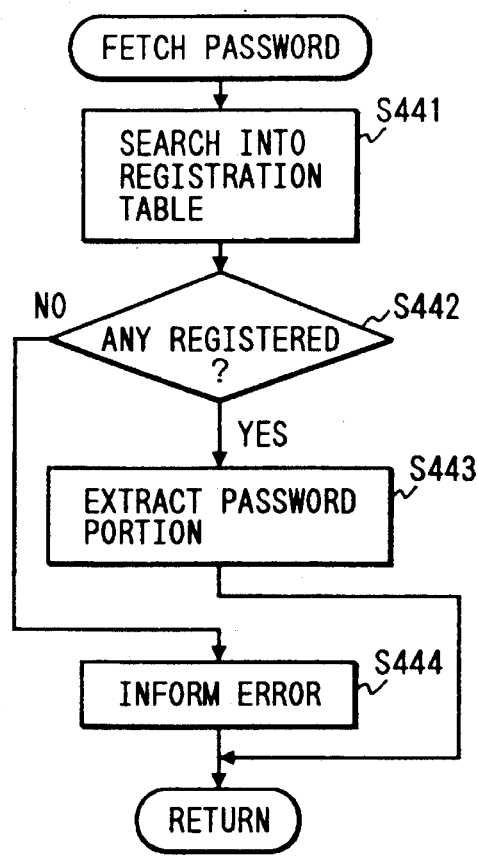
FIG. 44
FIG. 43

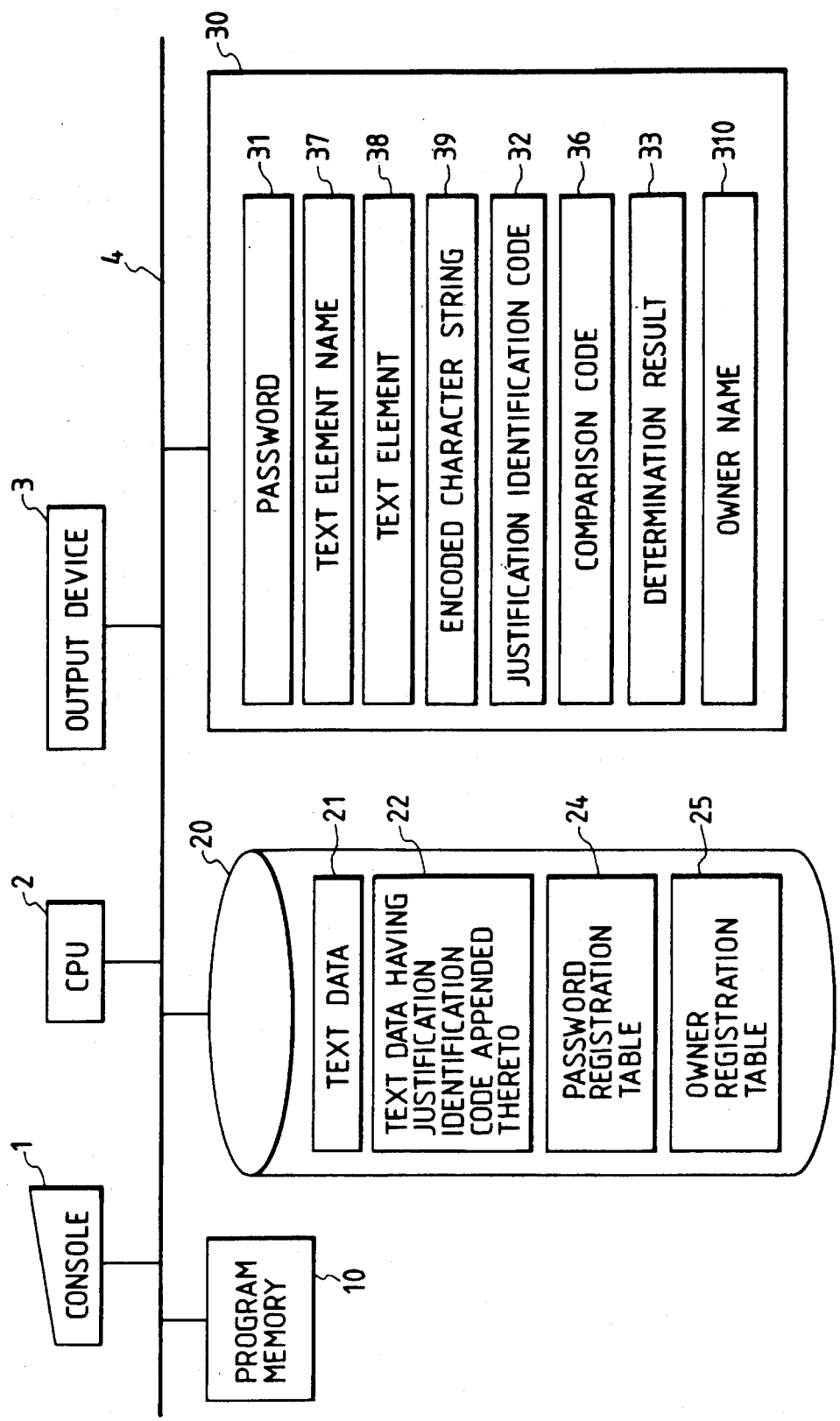

FIG. 48

| OWNER NAME | PASSWORD |
|---|---|
| TOM | ××××× |
| JIM | ○○○○ |
| BOB | △△△△△△△ |
| ⋮ | ⋮ |

| TEXT ELEMENT NAME | OWNER NAME |
|---|---|
| a | JIM |
| b | JIM |
| c | TOM |
| ⋮ | ⋮ |

214

SYSTEM FOR DETECTING IMPROPER REWRITES OF DATA SYSTEM FOR USING SEPARATE READER WRITER PASSWORDS

BACKGROUND OF THE INVENTION

1. Field of the Invention

The present invention relates to a method in a data processing system for creating, registering and managing a document or program, wherein the method includes determining whether or not the content of stored data consisting of a plurality of blocks of data (data elements) is a valid data block which remains as created and stored by the authorized user, for each data element, and detecting that an improper rewrite has been made, if such is the case.

2. Related Background Art

It is conventionally common practice that a document is created on a computer, and stored as a file.

When this document file is used in joint work by a plurality of users, a method has been adopted in which under the operating system, the file is shared among the plurality of users and other users are inhibited from gaining access to the file.

For example, in a UNIX operating system, permission for writing, reference (reading), and execution can be given to the owner of the file, the group involved in the joint work, and other users, for each file.

In such a system, when a certain file is shared within a group, and users outside of the group are inhibited from changing the file, a method is taken in which the users within the group are permitted to write into the file, but those users outside of the group are inhibited from writing, so that the file can be shared only within the group.

When one document is created by a plurality of persons taking over different portions of the work, it is divided into separate files assigned to the respective persons in charge (objects of management), in which each separate file is managed by the respective person in charge, so that others are inhibited from writing in the portion assigned to that person in charge.

However, with the conventional example, permission for writing in or reading a file is only given to the owner of the file, the group and other users. Also, the justification of the document can be assured by inhibiting unauthorized users from writing. Accordingly, since such management can only be performed file by file, there were the following associated problems.

1. When a document file created by each of a plurality of persons is a part of one collective document to be created jointly, the files may not be unified into one file, so that the document cannot be dealt with collectively.

2. It is not possible to meet a requirement of recognizing when a rewrite has occurred, although rewriting by others is permitted.

3. When the rewrite by superuser (a user having all rights for any file) or a false rewrite by a authorized user is made, there is no indication of the alteration.

SUMMARY OF THE INVENTION

An object of the present invention is to provide a method for determining whether or not the content of stored data is a valid data block which remains as created and stored by the authorized user, for each data element, and detecting the fact that the improper rewrite if any has been made for each data element.

Another object of the present invention is to provide a data processing method for determining whether the improper rewrite of processed data has been made, for each data element, and executing the processing by excluding the element which is improperly rewritten.

Another object of the present invention is to make simpler the input operation necessary for the above determination.

Another object of the present invention is to prevent others from rewriting the data element created by each person, when the data in one file is created by a plurality of persons.

According to one aspect, the present invention which achieves these objectives relates to a method for determining whether or not the improper rewrite of stored data in one file consisting of a plurality of partial data has been made, for each partial data, comprising steps of, in storing the data, designating a partial data, inputting a password, generating a first code by converting the input password and the designated partial data in a predetermined procedure, storing the first code in correspondence to the designated partial data, in reading the stored data, designating the partial data, inputting the password, generating a second code by converting the input password and the designated partial data in the predetermined procedure, comparing the generated second code and the first code stored in correspondence to the designated partial data, and determining that the improper rewrite of the designated partial data has been made if the comparison result is unmatched.

According to another aspect, the present invention which achieves these objectives relates in a method for determining whether or not the improper rewrite of stored data has been made, for each partial data, and performing the processing in accordance with the decision result, comprising steps of, in storing each partial data, inputting a password, generating a first code by converting the input password and the stored partial data in a predetermined procedure, storing the first code in correspondence to the partial data, in processing the stored data, inputting the password for each partial data of the data, generating a second code by converting the input password and the corresponding partial data in the predetermined procedure, comparing the generated second code and the first code stored in correspondence to the partial data, and including said partial data in a processing object if the comparison result is equal, or excluding it from the processing object if not equal.

According to another aspect, the present invention which achieves these objectives relates to a method for determining whether or not the improper rewrite of stored data in one file consisting of a plurality of partial data has been made, for each partial data, comprising steps of, in storing the data, designating a partial data, inputting and registering a password, generating a first code by converting the input password and the designated partial data in a predetermined procedure, storing the first code in correspondence to the designated partial data, in reading the stored data, designating the partial data, generating a second code by converting the registered password and the designated partial data in the predetermined procedure, comparing the generated second code and the first code stored in correspondence to the designated partial data, and determining that the improper rewrite of the designated partial data has been made if the comparison result is unequal.

According to another aspect, the present invention which achieves these objectives relates to a method for preventing the improper rewrite of stored data in one file consisting of a plurality of partial data has been made, comprising steps of, in storing each partial data, inputting a password, generating a first code by converting the input password and the identification information for each partial data in a predetermined procedure, storing the first code in correspondence to the designated partial data, in rewriting each stored partial data, designating the partial data, inputting the password, generating a second code by converting the input password and the identification information of designated partial data in the predetermined procedure, comparing the generated second code and the first code stored in correspondence to the designated partial data, and prohibiting the rewrite if the comparison result is unequal.

Other objectives and advantages besides those discussed above shall be apparent to those skilled in the art from the description of a preferred embodiment of the invention which follows. In the description, reference is made to accompanying drawings, 1 which forms a part hereof, and which illustrate an examples of the invention. Such example, however, an not exhaustive of the various embodiments of the invention, and therefore reference is made to the claims which follow the description for determining the scope of the invention.

BRIEF DESCRIPTION OF THE DRAWINGS

FIG. 2 is a flowchart for a document creating and registering process.

FIG. 3 is a flowchart for a code generating process.

FIG. 11 is a system configuration diagram in the third example.

FIG. 26 is a flowchart for an encoded character string generation process in the sixth example.

FIG. 27 is a flowchart for a correspondence process in the sixth example.

FIG. 30 exemplifies the document data in the seventh example.

FIGS. 32A and 32B exemplify the output of document data in the seventh example.

FIG. 33 is a flowchart for a justification identification process in the eighth example.

FIGS. 34A and 34B further exemplify a document data including the justification identification code and a partially changed document data.

FIG. 35 exemplifies the fair copy print result for a valid document element.

FIG. 36 exemplifies the display of an invalid document element.

FIG. 37 is a system configuration diagram in the ninth example.

FIG. 42 is a flowchart for a password registration process in the ninth example.

FIG. 43 exemplifies a password registration table in the ninth example.

FIG. 44 is a flowchart for a password extraction process in the ninth example.

FIG. 45 is a system configuration diagram in the tenth example.

FIG. 48 exemplifies the password registration table in the tenth example.

FIG. 49 exemplifies an owner registration table in the tenth example.

DESCRIPTION OF THE PREFERRED EMBODIMENTS

First example

An example of the present invention will be described with reference to the drawings.

Here, it is supposed that the document data stored in one file consists of two document elements.

Here, the "valid" document means that the content of the document element is not changed from that at the registration. Accordingly, the document is valid if it is restored even once changed.

Figure 1:
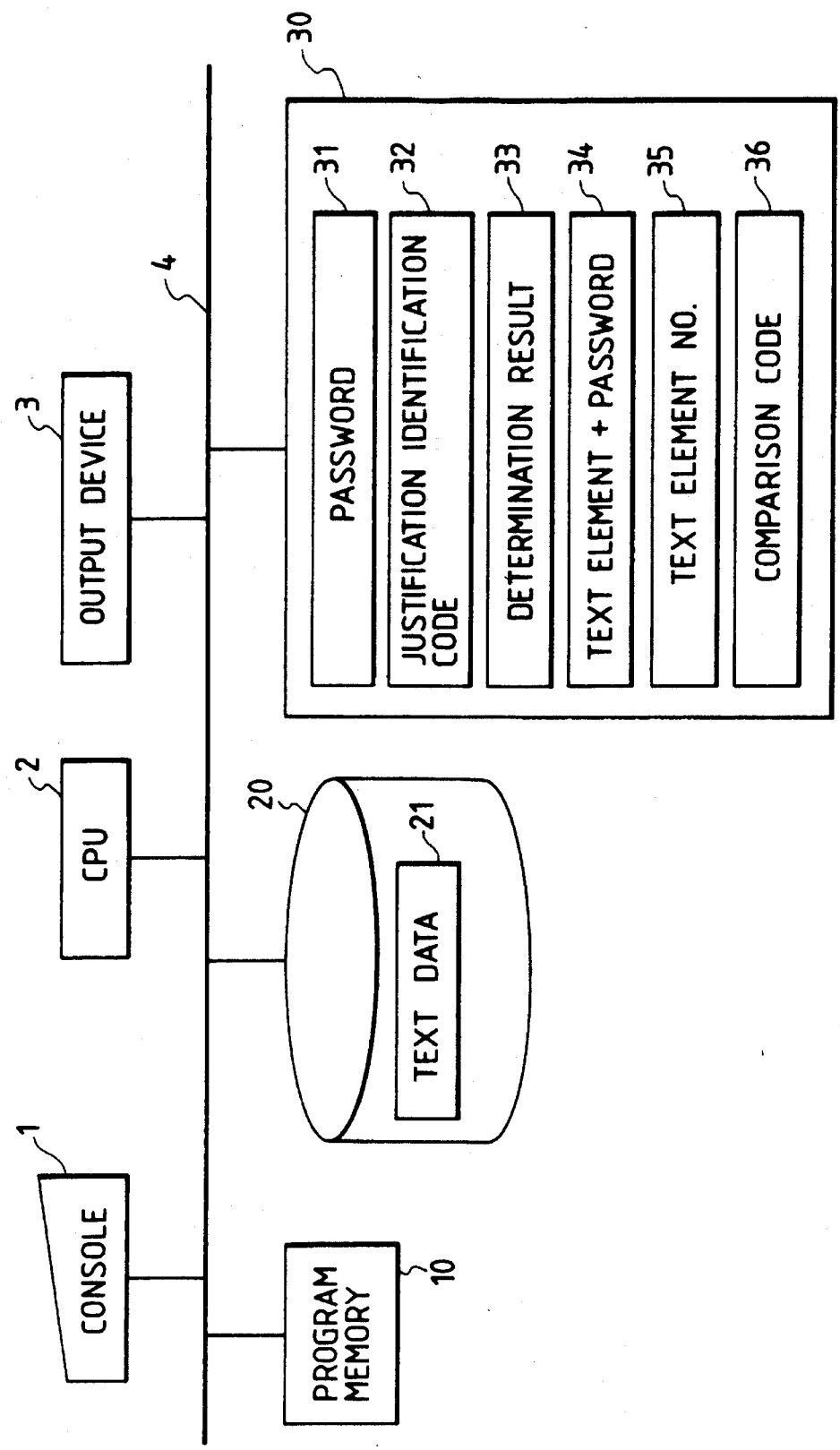
FIG. 1 is a system configuration diagram in the first example.

FIG. 1 is a diagram showing a system configuration of this example.

1 is a console having a device for the input to a computer (e.g., keyboard) and a device for the display of a response from the computer (e.g., CRT).

2 is a CPU for controlling each device via a bus 4 and executing various processes with processing programs stored in a program memory 10, and 3 is an output device for the print-out or the display on to a screen.

10 is a program memory composed of ROM or the like for storing various processing procedures, including processing procedures corresponding to the flowcharts of FIGS. 2 to 4, and 20 is a data memory such as FD or HD for storing a document data 21 or a justification identification code file 23 as thereinafter described in the file format. 30 is a main memory composed of RAM or the like, in which an input password 31, an justfication identification code 32 as thereinafter described, a determination result 33, document element +password 34, a document element number 35, and a comparison code 35 are stored, and comprising various work areas for use in editing the document. Note that it is unnecessary for these memories 10, 20, 30 to be separate.

Note that in the above and below, the content of data and the area on the memory for storing its data are not distinguished by identification or reference number, unless particularly troubled.

Next, the processing flow of this example will be described. The processing is largely divided into two parts, creating and registering the document, and identifying the justification for the content.

FIG. 2 is a flowchart showing the flow of a document creating and registering process.

First, at step S21, the document creator creates and edits a document using the console 1, and stores it into the document data 21 as a file. This is generally performed with a document creating/editing device called an editor.

In this case, a text punctuation symbol for separating the document for each element is appended to the document. This is accomplished by, for example, starting the line head of the next line with the punctuation symbol (here, <*code*>), after each document element. For example, this is shown in FIGS. 7A and 7B.

If the character string of <*code*> is used as the content of the text, rather than the text punctuation symbol, care must be taken so that the character string of <*code*> is not at the line head.

Figure 7A:
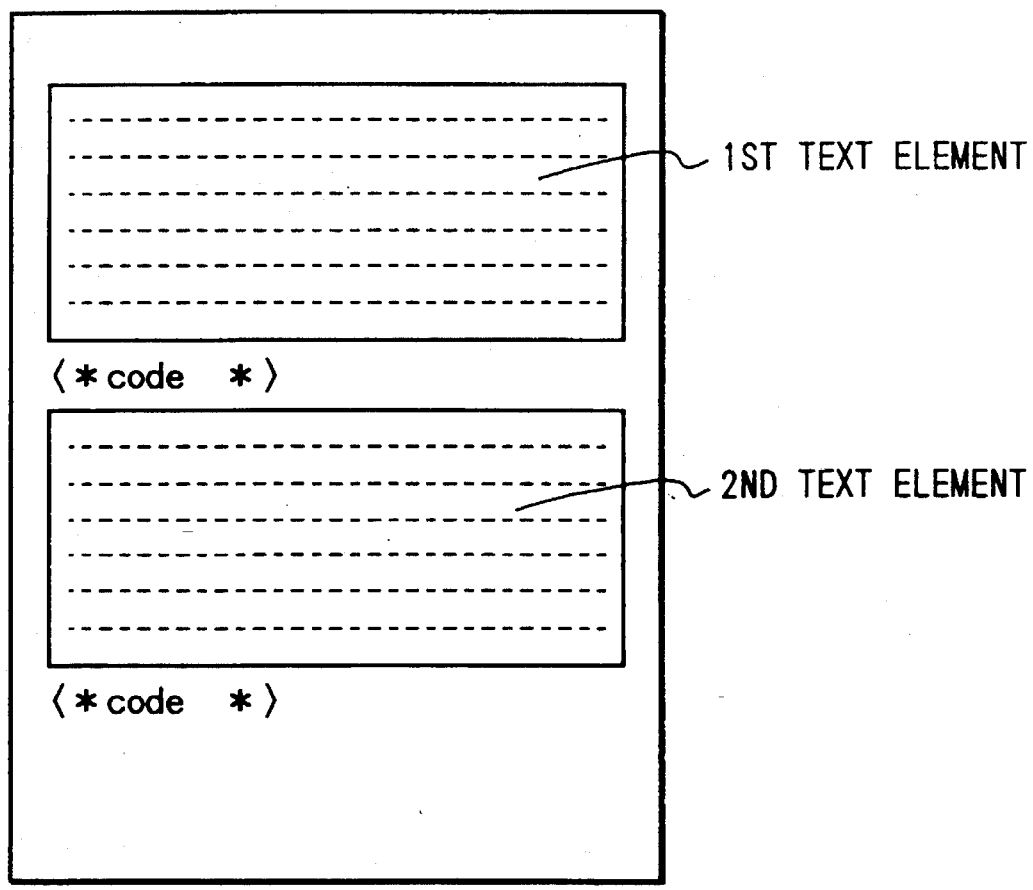
FIGS. 7A and 7B exemplify the document data and the justification identification code in the first example.
Figure 7B:
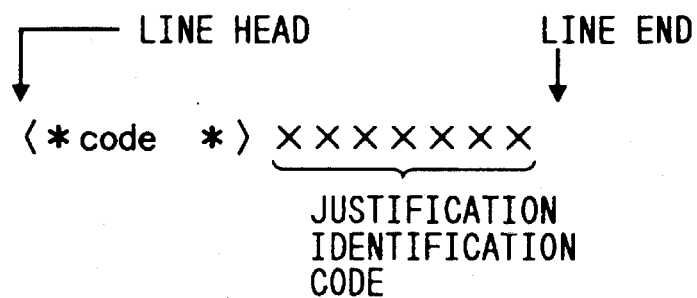

The document, when first created (the registration process is not yet terminated), is as shown in FIGS. 7A and 7B. On the contrary, if the registration process is terminated, a justification identification code for identifying the text element is appended immediately after the text punctuation symbol. That is the line starting with <*code*> and only having the justification identification code thereafter (FIG. 7B).

At step S22, the text element to be registered is designated. Here, the text element is designated in terms of the number. For example, if the first text element is designated, 1 is input, and stored in the text element number 35.

Next, at step S23, a password of the document creator is obtained. Here, the document creator is requested to input the password through the console 1, and the password input therethrough is stored in the password 31 in the memory 30.

At step S24, the justification identification code is generated from the content of text element and the character string of the password. The password and the content of text element may be only the byte sequence, rather than the character string.

This code generating process will be described in connection with the flowchart of FIG. 3.

First, at step S31, the designated text element is fetched from the text (the text punctuation symbol is not included at this time). In this fetch process for the text element, supposing the designated text element number to be N, the text ranging from the next line of the N−1-th text punctuation symbol (or from the beginning of the text if N−1 is zero) to the immediately previous line of the N-th text punctuation symbol is fetched.

At step S32, the content of the text element fetched from the text data 21 and the password 31 are stored as text element +password 34 which is a series of character string into the main memory 30.

At step S33, the text element+password 34 is encoded to generate the justification identification code.

This encoding process can be implemented with the same algorithm as in the encoding of the password in unix, for example. This is to convert a character string into another character string with a method virtually not allowing the inverse conversion.

If this process only accepts the fixed-length character string (e.g., eight bytes), and the text element+password contains a character string exceeding that fixed-length, that character string needs to be made the fixed-length in the following way.

First, the text element +password is separated into each eight bytes. Next, the exclusive OR (EX-OR) thereof is taken sequentially. (The EX-OR of the first eight bytes and the next eight bytes is taken, and then the EX-OR of its result and the next eight bytes is taken. The following is continued in the same way.) If the remainder separated lastly is less than eight bytes, a measure for fill up the deficient bytes with blanks, for example, is taken.

With such a measure, the eight byte code can be eventually obtained. This is converted into a printable character code. In doing do, the inappropriate code (e.g., a line feed code, blank character, <, >) is appropriately converted.

Encoding this character code allows an encoded character string specific to the text element to be obtained. Note that with this encoding, the input or output data is not limited to the character string, but may be only a byte sequence.

The code generated therein is called a justification identification code, and stored as the justification identification code 32 in the memory 30. At this time, the justification identification code may be displayed on the console 1. With the above operation, the code generating process is completed.

Next, at step S25, a correspondence process of the designated text element to the justification identification code thereof is performed.

In this example, the justification identification code is appended after the punctuation symbol of the text element to be registered, as previously described.

Figure 4:
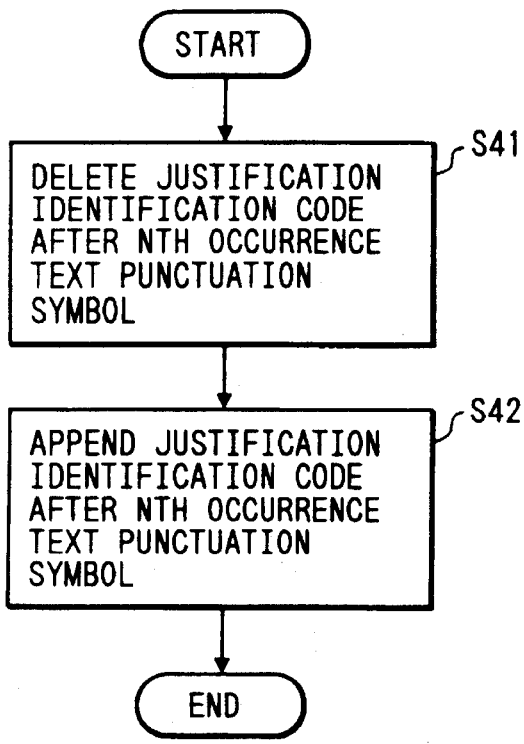
FIG. 4 is a flowchart for a correspondence process in the first example.

This code appending process will be described with reference to FIG. 4.

First, at step S41, the previous justification identification code appended after the text punctuation symbol following the text element designated by the text element number 35 in the text data 21 is deleted. If no justification identification code exists (e.g., when the text is newly registered), no action is taken.

At step S42, the justification identification code 34 is appended after the text punctuation symbol following the designated text element.

Thus, the text element and the justification identification code thereof are stored in the text data 21 in the mutually correspondent form. The above operation is the text creating/registering process.

Subsequently, the process for confirming whether or not a certain test element is the text thus registered is valid will be described in connection with FIG. 5.

It is assumed that the file of the text data 21 (the text data has justification identification code appended for each text element) is already stored in the memory 20.

Fitst, at step S51, the file name is specified from the console 1, and the text element of interest is designated with the text element number. The designated text element number is stored as the text element number 35.

Next, at step S52, the password is input from the console 1 and stored as the password 31 in the memory 30.

Next, at step S53, the justification identification code is generated from the content of the text element of interest and the password 31 input herein in the same way as at step S33, and stored as the justification identification code 32 in the memory 30. (This code is newly generated, and is different from the justification identification code generated in the text creating and registering process.)

Next, at step S54, the comparison between the content (character string) of the justification identification code corresponding to the designated text data and the content (character string) of the justification identification code 32 generated herein is made. This process will be described with reference to FIG. 6.

First, at step S61, the justification identification code corresponding to the designated text element is fetched, and stored in the comparison code 36. This can be accomplished by picking up the whole line immediately after the text punctuation symbol following the text element designated by the text element number 35.

At step S62, the character string comparison is executed to determine whether or not the justification identification code 32 and the content of the comparison code 36 are equal, and "yes" if equal or "no" if not is stored in the decision result 33. (Of course, other indication may be used instead of "yes" and "no".) Thus, the comparison process at step S54 has been described.

Next, at step S55, the content of the decision result 33 is output as the result of this process.

For example, the character string of "yes" or "no" is displayed on an output device 3 or a screen of the console 1. Also, this result may be used as an input into a certain process.

Thus, the justification identification process is completed. With the above-described operation, it is possible to create and register the text in the form of allowing for the justification identification (no alteration in the content) for each text element, and confirm whether or not each text element is valid.

Second example

A second example of the present invention will be described.

In the first example, the justification identification code corresponding to the text element was appended after a specific character string defined as the text punctuation symbol, while this example is characterized in that the text punctuation symbol has ID (name) attached, and the justification identification code is inserted into the text punctuation symbol.

Figure 8:
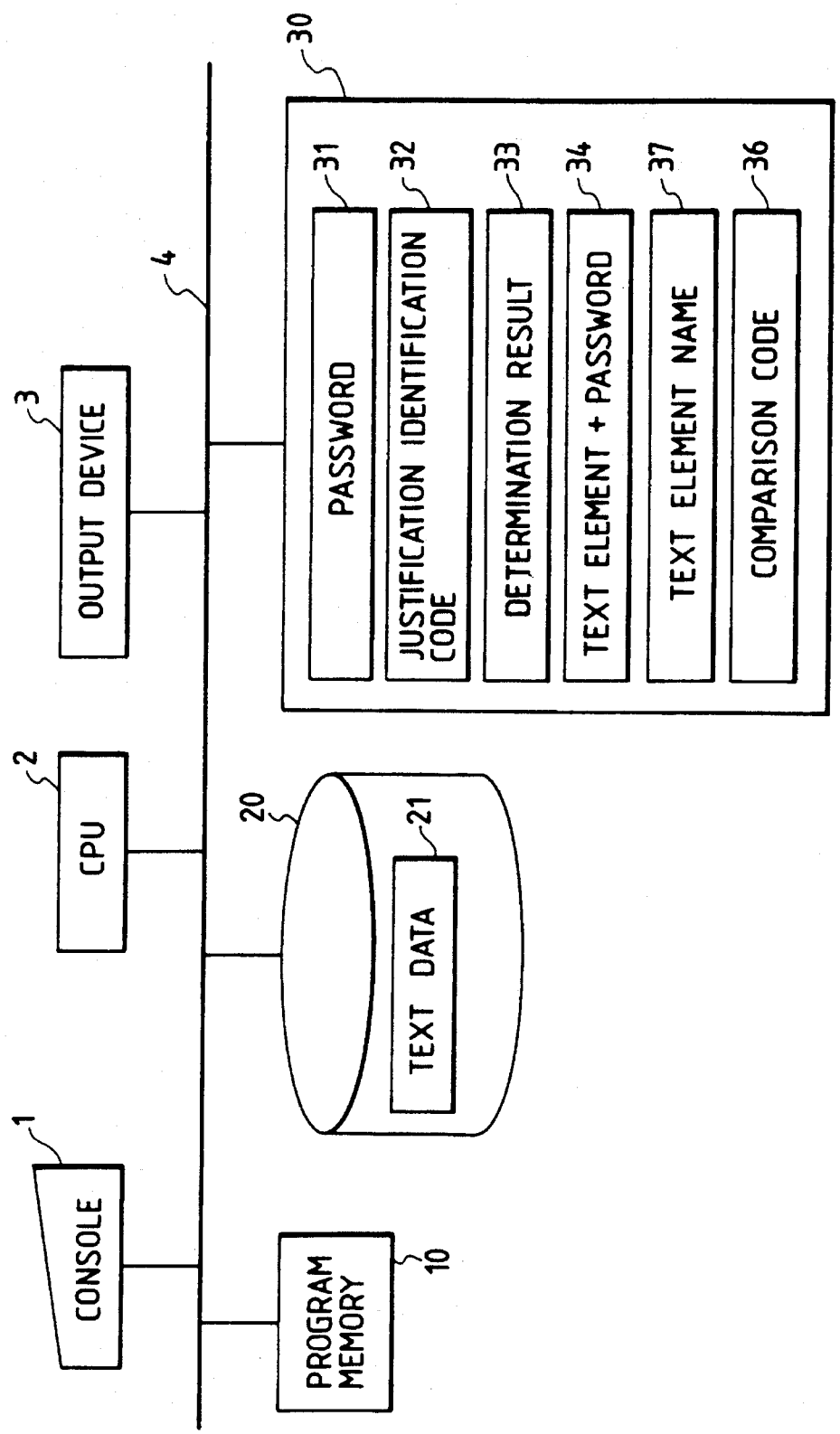
FIG. 8 is a system configuration diagram in the second example.

FIG. 8 is a diagram showing the system configuration in the second example.

Figure 10:
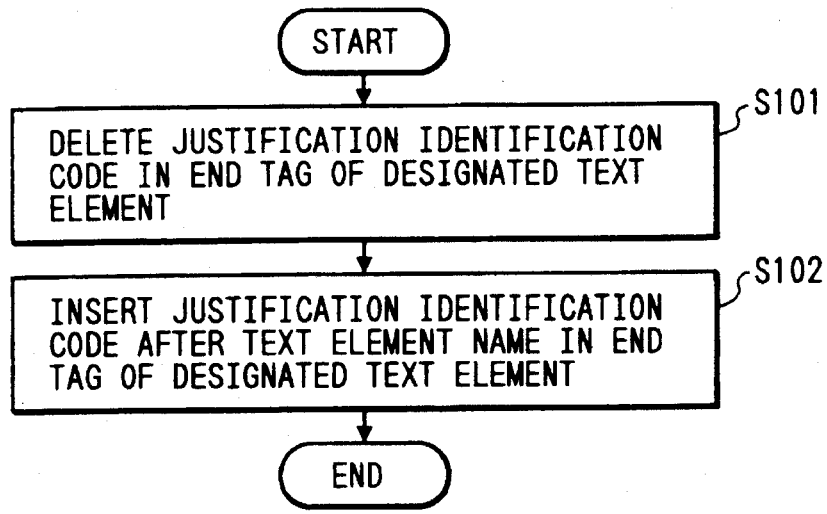
FIG. 10 is a flowchart for the correspondence process in the second example.

The hardware constitution is not changed from that of FIG. 1, but the content of the memory is different in part. Specifically, the program memory 10 stores a processing procedure as shown in FIG. 10, instead of that of FIG. 4, and the details of other procedures may be different. The main memory 30 has the text element name 37, instead of the text element number 35 of FIG. 1.

The processing flow of this example is also divided into two sections of a document creating/registering process and a justification identification process.

The processing flow of the document creating/registering process will be described in connection with FIG. 2, like the first example. The detail of each step is different from the previous example.

Figure 9A:
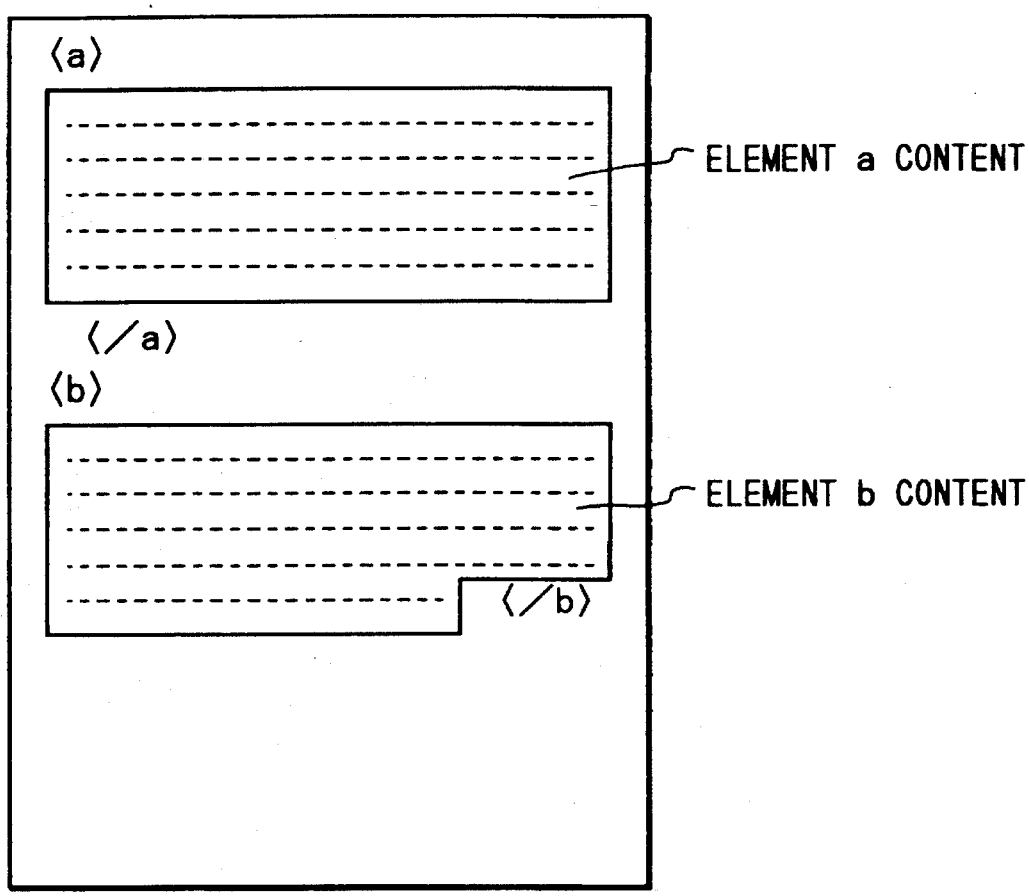
FIGS. 9A and 9B exemplify the document data and the justification identification code in the second example.

First, at step S21, the text data is created and edited. In doing this, each text element is enclosed by a certain punctuation symbol. For example, it is stored as the text data 21 in the file, as shown in FIG. 9A.

In FIG. 9, <a> is a text punctuation symbol indicating the beginning of the text element a, and called a start tag. </a> is a text punctuation symbol indicating the end of the text element a, and called an end tag. Note that a is a text element name. Therefore, it is inhibited to use the characters "<" and ">" in the text for the purpose of other than the text punctuation symbol.

Figure 9B:
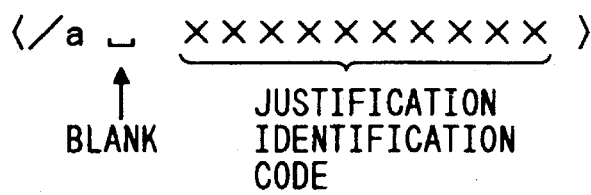

In the registration, the justification identification code is placed in the end tag after the text element name and one blank, as shown in FIG. 9B. When the text is first created (before registration), the text element name is only written in the end tag, as shown in FIG. 9A.

At step S22, the text element to be registered is designated with the text element name. For example, if the text element having the text element name of a is registered, it is designated as a. This is stored in the text element name 37.

At step S23, the password of the text creator is obtained, and stored in the password 31 of the memory 30, like the first example.

At step S24, the code generation process is executed with the encoding. The flow of the code generation process will be described in connection with FIG. 3.

First, at step S31, the content of the designated text element is fetched.

In this case, if the designated text element name is a, the content of the text element is correspondingly defined as from immediately after the symbol of <a> indicating the beginning of the text element to immediately before the symbol of </a> (or the end tag including the justification identification code).

The flow from step S32 and step S33 is the same as in the first example, and thus the code generation process is completed.

Subsequently, at step S25, the correspondence process is executed. This process will be described in connection with FIG. 10. In this example, the justification identification code is added to the end tag (i.e., the symbol indicating the end of the text element).

First, at step S101, if the justification identification code exists after the text element name in the end tag of the text element having the element name stored in the text element name 37, it is deleted, together with the blank separating the text element name and the justification identification code.

Next, at step S102, the justification identification code 32 is inserted after the text element name and one blank in the end tag of the designated text element, and stored in the text data 1. Thus, the correspondence process at step S25 is completed. The above operation is the text creating and registering process.

Next, the justification identification process will be described briefly, mainly about the points of difference from the first example, with reference to FIG. 5. Here, the file of the text data 21 (having the justification identification code of the text element appended to the end tag) is already stored in the memory 20.

First, at step S51, the file name of interest is designated from the console 1, and further the text element to be confirmed is designated with the text element name, and stored in the text element name 37.

At step S52, the password in input, and stored as the password 31 in the memory 30.

At step S53, the code is generated, and stored in the justification identification code 32 of the memory 30. This is performed in the same way as the code generation at the registration.

At step S54, the comparison is made between the content (character string) of the justification identification code corresponding to the designated text element and the content (character string) of the justification identification code 32 generated at step S53.

Figure 6:
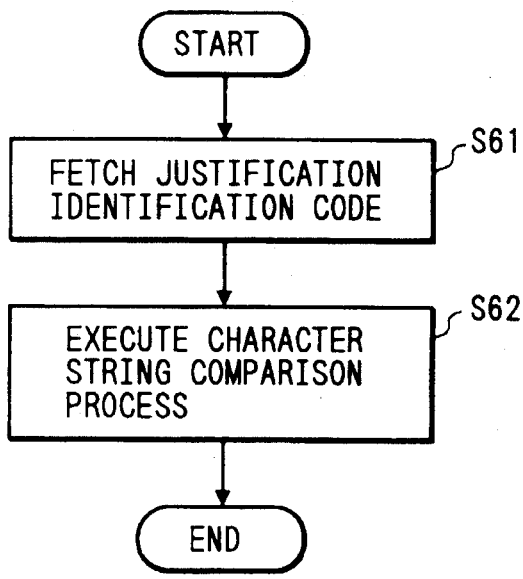
FIG. 6 is a flowchart for a justification identification process.

This processing will be described with reference to FIG. 6. First, at step S61, the justification identification code corresponding to the designated text element is fetched, and stored in the comparison code 36. Here, the character string from immediately after the blank following the text element name to immediately before the end tag termination symbol (>) in the end tag of the text element name designated in the text element name 37 needs to be picked up.

At step S62, a determination is made whether or not the justification identification code 32 and the content of the comparison code 36 are equal, and the result is stored in the decision result 33. Thus, the comparison process at step S54 is completed.

At step S55, the content of the decision result 33 is output, and thus the justification identification process is completed.

Note that in the above example, the justification identification code is described in the end tag, but can be described in the start tag with the same effect.

Third example

In the first and second example, the correspondence method of the text element to the justification identification code was that the text justification identification code was inserted after or in the text element punctuation symbol of the text data. This example is characterized in that the text justification identification code is stored in an external file in the form of corresponding to the text element punctuation code.

FIG. 11 is a diagram showing the system configuration of this example. The hardware configuration is not different from that as shown FIGS. 1 and 8, but the content of the memory is different in part. Specifically, the program memory 10 contains the processing procedures as shown in FIG. 2, FIGS. 5, 6 and FIG. 13, and the main memory 30 is the same as in FIG. 8, but the data memory 20 has a justification identification code file 23. The processing flow of this example is also divided into two sections of a document creating/registering process and a justification identification process.

The processing flow of the document creating/registering process will be described in connection with FIG. 2.

Figure 17:
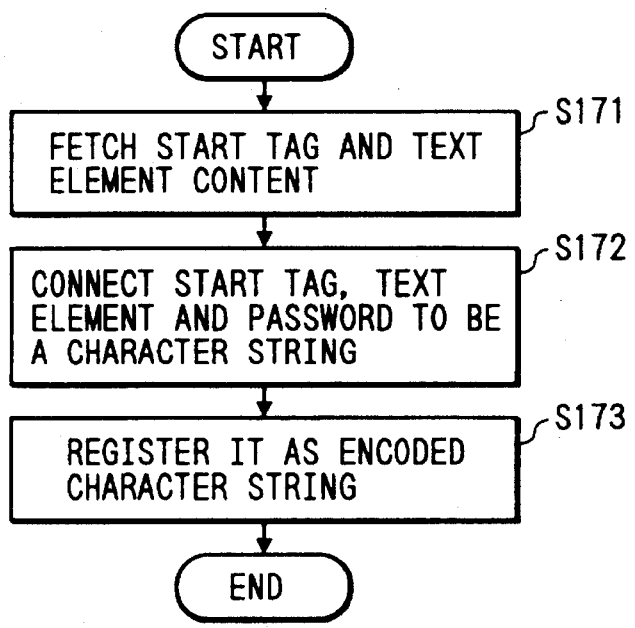
FIG. 17 is a flowchart for an encoded character string generation process in the fourth example.

First, at step S21, the text creator creates and edits the text from the console 1, and stored as a file in the data file 21, for example, as shown in FIG. 17A. In FIG. 17, a is a text element name, <a> is a start tag for the text element a, and </a> is an end tag for the text element a, like the second example. Hence, also in this case, it is inhibited to use the characters of "<" and ">" in the text for the purpose of other than the text punctuation symbol.

Figure 13:
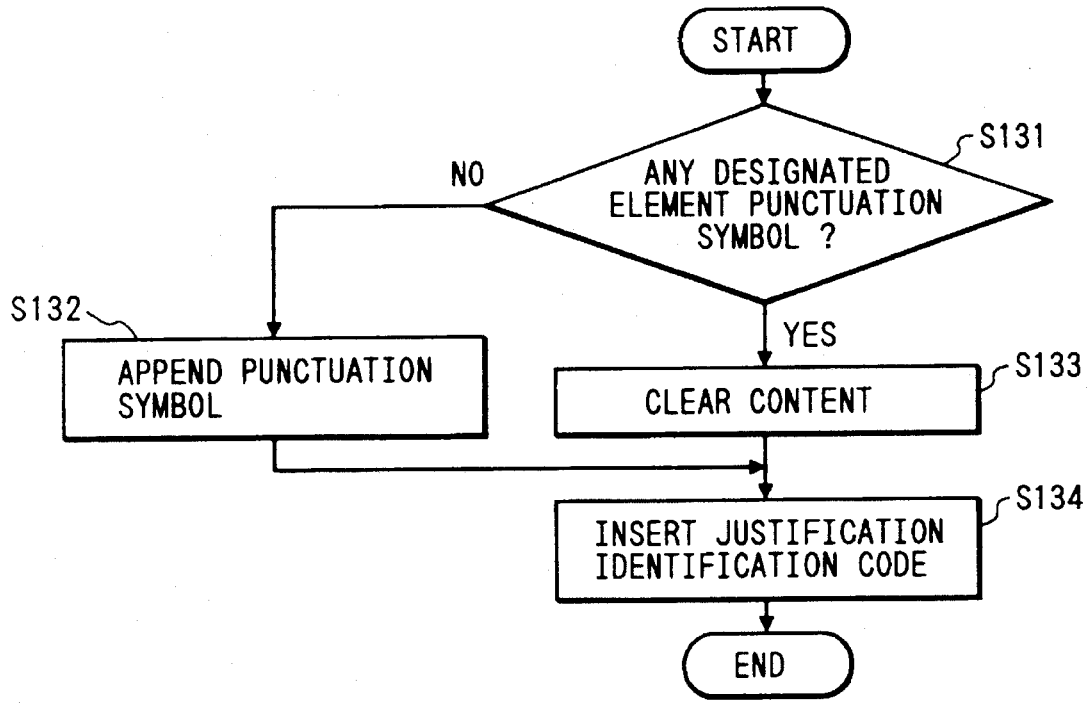
FIG. 13 is a flowchart for the correspondence process in the third example.

The correspondence process at step S55 will be described with reference to FIG. 13.

Figure 12A:
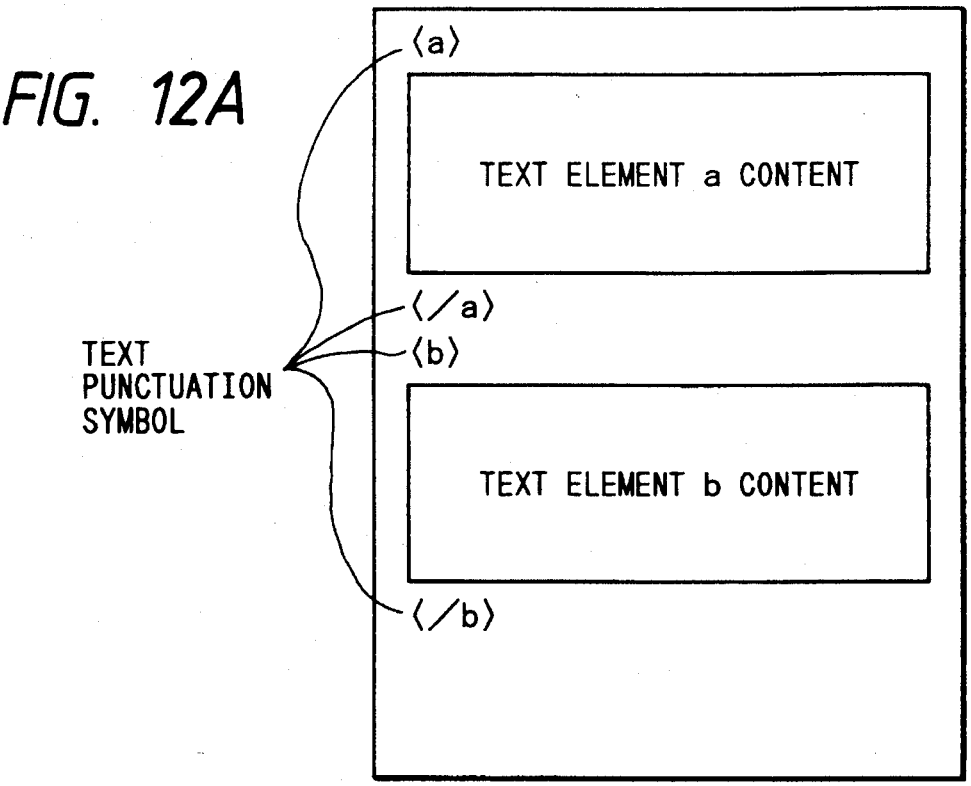
FIGS. 12A and 12B exemplify the document data and the justification identification code file in the third example.
Figure 12B:
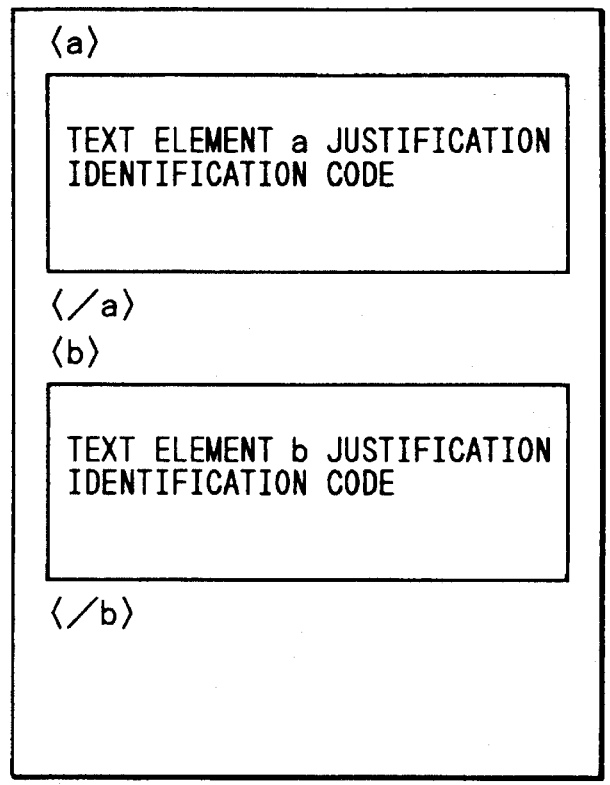

In this example, the justification identification code is stored in the file having a file name of the same name as the text data file followed by a predetermined expander in the memory 20, in the form as shown in FIG. 12B. That is, if the created text is a file having the name of "text", the justification identification code is stored with the file name of "text code", for example. This file is called as the justification identification code file. In this file, like the text data 21, the justification identification code is separated by the punctuation symbol which is the text element name enclosed by "<" and ">".

First, at step S131, a determination is made whether or not there is any text punctuation symbol file corresponding to the designated text element name in the justification identification file 23.

If there is not, at step S132, the punctuation symbol (both start tag and end tag) corresponding to the designated text element name is appended to the tail of the justification identification code file 23. If there is any file, at step S133, the justification identification code corresponding to the text element name is deleted. That is, if the text element of a is designated, the area from immediately after the symbol of <a> to immediately before the symbol of </a> is deleted.

At step S134, the justification identification code 32 is inserted after the punctuation symbol (start tag) indicating the designated text element in the justification identification file 23. Thus, the justification identification code corresponding to the text element is stored in the justification identification code file 23. The above operation is the text creating and registering process.

In the following, the process for identifying the justification of the text thus registered will be described with reference to FIG. 5. It is supposed that the text data 21 file and the corresponding justification identification code file 23 are already stored in the memory.

The steps S51 to S53 are the same as in the second example.

The comparison process at step S54 will be described with reference to FIG. 6.

First, at step S61, the justification identification code corresponding to the designated text element is fetched from the justification identification code file, and stored in the comparison code 36. Here, the character string from immediately after the start tag of the text element name designated with the text element name 37 to immediately before the end tag needs to be fetched.

At step S62, a determination is made whether or not the justification identification code 32 and the comparison code 36 are equal, and the result is stored in the decision result 33. Thus, the comparison process is completed.

Then, at step S55, the content of the decision result 33 is output, like the first and second examples. Thus, the justification identification process is completed. In the described examples, the text punctuation symbol consisting of a specifically defined character string was used as the way of separating the text, but instead, the text element may be separated in terms of the length of the text element.

This is the form in which there are areas at the beginning of each text-element for representing the identifier of text element, the attribute, and the length of text element (which can be indicated by the number of bytes), followed by the content of the text element. At this time, the justification identification code may be stored in the area for the identifier of the text element, the area for the attribute, and the area for the content, or a separately reserved area.

With the present invention, there is the effect that the text file can be judged for each text element as to whether the content of the text has been rewritten, as above described. Accordingly, as compared with the conventional method of dividing the file into each text element and managing each part of the text, one file is dealt with by a plurality of users, and each part of the text can be confirmed as to whether or not it is updated, while being updated in succession.

Fourth example

In the previously-described examples, the justification for the content of the text element is only determined, because the code is generated from the content of the text element and the password input from the user. Hence, there is a problem that when the content of the text element is the same but the name or attribute of the text element is changed, for example, the decision for the justification of the text element including that changed portion can not be made.

According to the present invention, it is possible to decide whether or not the text element is changed, including the punctuation information, by the comparison between the stored code generated from the text element including the punctuation information and the password and the code generated from the current text element including the punctuation symbol and the password.

Figure 14:
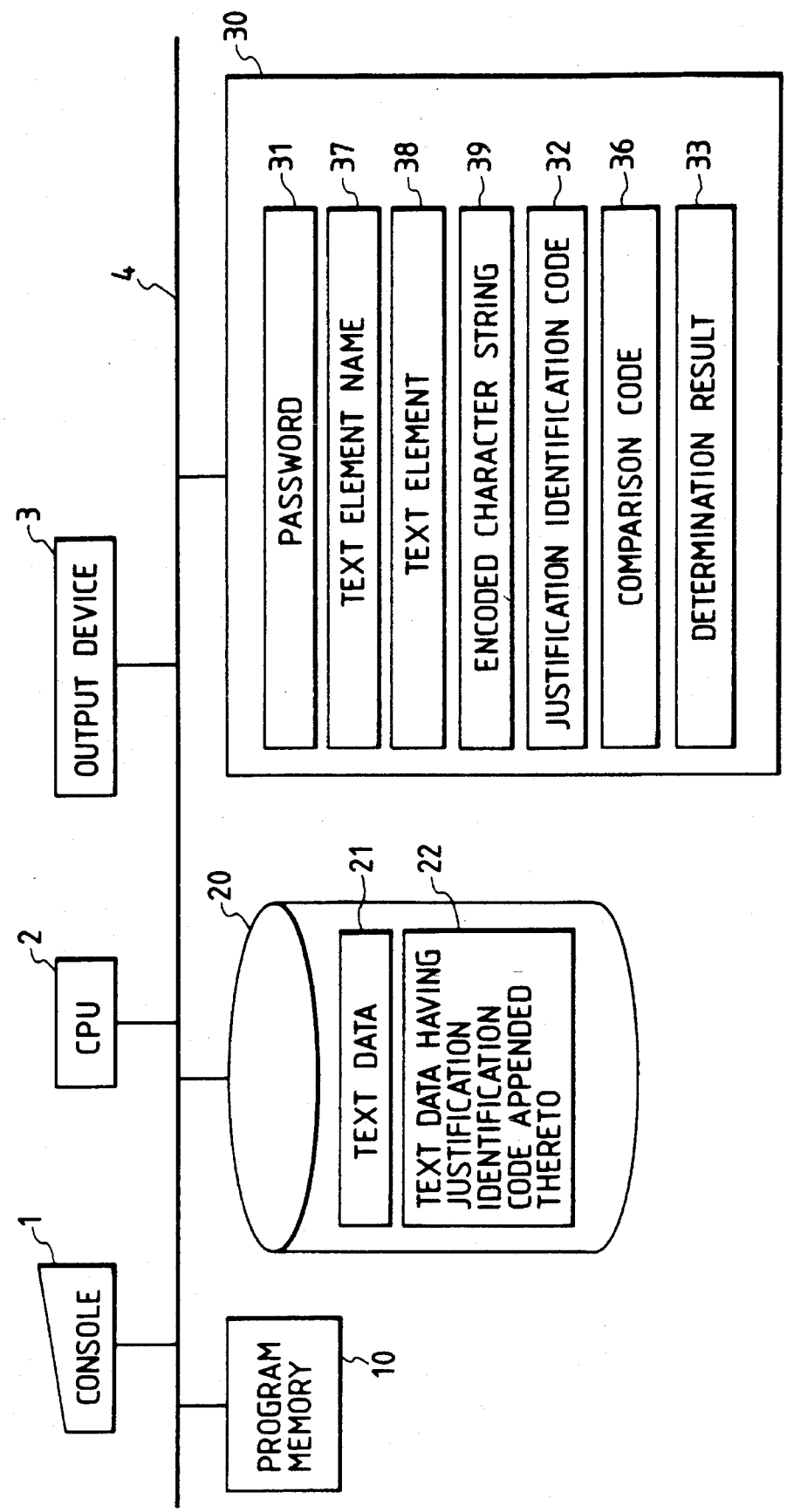
FIG. 14 is a system configuration diagram in the fourth example.

FIG. 14 is a system configuration diagram in this example. The hardware configuration is the same as in the previous examples, but the processing program stored in the program memory 10 is correspondent to this example. In the data memory 20, the text data 22 with the justification identification code appended is stored, and in the main memory 30, the text element 38 which is a text element including the tag as the punctuation information and the encoded character string 39 as the subject of the encoding in the code generation, instead of text element+password 34, are stored. Next, the configuration of the text data 21 will be described with reference to FIG. 15. The text data is divided into several text elements with the specific punctuation symbol. In this example, "<" and ">", and the character string enclosed by them such as <Aa> or </A> are used as the punctuation symbol in the figure.

However, when "<" or ">" is inserted into the content of the text element, a rule is provided such that the description is made such as "l<" or "l>", for example, and the character string enclosed by "l<" and "l>" is not used as the punctuation symbol.

Figure 15:
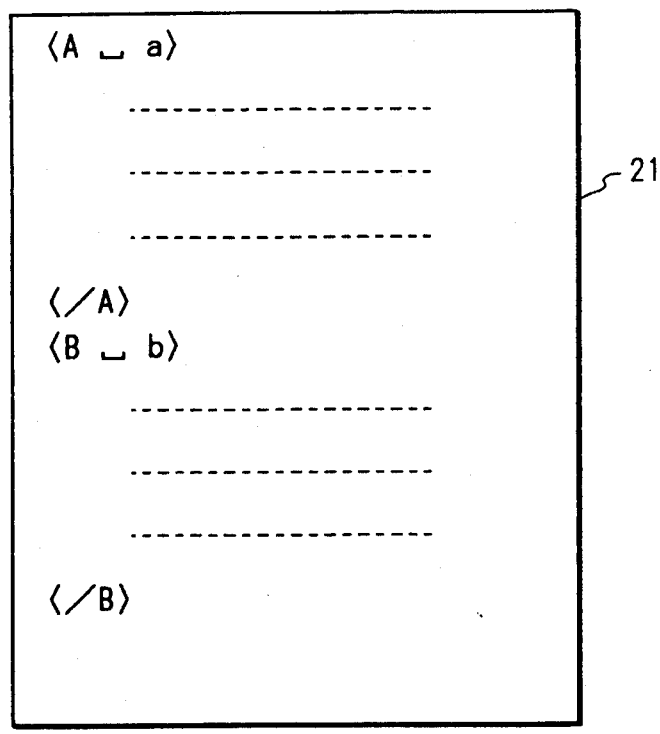
FIG. 15 exemplifies the document data in the fourth example.

Here, "<Aa>" is a start tag indicating the beginning of the text element. "A" is a character string representing the name of the text element, and "a" is a character string representing the attribute associated with the text element having the text element name of A (hereinafter referred to as the text element A). The character string "A" and "a" are separated by a blank ' '. The character string 'a ' may be omitted, or a plurality of 'a ' may be provided. In such a case, a plurality of attributes are separated by the blank ' '. On the other hand, the text punctuation symbol starting with '</A>' or '</' is an end tag indicating the termination of the text element (the termination of the text element A in this case). Also, the start tag and the end tag are commonly called as the tag. In this example, the text is divided into a plurality of text elements, as shown in FIG. 15.

Figure 16:
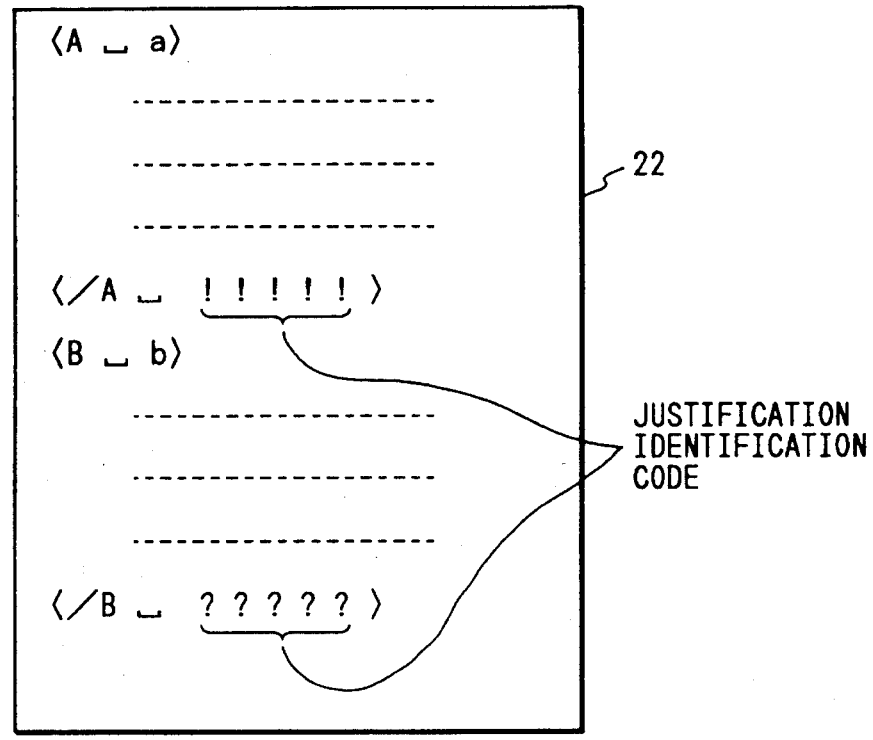
FIG. 16 exemplifies the document data including the justification identification code in the fourth example.

FIG. 16 shows the configuration for the text data 22 with the justification identification code appended in this example. In this example, the text element name and the justification identification code are inserted in the end tag. Both character strings are separated by the blank ' '. (Accordingly, the blank must not exist in the character string of the justification identification code. Thus, when the encoded character string 35 for use in the justification identification code is generated, the encoding must be made so that the blank is not inserted.)

The processing procedure of this example will be described below.

The process is also divided into two sections of a process in which the text creator creates the text data 22 with the justification identification code appended (thereinafter referred to as the creating/registering process) and a process in which the text retriever confirms whether or not the text data 22 with the justification identification code appended is valid (thereinafter referred to as the decision process).

The processing flow of the document creating/registering process is in accordance with the flowchart of FIG. 2.

First, the text data 21 is created, and stored as a file in the memory 20 (S21). Next, the text creator input the text element name 32 of the text element of interest from the console 1, and stored in the memory 30 (S22). Further, the text creator also input a password from the console 1, and stored in the password 31 (S23). And the tag and content of the text element having the input text element name 37 are fetched from the text data 21, and stored in the text element 38 of the memory 30. Then an encoded character string 39 is generated from the text element 38 and the password 31, and stored in the memory 30. And the encoded character string 39 is encoded to generate the justification identification code 32, which is then stored in the memory 30 (S24). This encoding process can be performed in the same way as in the above example.

The code generated herein is stored as the justification identification code 35. At this time, the justification identification code may be displayed on the console 1.

At step S25, the justification identification code 35 generated is registered at a predetermined location in the text data 21 so as to create the text data 22 with the justification identification code appended, which is then stored as a file in the memory 20.

Here, the encoded character string process at step S24 will be described in connection with a flowchart of FIG. 17.

First, the start tag and the content of the text element are fetched from the tag and content 33 of the text element (S171). And the above two character strings and the character string of the password 31 are connected to have one character string (S172). The character string created at step S172 is stored as the encoded character string 39 in the memory 30 (S173). The processing at step S25 will be described in connection with a flowchart of FIG. 18.

First, the end tag of the text element for the text element name 37 is detected from the text data 21 (S181). And the blank ' ' is inserted after the character string of the text element name in the end tag, and the justification identification code 32 is inserted thereafter (S182).

The text data 22 with the justification identification code appended which is created at step S182 is stored as a file in the second memory 20 (S183), and thus the processing at step S25 is completed.

The above operation is the creating process in this example.

Figure 5:
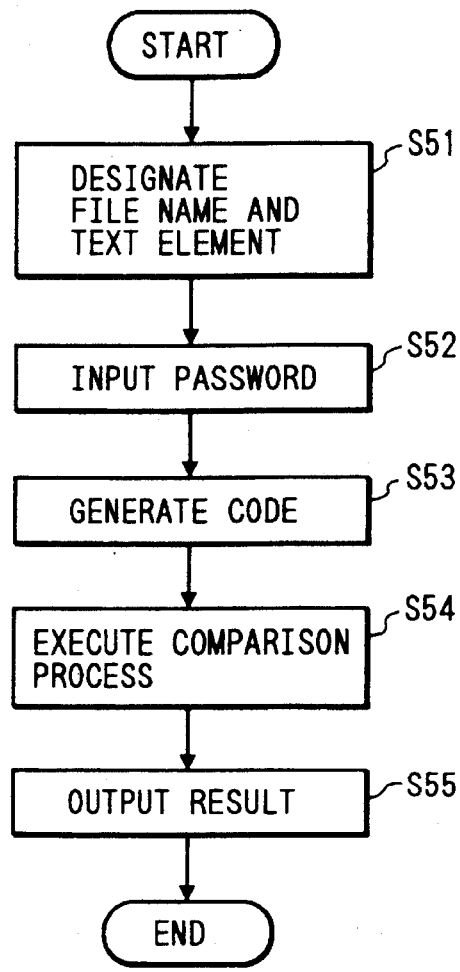
FIG. 5 is a flowchart for a comparison process.
Figure 19:
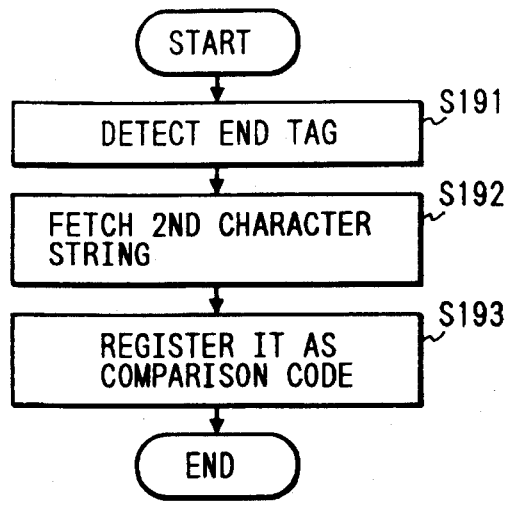
FIG. 19 is a flowchart for a comparison code extraction process in the fourth example.

Next, the decision process of this example is performed in accordance with FIG. 5, like the example 1. However, the process for fetching the justification identification code at step S61 of FIG. 6, in the comparison process at step S54, is slightly different, and will be described below in connection with a flowchart of FIG. 19.

First, the end tag of the text element having the text element name as indicated in the text element name 32 is detected (S191).

The second character string separated by the blank ' ' in the end tag is fetched (S192). This is stored as the comparison code 36 in the memory 30 (S193). Thus, the decision process has been described.

Since the justification identification code is generated from the start tag and the content of the text element in a system for dealing with the text data separated into the text elements by the tag in this example, it is possible to decide the justification of the text element, including the name and attribute of the text element, in addition to its content, when the name or attribute of the text element is inserted in the start tag.

Fifth example

In the previous exmaples, the justification identification code generated from the start tag, the content of the text element and the password was inserted in the end tag. In this example, the justification identification code generated from the content of the text element, the end tag and the password is inserted in the start tag.

The system constitution of this example is the same as in FIG. 1 of the first example.

Figure 20:
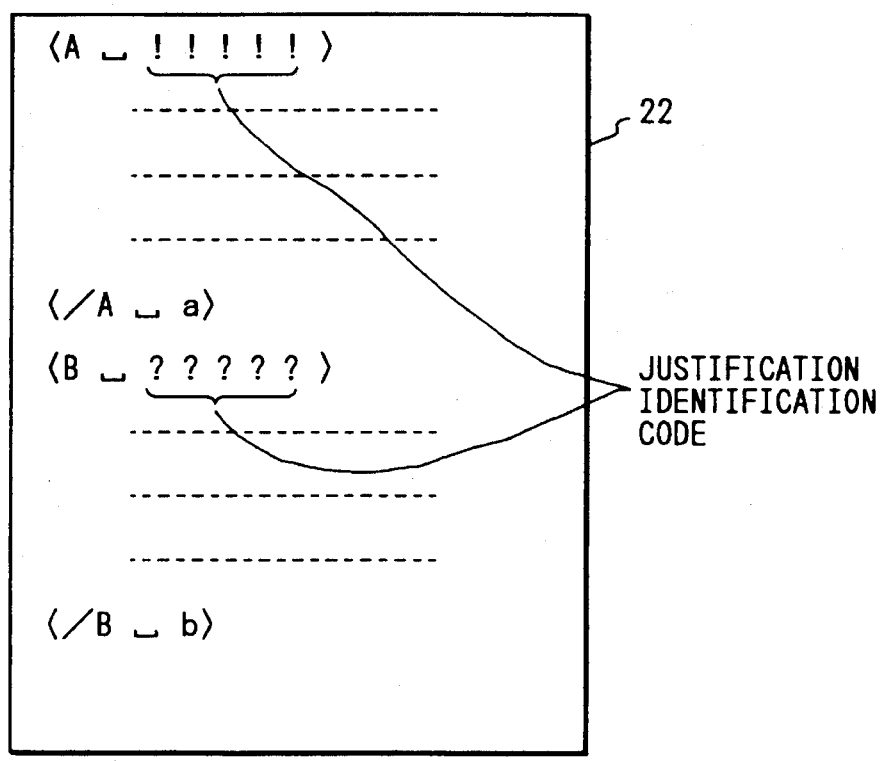
FIG. 20 exemplifies the document data including the justification identification code in the fifth example.

The configuration of the text data with the justification identification code appended is shown in FIG. 20. That is, the attribute of the text element is described in the end tag, and the justification identification code is inserted in the start tag separated from the text element name by a blank ' '.

The creating process procedure in this example is also in accordance with the flowchart of FIG. 2 as described in the first example. However, the creating process for the encoded character string at step S24 and the process at step S25 are different from the first example, and the two processes will be described here.

Figure 21:
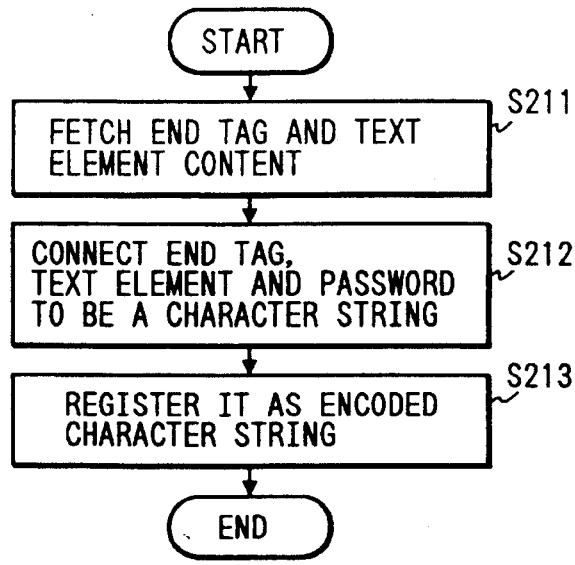
FIG. 21 is a flowchart for an encoded character string generation process in the fifth example.

The creating process for the encoded character string will be described in connection with a flowchart of FIG. 21.

First, the end tag and the content of the text element are fetched from the tag and content 33 of the text element (S211). And the above two character strings and the character string of the password 31 are connected to have one character string (S212). The character string is stored as the encoded character string 39 in the memory 30 (S213).

Figure 22:
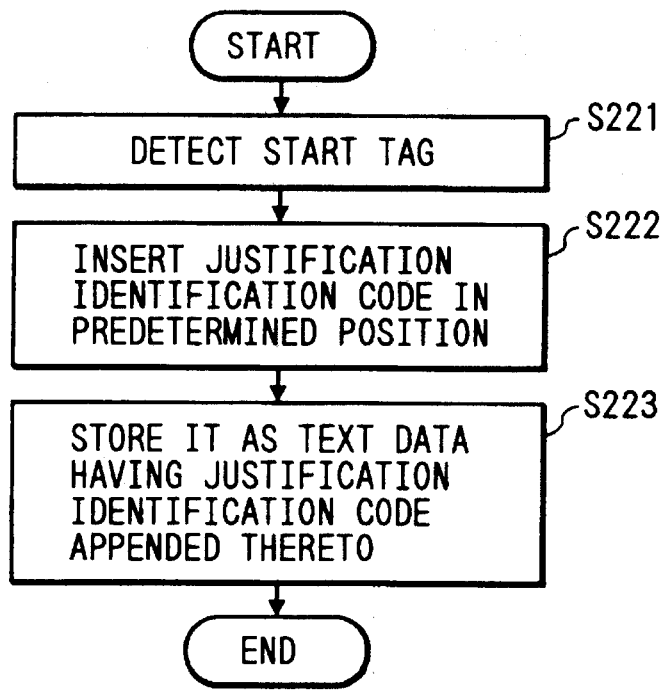
FIG. 22 is a flowchart for the correspondence process in the fifth example.

In the following, the correspondence and registration process for the justification identification code at step S207 will be described in connection with a flowchart of FIG. 22.

First, the start tag of the text element for the text element name 37 is detected from the text data 21 (S221). And the blank ' ' is inserted after the character string of the text element name in the start tag, and the justification identification code 35 is inserted thereafter (S222). The created text data 22 with the justification identification code appended is stored as a file in the memory 20 (S223), and thus the registration process is completed.

The above operation is the creating procedure in this example.

Figure 23:
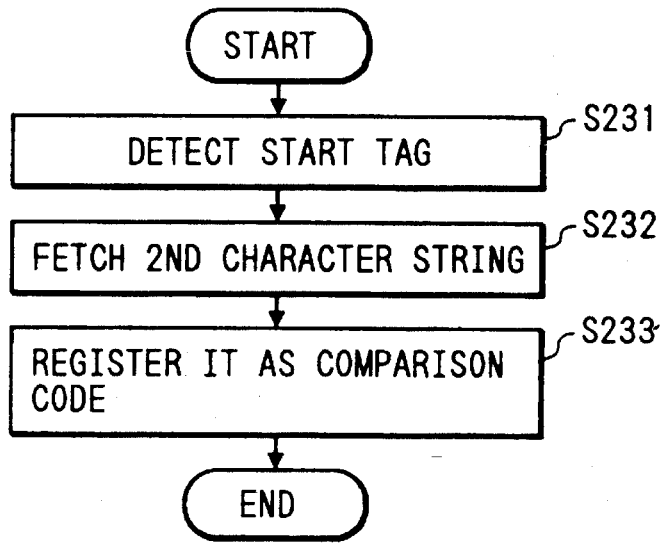
FIG. 23 is a flowchart for a comparison code extraction process in the fifth example.

Next, the decision process of this example will be described. The processing procedure is performed in accordance with the flowchart of FIG. 5 as described in the first example. However, the process for the encoded character string at step S53 is performed in accordance with the flowchart of FIG. 21. The process for fetching the comparison code at step S53 is different from in the described examples, and will be described in connection with FIG. 23.

First, the start tag of the text element having the text element name as indicated in the text element name 32 is detected (S231).

The second character string separated by the blank ' ' in the start tag is fetched (S232). This is stored as the comparison code 36 in the third memory (S233). Thus, the decision process is completed.

Since the justification identification code is generated from the end tag and the content of the text element in a system for dealing with the text data separated into the text elements by the tag in this example, it is possible to decide the justification of the text element, including the name and attribute of the text element, in addition to its content, when the name or attribute of the text element is inserted in the end tag.

Sixth example

This example is a process of deciding the justification of the text element, including the start tag and the end tag.

The system configuration diagram of this example is shown in FIG. 14 of the fourth example.

Figure 24:
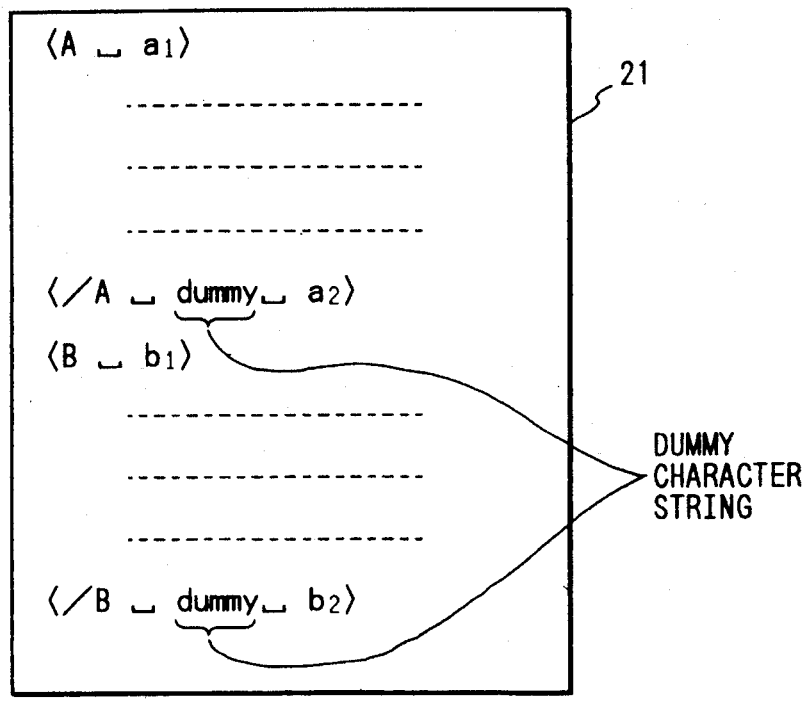
FIG. 24 exemplifies the document data in the sixth example.

The configuration of the text data 21 is shown in FIG. 24. That is, in this example, the attribute of the text element is described in the second or subsequent term separated by the blank in the start tag, and in the third or subsequent term separated by the blank in the end tag, In the second term of the end tag, a dummy character string which is replaced with the justification identification code later is described. The dummy character string must be a character string clearly distinguishable from the justification identification code. For example, it may be a character string starting with a character not to be encoded.

Figure 25:
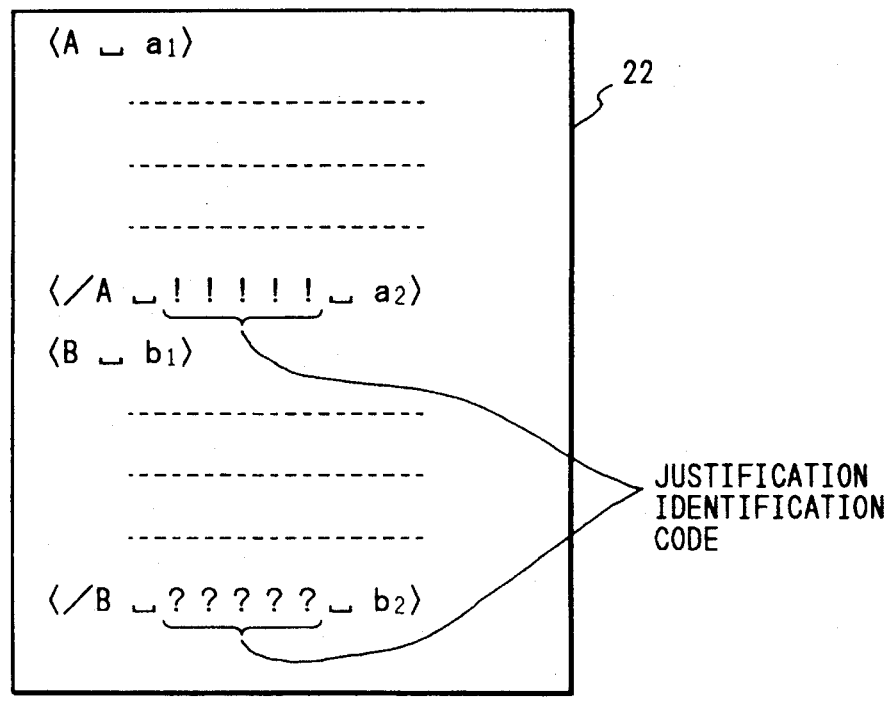
FIG. 25 exemplifies the document data including the justification identification code in the sixth example.

FIG. 25 shows the configuration of the text data 22 with the justification identification code appended.

Instead of the dummy character, the justification identification code is described in the end tag. The creating process procedure in this example is also in accordance with the flowchart of FIG. 2 as described in the first example. However, the creating process for the encoded character string at step S24 and the process at step S25 are different from the first example, and the two processes will be described here.

The creating process for the encoded character string in this example will be described in connection with a flowchart of FIG. 26.

First, the start tag, the end tag excluding the second character string (dummy character string), and the content of the text element are fetched from the tag and content 33 of the text element (S261). And the above two character strings and the character string of the password 31 are connected to have one character string (S262). The encoded character string is generated from the character string obtained here and stored as the encoded character string 39 in the memory 30 (S263). Thus, the processing is completed.

In the following, the registration process for the justification identification code at step S25 in this example will be described in connection with a flowchart of FIG. 27.

First, the end tag of the text element for the text element name 37 is detected from the text data 21 (S271).

And the second character string (dummy character string) in the end tag is deleted (S272). As previously described, it is possible to distinguish between the dummy character string and the justification identification code clearly by constituting the dummy character string of a character string starting with a character not to be encoded.

The blank ' ' is inserted after the character string of the text element name in the end tag, and the justification identification code 35 is inserted thereafter (S273). The created text data 22 with the justification identification code appended is stored as a file in the memory 20 (S274), and thus the registration process is completed.

The above operation is the creating procedure in this example.

Next, the decision process of this example will be described.

The processing procedure is in accordance with the flowchart of FIG. 5 as described in the first example. However, the process for the encoded character string at step S53 is in accordance with the flowchart of FIG. 21 in the fifth example. The process for fetching the comparison code at step S54 is in accordance with the flowchart of FIG. 23 in the fifth example.

Thus, the decision process procedure of this example has been described.

Since the justification identification code is generated from the start tag, the end tag and the content of the text element in a system for dealing with the text data separated into the text elements by the tag in this example, it is possible to decide the justification of the text element, including the name and attribute of the text element, in addition to its content, when the name or attribute of the text element is inserted in the start tag and the end tag.

Note that if the encoded character string is generated by including the justification identification code contained in the start tag and the end tag, the comparison result is always unequal, and the decision can not be made when referenced. In this example, the above problem is avoided by generating the encoded character string excluding the justification identification code.

Figure 28:
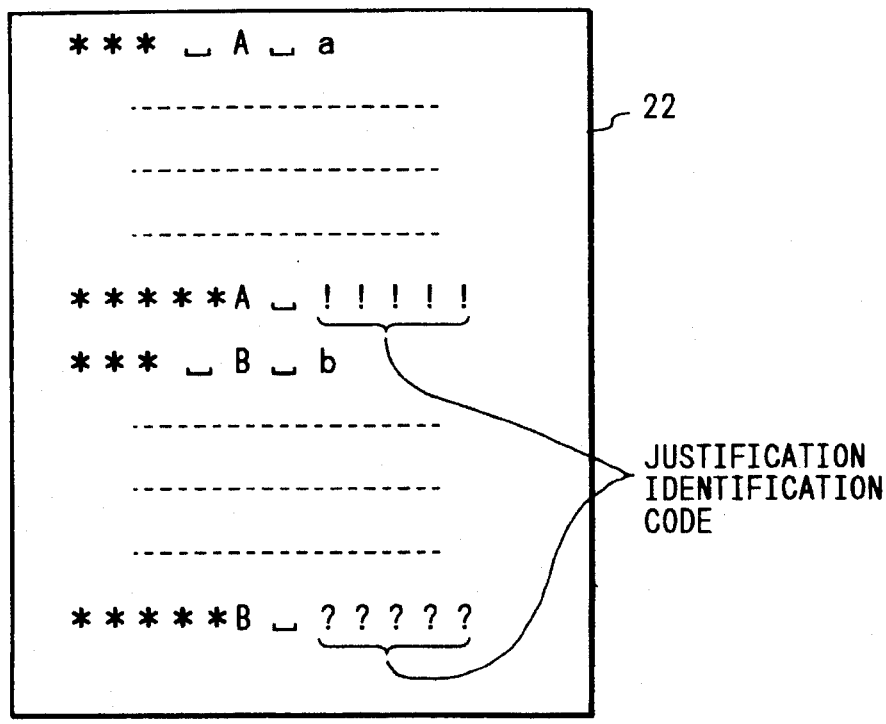
FIGS. 28 and 29 further exemplify the document data including the justification identification code.

In the above three examples, the text punctuation symbol was a character string enclosed by '<' and '>', but is limited to such a character string. For example, the punctuation symbol may be a character string from the character string '*' or '*' to the carriage return or the new line, as shown in FIG. 28. In FIG. 28, the character string '*' followed by the text element name and the attribute is a start tag. The end tag starts with the character string '*****' and is followed by the text element name and the justification identification code in this order. To be brief, it is only necessary that the content of the text element and the punctuation symbol are described to be clearly distinguishable.

In the fourth to sixth examples as above described, the text element was identified with the text element name, but the way of designating the number of the text element from the beginning, like the first example, can be conceived. In this case, the character string of the text element name does not exist.

Figure 29:
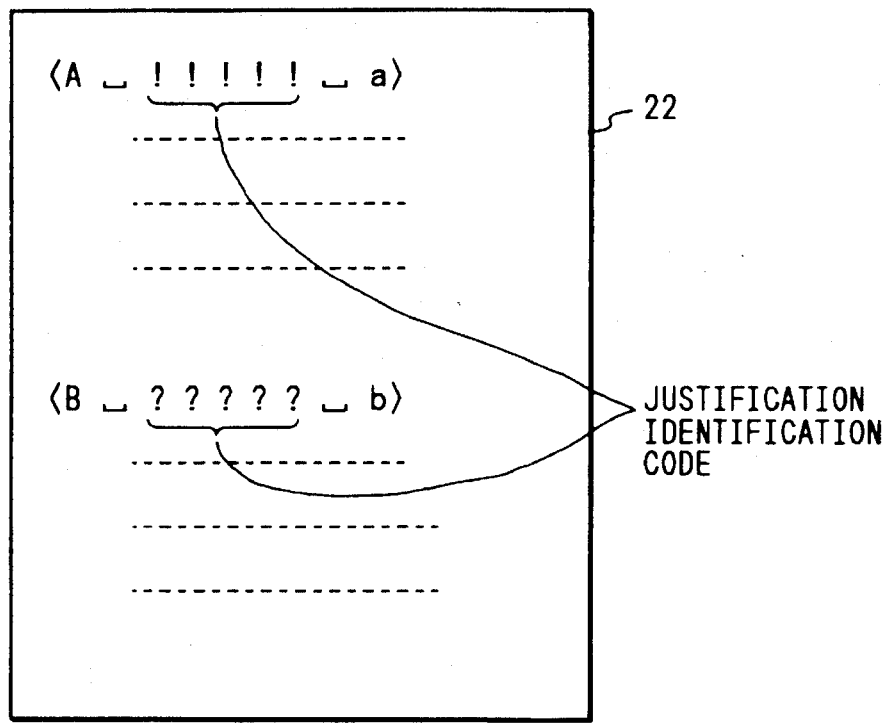

In the above sixth example, both the start tag and end tag exist clearly, but in this example is applicable even if either tag is omitted in a system not allowing for the nesting of the text element. For example, when the end tag is omitted as shown in FIG. 29, the end tag can be conceived as a null string (a virtual character string constituted of a null character) existing before the start tag of the next text element or EOF (End of File). That is, the content of the text element is a character string enclosed by the start tag of the text element and the next start tag or EOF, so that the end tag is a null string, whereby the third example is applicable.

As above described, with the fourth to sixth examples, the text data separated into several text elements by the use of the punctuation information can be confirmed as to whether or not each text element has been altered, including the punctuation information, so that it is possible to decide the justification for the text element including the name and attribute of the text element, in addition to its content, when the name or attribute of the text element is described in the punctuation information.

Seventh example

In this example, in processing the text data, each text element is processed based on the decision result for the justification for each text element. Particularly, the valid text element is only processed, or the valid text element is subjected to the first processing, and the invalid text element is subjected to the second processing.

The system configuration diagram of this example is the same as in FIG. 1 of the first example.

An example for the content of the text data 21 is shown in FIG. 30.

In the figure, the character string from a mark "<a>" to a mark "</a xxx>" is a first text element, in which the character string"" xxx shows a justification identification code corresponding to the first text element. The character string from a mark "<b>" to a mark "</b yyy>" is a second text element, in which the character string "yyy" shows a justification identification code corresponding to the second text element.

The character string "xxx" which is the justification identification code for the first text element is a code obtained by encoding the password given to the first text element by the text creator and the content of the first text element, and the character string "yyy" is a code obtained by encoding the password given to the second text element by the text creator and the content of the second text element. This encoding process is executed in the same way as in the first example.

Figure 31:
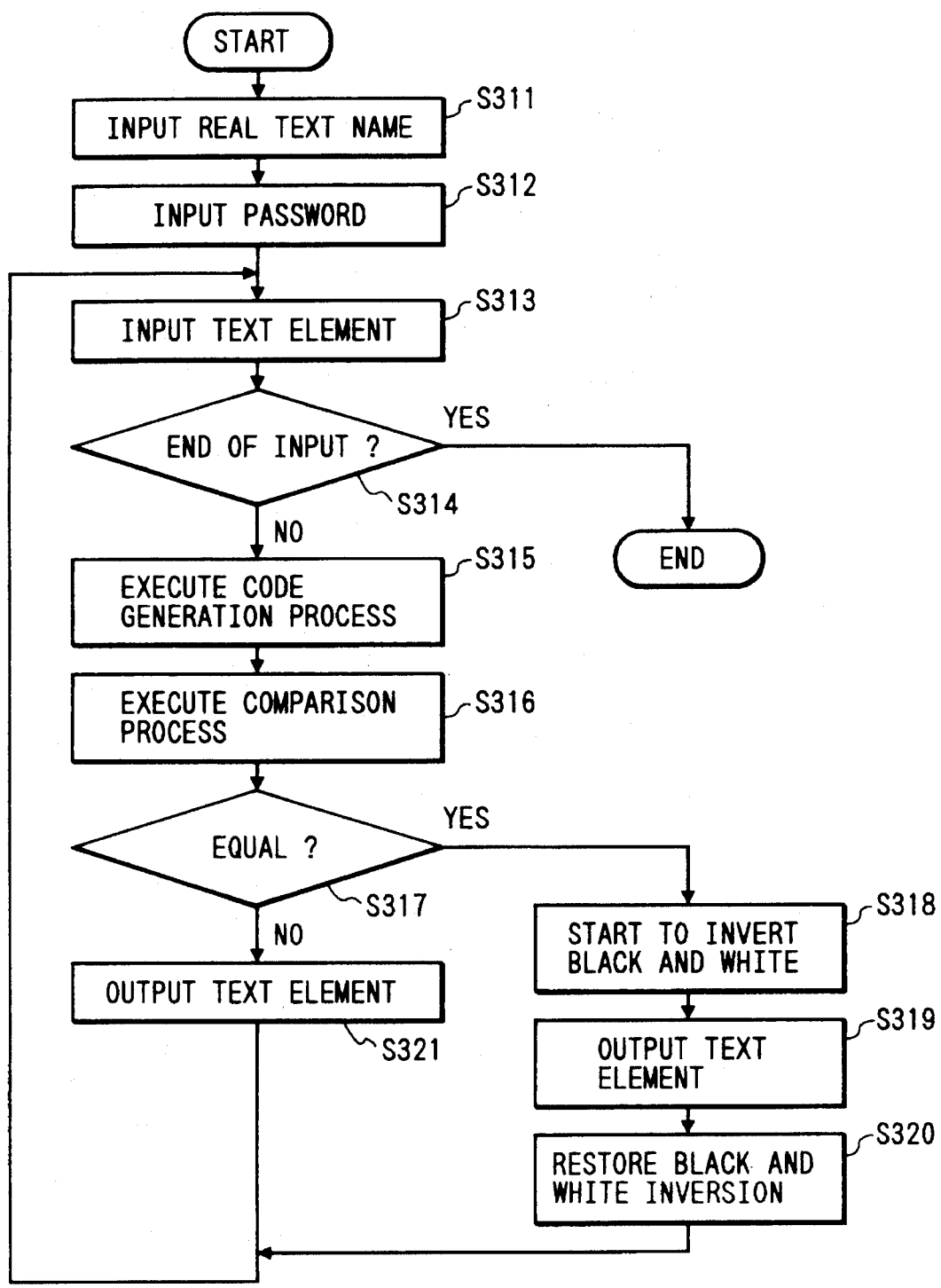
FIG. 31 is a flowchart for a justification identification process in the seventh example.

FIG. 31 is a flowchart for displaying the text element.

First, at step S311, the name of a real text data 21 to be investigated is input from the console 1, and the file designated with this input is opened to prepare for the input of the content. At step S312, a password corresponding to the text element to be retrieved is input. Here, for simplicity, it is supposed that the password corresponding to the first text element in FIG. 30, or the character string ABCD enclosed by "<a>" and "</a xxx>" is input. At step S312, the input password is stored in the passowrd 31. The text element referred herein is a character string enclosed by the start tag and the end tag. The start tag is a symbol starting with "<", followed by alphanumerical characters, and ending with ">", and corresponds to the mark "<a>" in the first text element The end tag is a symbol starting with "</", followed by alphanumerical characters, a blank, the justification identification code, and ending with ">", and corresponds to the mark "</a xxx>".

At step S313, one text element is read from the designated text data (file), and stored in the main memory 30.

At step S314, the end of input is judged. That is, of no text element is stored in the main memory 30, the processing is terminated, and if there is any input, the processing goes to step S315.

At step S315, the password memory 31 and the content of the text element excluding the end tag are connected through the character string conversion, and the generated code is stored in the comparison code 36.

At step S316, the justification identification code contained in the end tag of the text element is fetched, and the comparison is made between this character string and a character string stored in the comparison code 36. Then, at step S17, if the comparison result is equal, the processing proceeds to step S318, while if not equal, the processing proceeds to step S321.

In this example, it is assumed that for the first text element, the exact same password as used in generating the justification identification code of this text element at the creation of the text is input at this time. That is, it is assumed that the code generated at step S315 is equal to the justification identification code in the end tag. Accordingly, the processing proceeds to step S318.

At step S318, a black and white inversion code is sent to the output device 3, for example, to the character terminal in accordance with ANSI, a control character code sequence of character string "ESC[7 m" is sent. Here, "ESC" is generally referred to as an escape code (27 in decimal), and the control sequence consisting of the escape code followed by the character string is referred to as an escape sequence.

If the white and black inversion code is output to the output device 3, the text element data stored in the main memory 30 is sent to the output device 3 at step S319, and a control code for restoring the normal display attribute, or the character string "ESC[0 m" in the ANSI is set at next step S320. The display screen of the output device 3 for the first text element is shown in FIG. 32A.

Thereafter, the processing returns to step S313, where the same processing is repeated, but as the password input at step S312 corresponds to the first text element, the decision at step S317 is made to be unequal for the second text element. Accordingly, the processing proceeds to step S321, where the content of the second text element read at this time is displayed on the output device 3. The display screen is as shown in FIG. 32B.

In this way, if the password input at step S312 is not equal to the password input at the creation of the text, or the content of the text element is rewritten though the same password is input, the processing passes through step S321, but not through steps S318 to S320, so that the white and black inversion screen is not displayed.

In other words, the text element whose justification is identified is reversely displayed in white and black, so that the operator can readily confirm the result.

In the seventh example as above described, the output device 3 was a display, but may be a printer. In such a case, the text data and the control code for the output form needs to be sent to the printer. However, the print control code must be used instead of the display control code. The print control code is sent in accordance with the command system of the printer. Here, a further explanation is omitted.

In the seventh example, the text element whose justification is identified is displayed or printed (thereinafter simply referred to as "output") reversely in white and black, and other text elements are output with the normal attribute, but their opposite representation is also possible. Also, the text element whose justification is identified and other text element may be distinguished based on the difference in the character shape or in the character size or thickness by changing the font. Also, in the display, the brightness may be changed, or the underline may be used for the distinction. In any case, any other method can be used as long as the text element whose justification is identified and other text element can be distinguished.

In the seventh example as above described, the display attribute is changed including the start tag and the end tag, but the start tag and the end tag may be always output with the same output attribute. This can be accomplished by first outputting the start tag to the output device 3, then sending the white and black inversion code, the content of the text element memory 32, the control code for restoring the white and black inversion, and finally the end tag, when the code is determined to be equal at step S317.

Eighth example

An eighth example will be described below.

The flow of original real text data in this example is shown in FIG. 34A. This example shows that the hierarchical structure is made up with the start tag and the end tag in the correspondent relation. As shown in the figure, this real text data has two text elements of "document", each text element being composed of text elements of one "title" and two "paragraph". As the text element "title" and "paragraph" are contained within the text element "document", and thereinafter referred to as the second level text element, and the text element "document" is referred to as the first level text element.

Though the explanation is out of sequence, the name of the text element has been input by the operator at the stage of creating the real text, and inserted in the start tag and the end tag. The character string "vvv" in the end tag of the first text element name "document" is the justification code corresponding to the text element, and the character string "www" in the second end tag is the justification code corresponding to the second text element. Note that the method of generating the justification code is the same as in the first example, but since the content is different, the justification code may be different even though the same password is set.

FIG. 34B is an example in which a part of the real text data in FIG. 34A is changed, and in which the justification indentification code has not yet been updated. In practice, a character "z" is inserted immediately before "paragraph" at the last line of the second text element "document".

In the eighth example, it is supposed that the real text data altered as shown in FIG. 34B is dealt with as the input data, and the processing flow thereof will be described with reference to a flowchart of FIG. 33. This flowchart is basically the same as the flowchart of FIG. 31.

First, at step S331, the real text data altered as shown in FIG. 9 is an input data, and at step S332, the password used in the correspondence of the justification identification code of the real text data is input. At step S333, the first level text element, i.e., the first text element "document" is fetched together with the second level text element contained therein.

At step S334, a determination is made whether or not the input is ended, but as there is text element not input, the processing proceeds to step S335.

At step S335, the justification identification code is generated from the password input at previous step S332 and the character string of the text element input at step S333. And this code is contained in the end tag of the text element of interest. As the first text element is not rewritten, the justification identification code can be confirmed to be equal at step S336. Then proceeding from step S337 to step S339, the first text element "document" stored in the text element memory 32 at that time is fairly printed.

The fairly printed result is shown in FIG. 35. As shown in the figure, the fair print is to print in the arranged layout by removing the start tag and the end tag which are punctuation information for each text element. Originally, these tags are intended to determine the punctuation of the text element, and incovenient if they exist in the presentation of the text to others. The line feed code is automatically appended after the final character of each text element. In this case, the parameters about the format of the text are input when printing it actually. The parameters include the size of paper, the number of characters per one line, the number of lines per one page, and the character and line pitch. The fair print process it self is simple. That is, this can be basically accomplished by suppressing the layout control code in accordance with a given format. Accordingly, the detail is omitted.

If the first text element at the first level has been printed, the processing returns to step S23, where the processing for the second text element "document" at the first level is executed. This text element is altered in part, as previously described. Accordingly, the justification comparison code generated at step S335 and the justification identification code appended in the end tag of the second text element at the first level are not equal. Hence, the determination at step S337 is "NO", and the processing proceeds to step S338. At step S338, the text element data stored in the main memory 30 is simply displayed on the output device 3, but the fair print is not performed. As a result, the text data not justified is displayed on the output device 3 as shown in FIG. 36.

In this way, for the rewriting without permission of the creator, it is possible to prevent inadvertent processing beforehand.

In the eighth example as above described, the fair print or display is switched depending on whether the comparison result of the justification identification code is equal or not, but the text as determined equal and the text as unequal may be stored into separate files.

In this case, immediately after step S331 of FIG. 33, the file name for accommodating the text in which the comparison code and the justification identification code are equal and the file name for accommodating the text in which they are not equal are input, and their files are opened. And instead of step S339, a process for adding the text element data read in the main memory 30 to the former file is executed. Also, instead of step S338, a process for adding the text element data read into the main memory 30 to the latter file is executed.

In this way, it is possible to extract the processing object from the whole data, and then subject the extracted text data to the arbitrary process such as the fair copy process or other process.

In the above-described examples, all the passwords are collectively input and stored in the password memory 31, and in generating the comparison code, the content of the password memory 31 is used, but the processings at steps S312 and S332 may be moved immediately before step S315 of FIG. 31 and step S335 of FIG. 33, respectively. In this case, the input of the password is made for each text element. This is effective in finding or processing the text element which is determined valid among respective text elements in charge when the text is created by a plurality of persons.

As will be described later in the ninth example, it is also possible to read respective text elements and a list of passwords corresponding thereto (which is concealed in the system and can not be referenced by the general user), and generate the justification comparison code corresponding to each text element. Note that to realize this, the password for each person in charge which has been input for each text element is stored in a predetermined area of the memory, when creating (registering) the text. And the common password for the users involved in the creation of the text is prepared, and only when that password is input, each password stored in the memory is displayed on the display screen. The user watches a displayed table, and specifies a desired one. In this case, the user is not troubled in inputting the password each time.

As above described, with this example, the password is input, the justification comparison code for each text element is generated based on it, the comparison between that code and the justification identification code corresponding to each text element is made, and the processing method for the text element is changed depending on whether they are equal or not, so that it is possible to process or decide only the valid text elements collectively.

Ninth example

This example is one in which in investigating whether or not the text information including the text area created by a plurality of persons is altered, it is possible to confirm whether or not the content of each text area is altered, even if the password of each person in charge is not input.

FIG. 37 is a system configuration diagram in this example. The hardware configuration is the same as in the previous examples; but a processing program stored in the program memory 10 corresponds to this example, and a password registration table 24 is stored in the data memory 24. This password registration table 24 is made readable and writable only by a password registration program and a password extraction program in the program memory 10, and inhibited from the read and write by the text creator. This can be implemented by means of a file access prohibiting feature.

Figure 38:
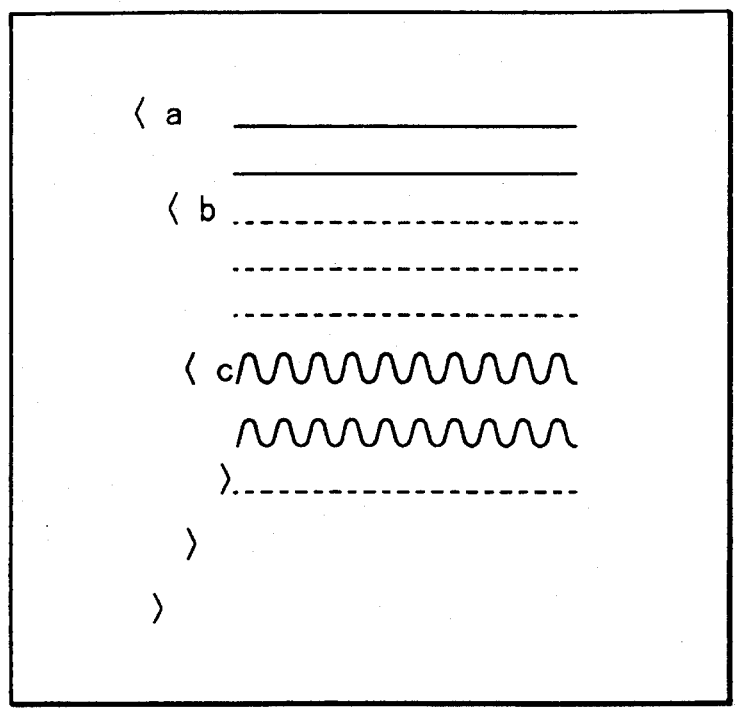
FIG. 38 exemplifies the document data in the ninth example.

FIG. 38 shows one example of the text data 21 in this example. Here, each text element is a character string starting with "<" and ending with ">", and the character string immediately after the start symbol "<" is a text element name. Note that it is prohibited to use the characters "<" and ">" in the text element for the purpose of other than the text punctuation symbol.

Figure 39:
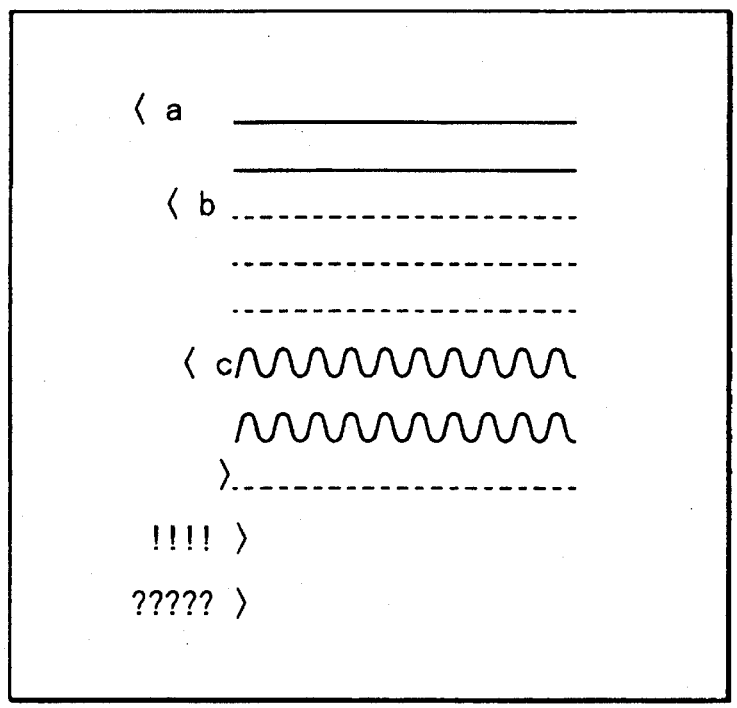
FIG. 39 exemplifies the document data including the justification identification code in the ninth example.

FIG. 39 shows the state in which the symbol "!!!!" or "?????" for confirming that the text element is valid is appended after the extracted text element. These processings will be described later.

Next, the processing flow of the text processing system in this example will be described, in which the process is largely divided into two sections of a process for creating the text and a process for confirming the validity.

To begin with, the flow of a text data creating process by the operator will be described with reference to a flowchart of FIG. 40.

First, at step S401, the text creator (operator) inputs a storage area (e.g., file name) for the text data 21 with the text element name appended to each text element and an storage area for text data 22 with the identification code from an input device 1 to determine the object to be processed. At step S402, which text element in the text data 21 is to be registered, or its text element name, is input from the console 1. This input text element name is stored as the text element name 37 at the creation. Then proceeding to step S403, the text element corresponding to the input text element name is fetched from the text data 21, and stored as the text element 38. Then at step S404, if the operator input the password from the console 1, its password is stored in the password 31 and registered in the password registration table 24 (step S405). Thereafter, an encoded character string 39 is generated from the text element 38 fetched at step S403 and the password 31 input at step S404, and the encoded character string 39 is encoded to generate a justification identification code, at step S406, which is then stored in the justification identification code 32. And finally, at step S407, the correspondence process between the corresponding text element and the justification identification code 32 is performed (thereinafter described), and the text creating process is completed.

The text element extracting process at step S403 of FIG. 40 will be described with reference to FIG. 5.

First, the identification of the text element will be described. Each text element is a character string starting with a character "<" and ending with a character ">". Here, the character string from immediately after the character "<" to the first blank is a name (text element name) of the text element. Here, the term "correspondence" has the same meaning as the correspondence of parentheses in the numerical expression, whereby "<" is always paired with ">". That is, "<" is an open parenthesis and ">" is a close parenthesis. When after "<" indicating the beginning of the text element at the first level, "<" appears again before the corresponding ">" appears, it indicates the beginning of the text element at the second level contained in the text element at the first level.

Figure 40:
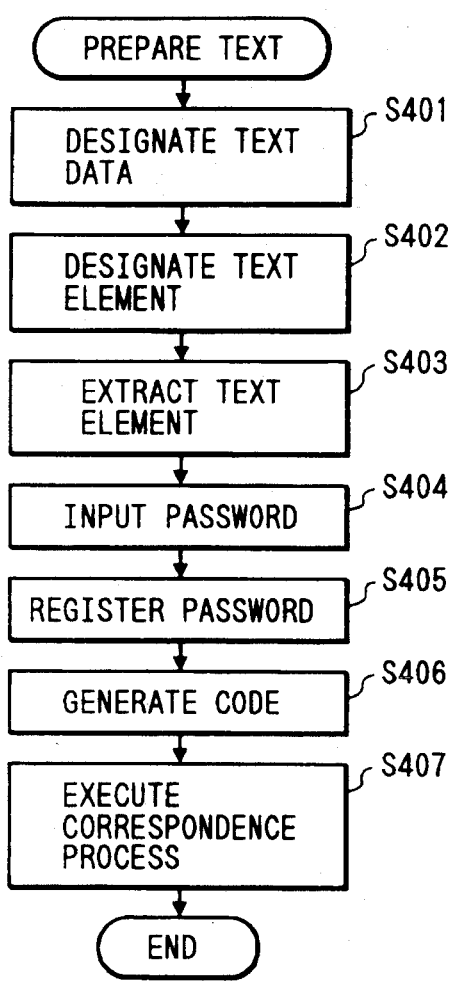
FIG. 40 is a flowchart for a document creation process in the ninth example.
Figure 41:
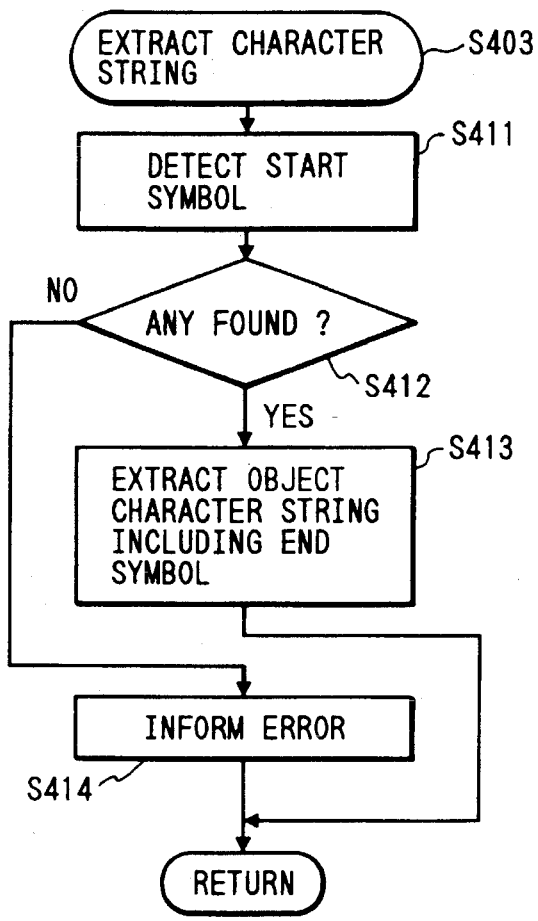
FIG. 41 is a flowchart for a document element extraction process in the ninth example.

First, at step S411, the detecting process of the start symbol "<" for the text element is started to detect the text element having the same element name from the text data 21 as the text element name 37 input at step S402 of FIG. 40. At step S412, if the text data 21 is completed while the text element name is not detected, the processing proceeds to step S414, where a message that no corresponding text element exists is displayed and the error termination is made.

At step S412, if the start symbol including the text element name is detected, the processing proceeds to step S413, where the character string for the text element from the next character code of the start symbol "<" to the corresponding end symbol ">" is fetched, and stored in the text element 38.

Next, the password registration process as shown at step S405 of FIG. 40 will be described with reference to a flowchart of FIG. 42. Here, the input password is registered as the password corresponding to the text element name 37.

First, at step S421, a search is made to determined whether the text element name input at previous step S402 and stored in the text element name 37 is registered in the password registration table 24. When it is registered at step S22, the processing proceeds to step S423, where the password currently registered in the password registration table 24 and corresponding to the text element name is replaced with the password input at step S404 and stored in the password 31. On the other hand, if the text element name is not registered at step S422, the processing proceeds to step S424, the text element name stored in the text element name 37 and the password stored in the password 31 are additionally registered in the password registration table 24. Note that this process is executed under the special authorization of a password registration program which can update the password registration table 24.

FIG. 43 is a view showing the data configuration of the password registration table 24 in this example, in which the password and the text element name are stored correspondingly, as shown.

The code generating process at step S406 can be implemented in the same way as in the previous examples.

Next, the correspondence process at step S407 of FIG. 4 will be described with reference to FIG. 18. Here, the identification code for identifying the justification of the justification identification code 32 is inserted after the last character of the text element of interest and a blank (space). This can be directly input from the console 1 by the text creator, or automatically performed. One example of automatic input is shown in the following. FIG. 39 shows the state in which the justification identification code is inserted, or one example of the text data 22 with the Justification identification code. Here, "?????" is a justification identification code for the text element having the text element name a, and "!!!!" us a justification identification code for the text element having the text element name b.

Figure 18:
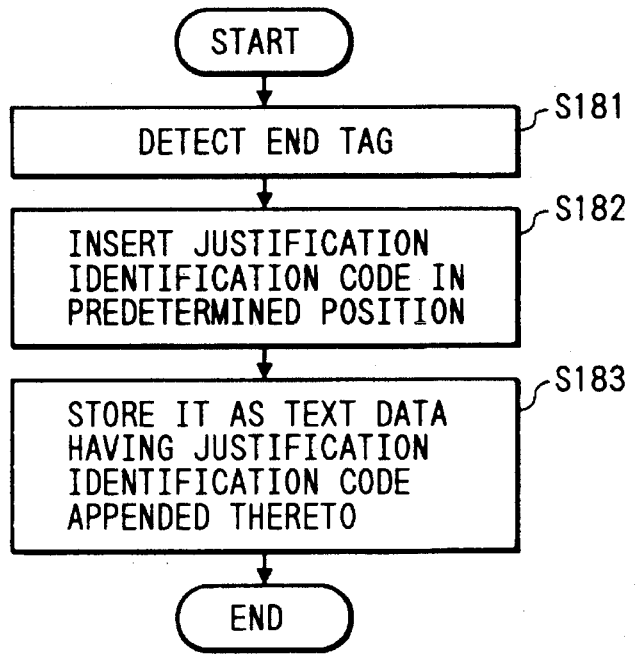
FIG. 18 is a flowchart for the correspondence process in the fourth example.

In FIG. 18, at step S181, the end symbol ">" of the text element having the text element name as indicated by the text element name 301 is detected. And the justification identification code 32 is inserted immediately before the end symbol ">", together with the blank, as the justification identification code (step S182). Thereby, this text data is stored at a specified storage location as the text data 22 with the justification identification code appended. The insertion of the blank (space) before the justification identification code is to distinguish between the content of the text element and the justification identification code.

In the previous explanation, the code generating process at step S406 is performed after the character string extraction at step S403 and the password input at step S404, but the justification identification code may be generated in such a manner that the extracted character code sequence is sequentially encoded while the object character string extraction process at step S403 is performed.

The process for confirming the justification of the text data 20 with the justification identification code is basically the same as the flowchart of FIG. 5. However, the password input portion is different, and will be described below with reference to FIG. 44. Here, based on the text element name input at step S51, the corresponding password is fetched by a password extraction program.

At step S441, the password registration table 203 is referenced, based on the text element name input at step S51, to see if the text element name is registered. If the text element name is registered at step S442, the processing proceeds to step S443, where the corresponding password is read and stored as the password 308 at the identification. On the other hand, if the text element name is not registered at step S62, the processing proceeds to step S444, where the error is informed, and the processing is completed. Note that this process, like the previously-described password registration program, is executed under the special authorization which can reference the password registration table 24.

In this way, with this example, it is possible to detect whether the text data has been altered only by specifying the text element name for which the justification is to be confirmed. In this example, the justification identification code for identifying the justification is embedded into the text, but the present invention is not limited to this, for example, the identification code may be managed with the separate file in the same way as the password. Also, in this example, the text element is specified with the text element name, but may be specified with the sequence or position of the text element.

While in the above example, the registration of the password registration table 24 is simultaneously performed in the text data creating process, it is also possible that the separate registration is provided, and the registered password is input at the creation of the text data, in which the password registration table 24 is not updated. A plurality of password registration tables can be provided so that the storage location of a password registration table may be specified when specifying the text data.

Tenth example

The tenth example of the present invention will be described with reference to FIGS. 45 to 50. In the tenth example, the justification identification is made using the registered password, like the ninth example, in which the tenth example is characterized in that the justification for the designated text element is made using the justification identification password registered for each owner of text element (thereinafter simply referred to as the owner). Note that like numerals are attached to like parts through the ninth and tenth examples, and the explanation thereof is omitted in the tenth example.

FIG. 45 is a schematic configuration diagram of a text processing system in the tenth example, which is substantially the same as previously described in FIG. 1, but different in the kinds of programs or data stored in the first, second and third memories as will be described below.

The program memory 10 has an owner registration program, instead of the password registration program, with which for a designated text element, the text creator registers the owner of the text element in the owner registration table 214. The password extraction program of this example, unlike that previously described, can fetch the password of the designated text element by referring to the owner registration table 25 and the password registration table 24. Also, the password registration program can register the password for each owner in the password registration table 24, independently of the text element.

The data configuration of the data memory 20 will be described. The password registration table 24, unlike that as shown in FIG. 37, is a registration table for registering the password corresponding to the owner, but not the text element. 25 is an owner registration table for storing the corresponding relation between the text element and its owner. This password registration table 24 is accessible only from the password registration program and the password extraction program, and the owner registration table 25 is accessible only from the owner registration program and the password extraction program. That is, the text creator or checker is not allowed to perform the read or write operation for them.

In an owner name 310 of the main memory 30, the owner name of the text element which the text creator has input from the console 1 at the creation of the text is stored. Also, when identifying, the owner name obtained from the owner registration table 25 for the designated text element by the password extraction program is stored.

First, the flow of the text creation process in the second example will be described with reference to a flowchart of FIG. 46.

At step S461, the text creator inputs the storage area (e.g., file name) for the text data 21 and the storage area for the text data with the identification code appended from the console 1 to determine the processing object. Proceeding to step S462, the text element name 37 is input from the console 1 by the text creator, and then at step S463, the corresponding text element is fetched from the text data 21, and stored in the text element 38. Further at step S464, the owner name is input from the console 1 by the text creator and stored in the owner name 310, and then at step S465, the owner name is registered in the owner registration table 25 by the owner registration program.

Then at step S466, the password 31 is obtained from the input text element name 37 using the password extraction program. At step S467, the justification identification code 32 is generated from the text element 38 fetched at step S463 and the password 31 fetched at step S466. Finally, at step S468, the correspondence process of the corresponding text element and the justification identification code 32 is performed, and thus the creation process of the text data with the justification identification code appended is completed.

Figure 46:
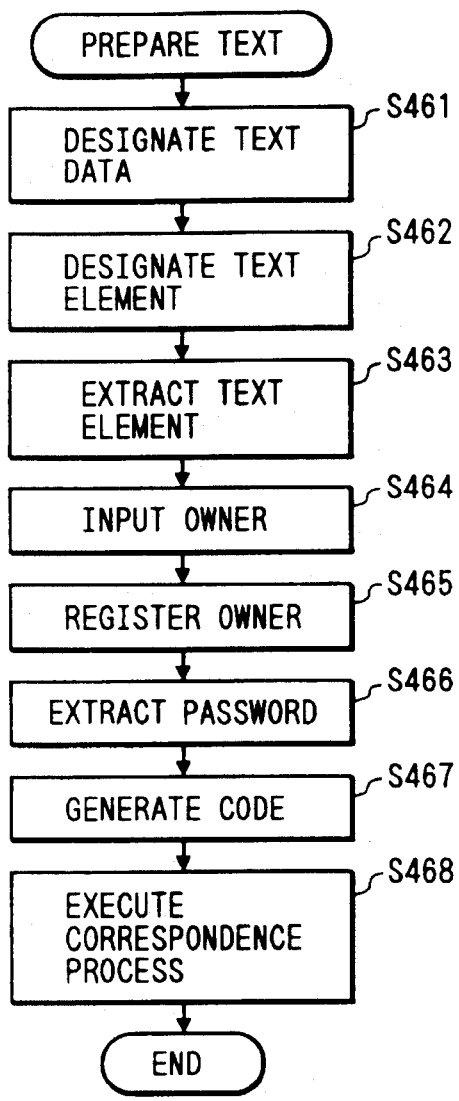
FIG. 46 is a flowchart for a document creation process in the tenth example.
Figure 47:
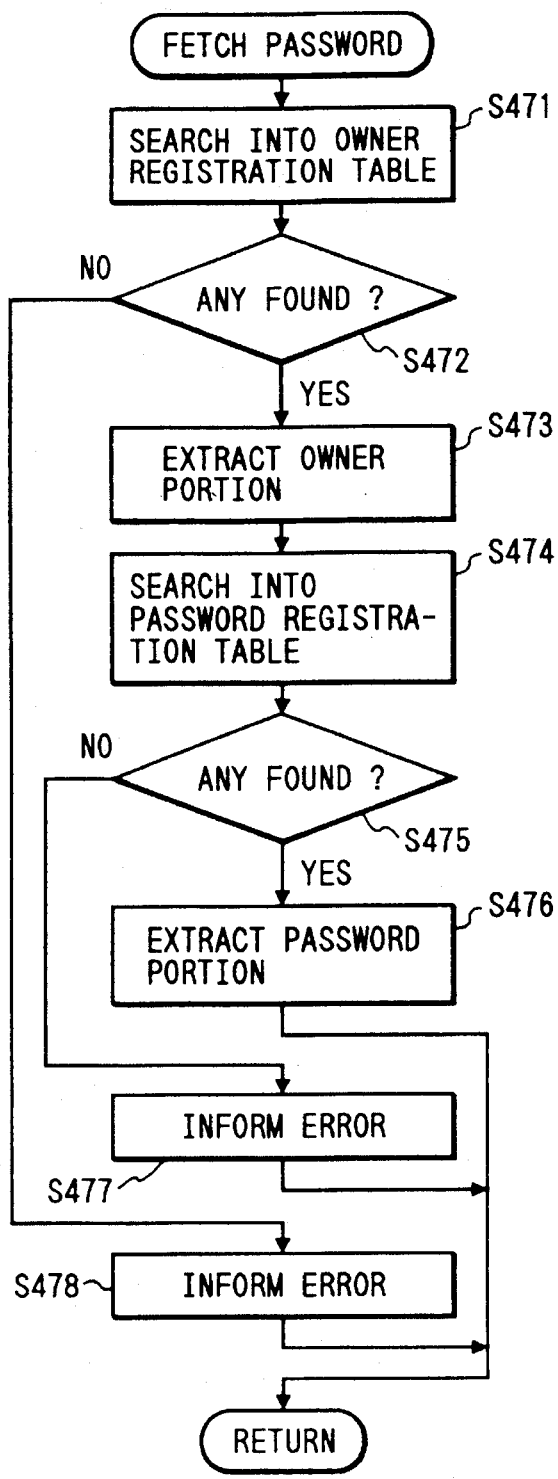
FIG. 47 is a flowchart for a password extraction process in the tenth example.

Note that the processing of the owner registration program at step S465 of FIG. 46 is the same as that of the password registration program at step S405 of FIG. 40, and can be explained by replacing the password 31 at step S405 with the owner name 310, and the password registration table 24 with the owner registration table 25. And this process is executed under the special authorization of the writing into the password registration table. Thus, the owner registration process has been described.

Next, the process of the password extraction program at step S466 of FIG. 46 will be described. Here, the password corresponding to the designated text element, i.e., the password 31, is fetched by referring to the owner registration table 25 and the password registration table 24. The processing flow will be described with reference to a flowchart of FIG. 47.

First, at step S471, the owner registration table 25 is searched with the input text element name 37 to obtain the item of corresponding owner name. If the item of interest is found at step S472, the processing goes to step S473, where an owner portion of the item is made the owner name 310. On the other hand, if the item of the text element name is not registered in the owner registration table 25, the processing goes to step S478, where the error is informed and the processing is terminated.

The processing proceeds to step S473 and then step S474, where the item corresponding to the owner name 310 is searched by referring to the password registration table 24. If the item of interest is found at step S475, the processing goes to step S476, where a password portion of the item is stored at the password 31. On the other hand, if the item of the owner name 310 is not registered at step S475, the processing goes to step S477, where the error is informed and the processing is terminated.

Note that this process is also executed under the special authorization of referring to the owner registration table 25 and the password registration table 24. FIG. 48 shows an example of the data configuration in the password registration table 24, and FIG. 49 shows an example of the data configuration in the owner registration table 25.

As will be clearly seen from these figures, the password is registered corresponding to the owner name in the password registration table, while the owner name is registered corresponding to the text element name in the owner registration table 25.

Figure 50:
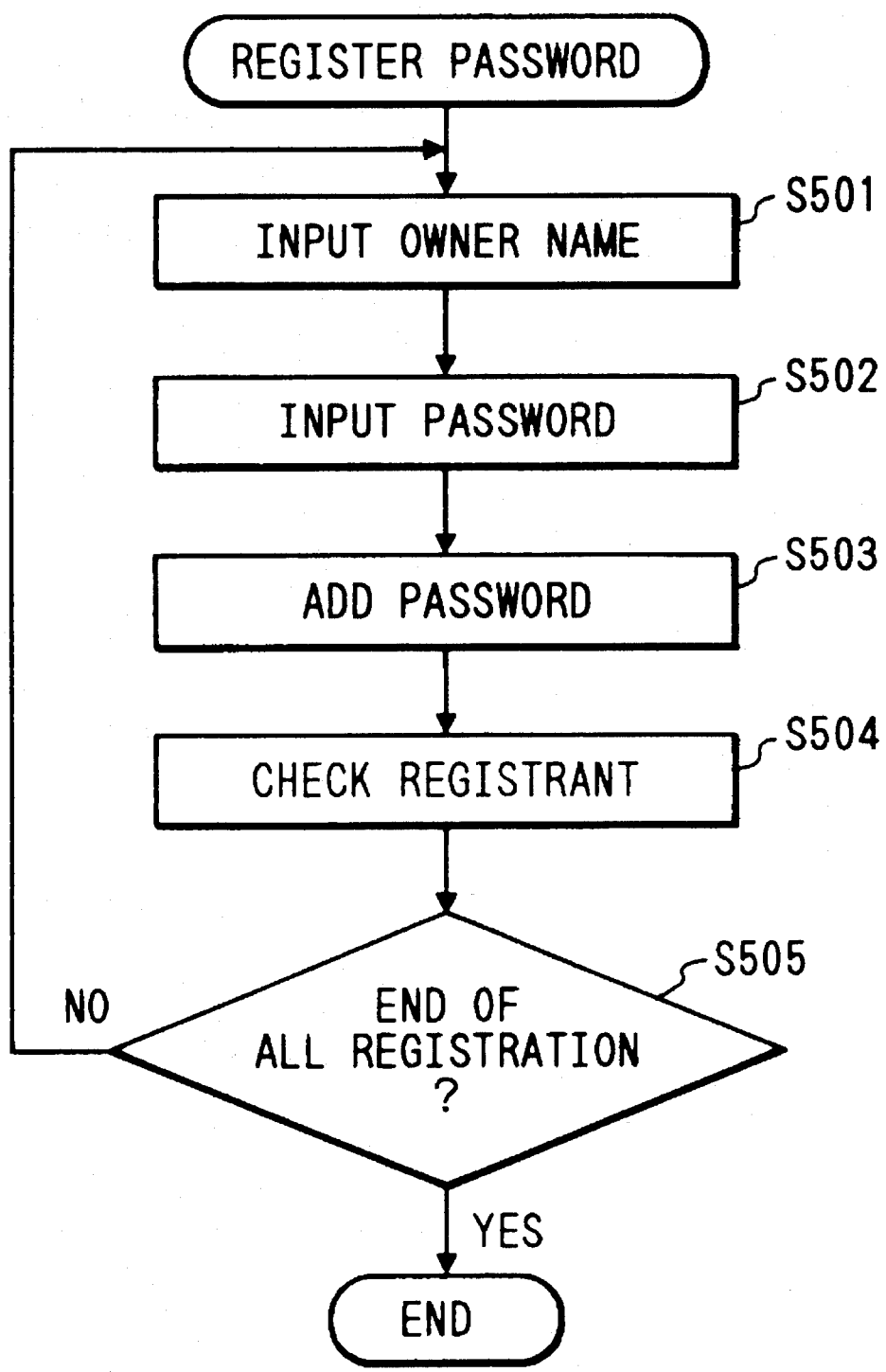
FIG. 50 is a flowchart for the password registration process in the tenth example.

Next, the password registration table 24 will be described with reference to a flowchart of FIG. 50 for the password registration process. It is supposed that the password registration table 24, each item consisting of a pair of the owner name and the password, has been registered by the password registration program, before the justification identification of the text as described heretofore.

First, at step S501, the owner name at the registration is input from the console 1, and stored in the owner name 310, and at step S502, the password is input from the console 1 and stored in the password 31. At step S503, the password 31 and the owner name 310 which are correspondent are added to the password registration table 24. Next, at step S504, a check is made to determine that all the owner names authorized as the owner have been registered, and if all the registrations have been ended at step S505, the process is terminated. Otherwise, the process of steps S501 to S505 is repeated. Thus, the password registration process is completed.

In the creation process for the text with the justification identification code appended in FIG. 46, like the ninth example as previously described, the code generation process of step S467 is performed after the steps S463 to S466, but it is also possible that the extracted character is encoded sequentially while the text element extraction process of step S463 is performed.

Finally, the flow of the justification identication process for the designated text element will be described. This example is basically the same as described in FIG. 5, and the password extraction which is a feature of this example will be described. This process is one in which the password corresponding to the text element name 37 is fetched by referring to the password registration table 24 and the owner registration table 25 by the password extraction program.

In this example, the owner name of the text is registered at the creation of the text, but it is also possible that the correspondence between the text element and the owner is given beforehand, and the justification identification code is set at the registration of the text.

As above described, with this example, by prestoring the password holding the justification of the text element in a storage area accessible from a specific program, it is possible to identify the justification of the text element only by designating the text element name without inputting the password. Therefore, the owner's trouble of inputting the password for each text element can be eliminated.

Along with it, unnecessary works due to the mistake of password input at the creation of the text or at the justification identification can be reduced.

Since the password input at the justification identification is unnecessary, it is possible for a third party not knowing the password, other than the text creator, to make the justification identification of the text. That is, with this method, the owner of the text is not necessarily involved in identifying the justification of the text content.

As above described, according to the ninth and tenth examples, there is the effect that in investigating that the text information including the text area created by a plurality of persons has been updated, it is possible to decide whether or not the content of each text area has been altered, even of the password for each person in charge is not input.

Eleventh example

In the previous examples, the justification identification code for each text element was generated in a combination of the password and each text element. In this example, the text element number is used, instead of the text element itself, as the information for the generation of the justification identification code.

Figure 51:
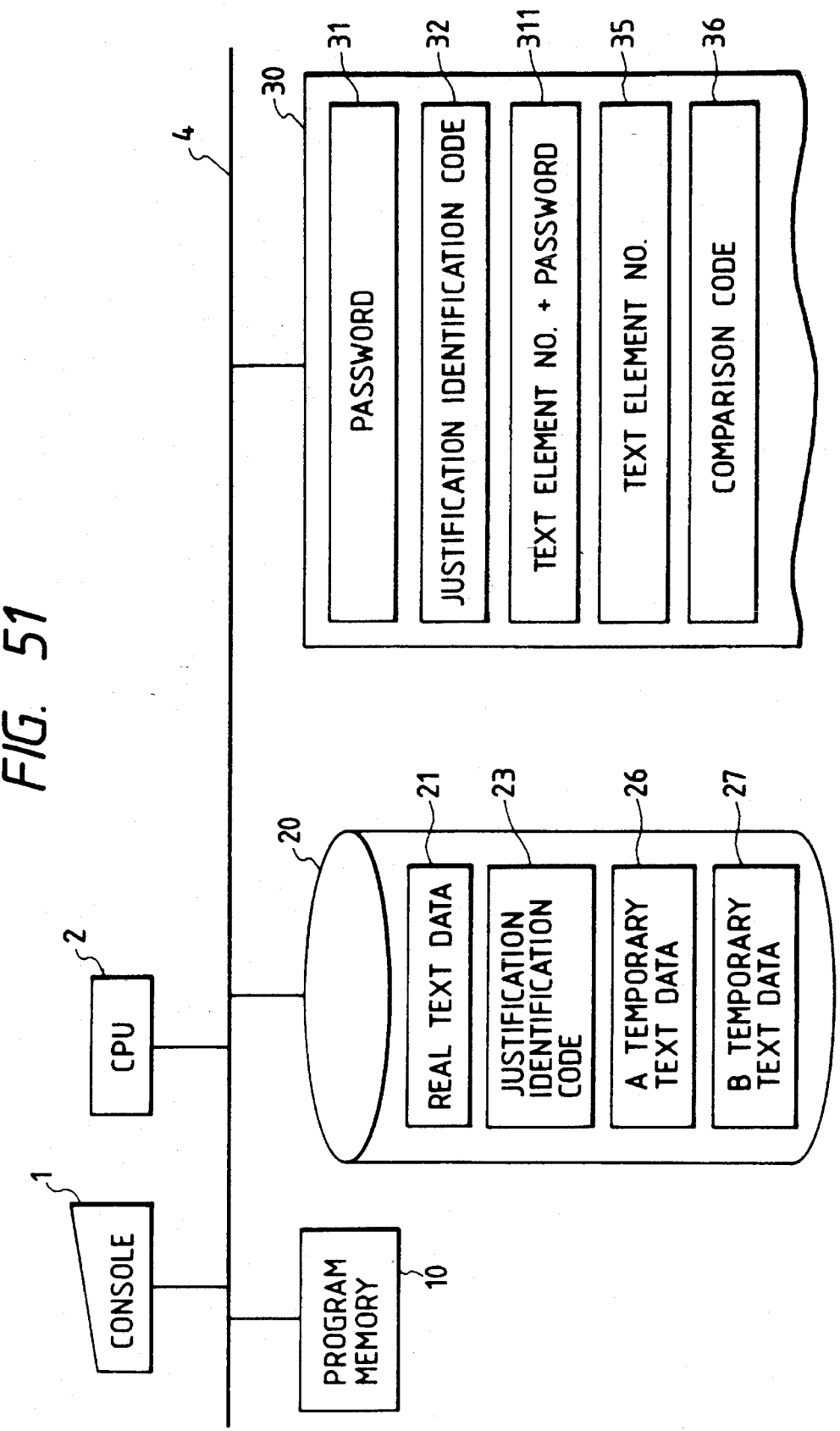
FIG. 51 is a system configuration diagram in the eleventh example.

FIG. 51 is a block diagram of a text processing apparatus in this example.

In the same figure, A temporary text data 26 and B temporary text data 27 are areas for temporarily storing the text element created for creators A and B to make the replacement with the text elements in the real text data 21. Also, text element number+password 31 is a series of character string formed by a concatenation of the text element number 35 and the password 31, and which is to be converted for the generation of the justification identification code in this example. In this example, other portions are the same as previously described, and thus the explanation will be omitted.

In such a configuration of this example, when a text composed of a plurality of text elements is created by a plurality of persons, the justification identification information is stored for each text element assigned to each person in charge. Thereby, a determination is made as to whether the access to each text element is authorized or not.

In the following, for the simplicity of the explanation, it is assumed that one text file is created by two persons in charge. And it is also assumed that the number of text elements and the number of persons in charge for the creation and modification are determined by the text manager.

The processing flow of this example will be described. The process is largely divided into two sections; a process for the correspondence between the justification identification code and the text element to permit the replacement for each text element, and a process for the correction and the replacement of the text portion while giving the replacement permission based on the justification identification code.

Figure 52:
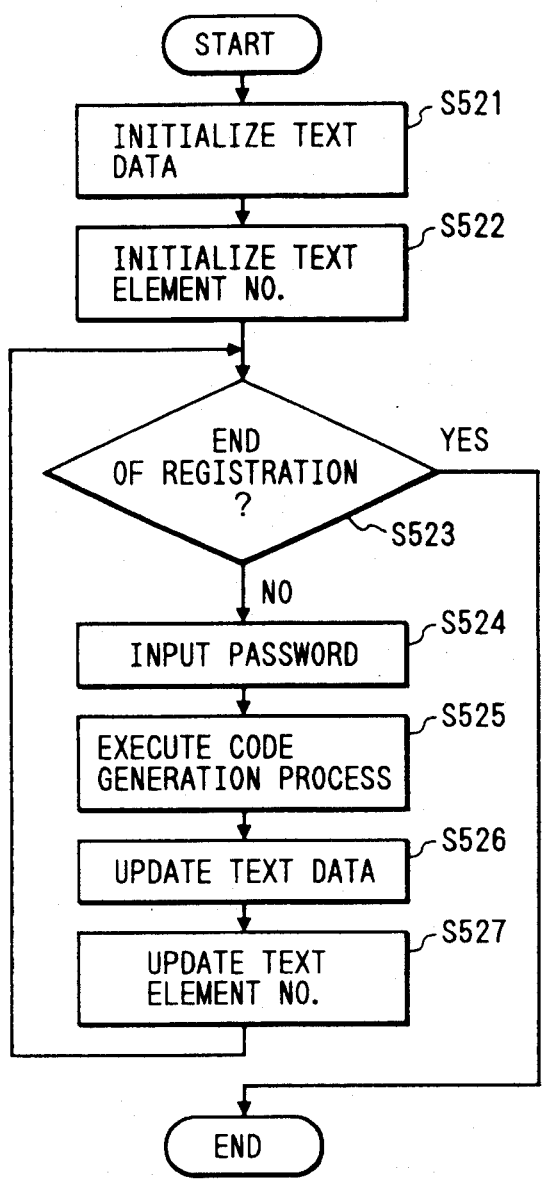
FIG. 52 is a flowchart for the correspondence process in the eleventh example.

FIG. 52 is a flowchart for showing the correspondence process for the justification identification code of the text element.

First, at step S521, the text data to be processed in the text processing system is initialized (when the text is newly created). Specifically, the text processing manager is first prompted for the input of the text name from the console 1. A file of the real text data 21 having a name of the input text name followed by an expander (.doc) is reserved in the data memory 20, and cleared. Also, the justification identification code 22 having a name of the input text name followed by an expander (.chk) is reserved, and cleared. Note that the storage areas for the real text data and the justification identification code are distinguished by the use of the expander, but it will be appreciated that the real text data and the justification identification code can be placed in different directories with the same file name.

Next, at step S522, an initial value "1" is stored in the text element number 35. At step S523, the text manager is prompted for the input of the end of registration via the console 1. If "y" is input, the registration is ended, or if other than "y" is input, the step S524 and followings are repeated.

At step S524, the password obtained by a password input program is stored in the password 31 of the memory 30. The password input program is an executable program of CPU 2, for example, a procedure of prompting the text creator to input the password via the console 1, and returning the input character string obtained there-from as the password. Then, if the first text element (the text element number is "1" at the initial value) is assigned to the text creator A, the text creator A inputs the password, while it is assigned to the text creator B, the text creator B inputs the password.

Figure 53:
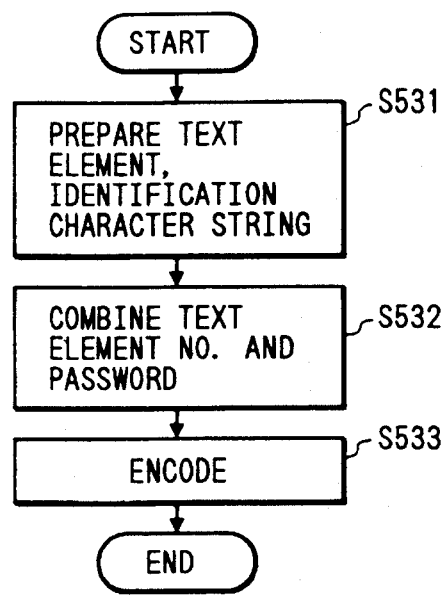
FIG. 53 is a flowchart for the code generation process in the eleventh example.

At step S525, the justification identification code is generated from the text element number at that time and the input password. This code generation process will be described with reference to FIG. 53.

First, at step S531, the identification character string for the text is prepared. If the content of the text element number 35 is a numerical value N, the numeral obtained by converting it to the character is an identification character string.

At step S532, the identification character string of the text element and the content of the password memory 31 are stored as a series of character string into the password 311 with the text element number appended.

Next, at step S533, the content of the password 311 with the text element number appended is encoded to generate the code.

This encoding is performed in the same procedure as previously described. The generated code is stored in the justification identification code of the memory 30 as the justification identification code.

Thus, the encoding process is completed.

Turning back to FIG. 52, the explanation will be continued.

At step S526, the text data is updated. Here, the punctuation symbol is added to the real text data file 21 reserved. For example, the line consisting of a character string of "<*code*>" is added. The character string stored in the justification identification code 32 is added, separated by the punctuation symbol of the justification identification code, to the justification identification code file 23. However, the symbol not contained in the generated code must be used so that the punctuation symbol may be distinguishable from the justification identification code within the justification identification code 32. For example, the encoding is made so that the line feed symbol may not appear in the code, and the line consisting only of the character string stored in the justification identification code 32 is added to the justification identification code file 22.

At step S527, the content of the text element number 35 is incremented by one, and returning to step S523, the allocation process of the real text data file for the second text creator is performed.

Thus, the real text data file 21 and the justification identification code file 22 are built up, in which these files are prohibited from the rewriting or erasing by other than the program of the text processing system (or a predetermined manager). However, the reading is freely permitted (the original password can not be detected owing to the encoding process, even if seeing the content). This can be implemented by the use of protection means of the file which is provided by the general operating system.

Thus, the initial text registration is completed (the text registration is made as an empty content text.)

Next, the operation of the system in which the person in charge for each text element updates (or creates) and registers a portion of the text in charge will be described.

After the initial registration of the text as above described, the following text update is performed, but the content of the memory 30 is typically broken, and must be cleared before the update operation.

The text creator A reads the real text data file 21, and creates its copy as the A temporary text data file 26, and stores it in the data memory 20. Likewise, the text creator B also read the real text data file 21, and stores its copy as the B temporary text data file 27.

The text creator A, in charge of the first text element, writes the text between the first "<*code*>" line and the second "<*code*>" line using the text editor and stores it in the A temporary text data file 26 again (restore).

Also, the text creator B, in charge of the second text element, writes the text between the second "<*code*>" line and the third "<*code*>" line using the text editor and stores it in the B temporary text data file 27 again.

In this way, each person in charge creates the text data assigned. Of course, it will be appreciated that the line of "<*code*>" can be input along with the text data, using the text editor, to create respective temporary text data file, without copying the real text data file 21.

In this way, the registration process of each created temporary text data as the real text data file 21 will be described with reference to a flowchart of FIG. 54. Note that such a process is started when the operator inputs an indication via the console 1.

First, at step S5401, the name of the real text data file 21 to be rewritten is input from the console 1. Note that if the input name does not exist as the real text data file in the data memory 20, an error message is displayed. Here, it is supposed that the names combined with the text data file 21 and the justification identification code file 22 are correctly input.

The processing goes to step S5402, where the name of created temporary text is input from the console 1. For example, the text creator A inputs the file name of A temporary text data file 26 created, and the text creator B inputs the file name of B temporary text data file 27 created.

At step S5403, the initial value "1" is stored in the text element number 35.

At step S5404, one line of character data (justification identification code) at the location corresponding to a value stored in the text element number 35 is read from the justification identification code file 23, and stored in the justification identification code 32. When the data to be read is exhausted (i.e., all the data have been read and the reading can not be made), the process returns to the main routine because it has been terminated at step S405. When the reading can be made, the process goes to step 5406.

At step S5406, the pasword input by the text creator is stored in the password 31.

At step S5407, the code is generated in the same process as at step S533 from the content of the current text element number 35 and the password 31. And it is stored in the comparison memory 36.

Next, at step S5408, the comparison is made between the content (character string) of the justification identification code 32 corresponding to the designated text element and the content (character string) of the justification comparison code memory 36.

At step S5409, if the comparison result of step S5408 is equal, the process goes to step S5410, while if not, the process goes to step S5411.

At step S5410, the region from a next line of corresponding "<*code*>" of the real text data file 21 to immediately before the line of the next "<*code*>" is cut, and replaced with the text data from the first line of corresponding "<*code*>" of the temporary text data file 26 having the previously input name to immediately before of the line of the next "<*code*>".

On the other hand, at step S5411 which is executed if unequal, the region from the line of current "<*code*>" of the real text data file 21 and the temporary text data file 26 to immediately before the line of the next "<*code*>" is simply read through, and no change is made.

Even if either of step S5401 and S5411 may be made, the process goes to step S5412, where the value within the text element number 35 is incremented by one, and then the process returns to step S5404. Note that in the first loop, when the text creator makes the above-described processing for the second text, but not the first text, of the real text data file, the process branches from step S5409 to step S5411. However, the decision at step S5409 is "YES" in the second loop, because the text element number is updated to "2" in the first loop, so that the temporary text created can be substituted for the second area (between the second "<*code*>" and the third "<*code*>") which is located at the correct position of the real text data file.

Thus, when the substitution of the temporary text file for the real text is completed in several loops, or a decision is made that the justification code sequentially created does not exist notwithstanding the retrieval process is carried out to the end because of the input of incorrect password, the decision at step S5405 is "YES", so that the process returns to the main routine.

In the above-described explanation, particularly at step S5410, the content of the real text data file 21 is replaced. However, it will be also appreciated that at step S5401, an empty temporary file is created, and at step S5410, the real text data file 21 is read through by the amount of one text element, and one text element of the temporary text data file 26 is added to the temporary file; on the other hand, at step S5411, one text element of the real text data file 21 is added to the temporary file, and the temporary text data file 23 is read through by the amount of one text element; and if a decision is made that there is no object at step S5405, the real text data file 21 is erased before the processing is terminated, and the name of the temporary file is changed by the name of the real text data, and dealt with in the equivalent way to the real text data file 21.

Twelfth example

In this example, the generation method for the justification identification code is the same as in the eleventh example as above described, but the password input for the replacement is performed only once at the first time, without performing it for each text element.

Therefore, at the generation of the justification identification code and its registration, the person in charge of text element inputs the same password to all the text elements assigned.

The replacement process of text element in this example will be described with reference to a flowchart of FIG. 55. As shown in the figure, in this example, the password input process at step S5406 located within a loop of steps S5404 to S5412 in FIG. 54 is not performed at that position, but performed before entering the loop.

Figure 54:
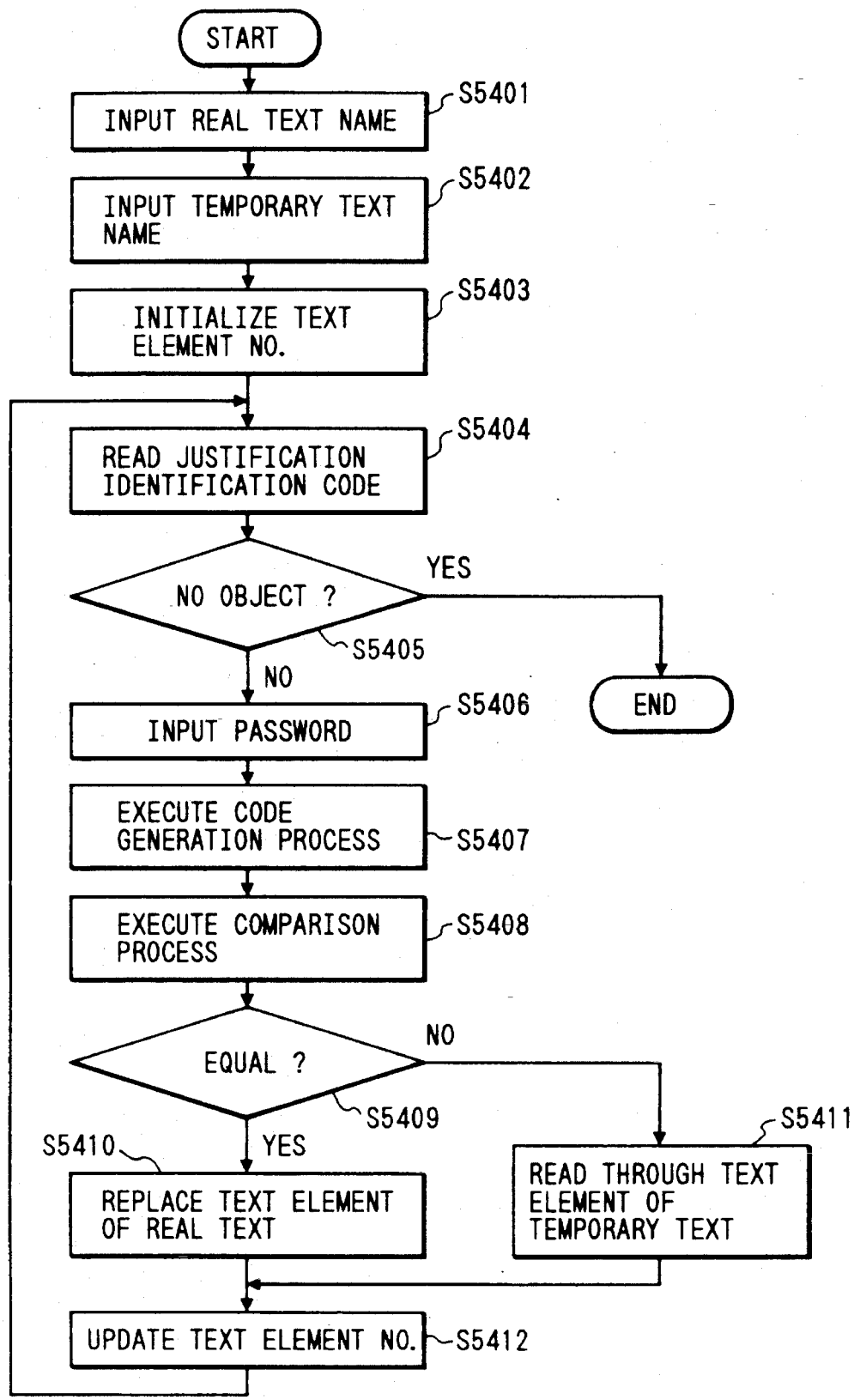
FIG. 54 is a flowchart for the document registration process in the eleventh example.
Figure 55:
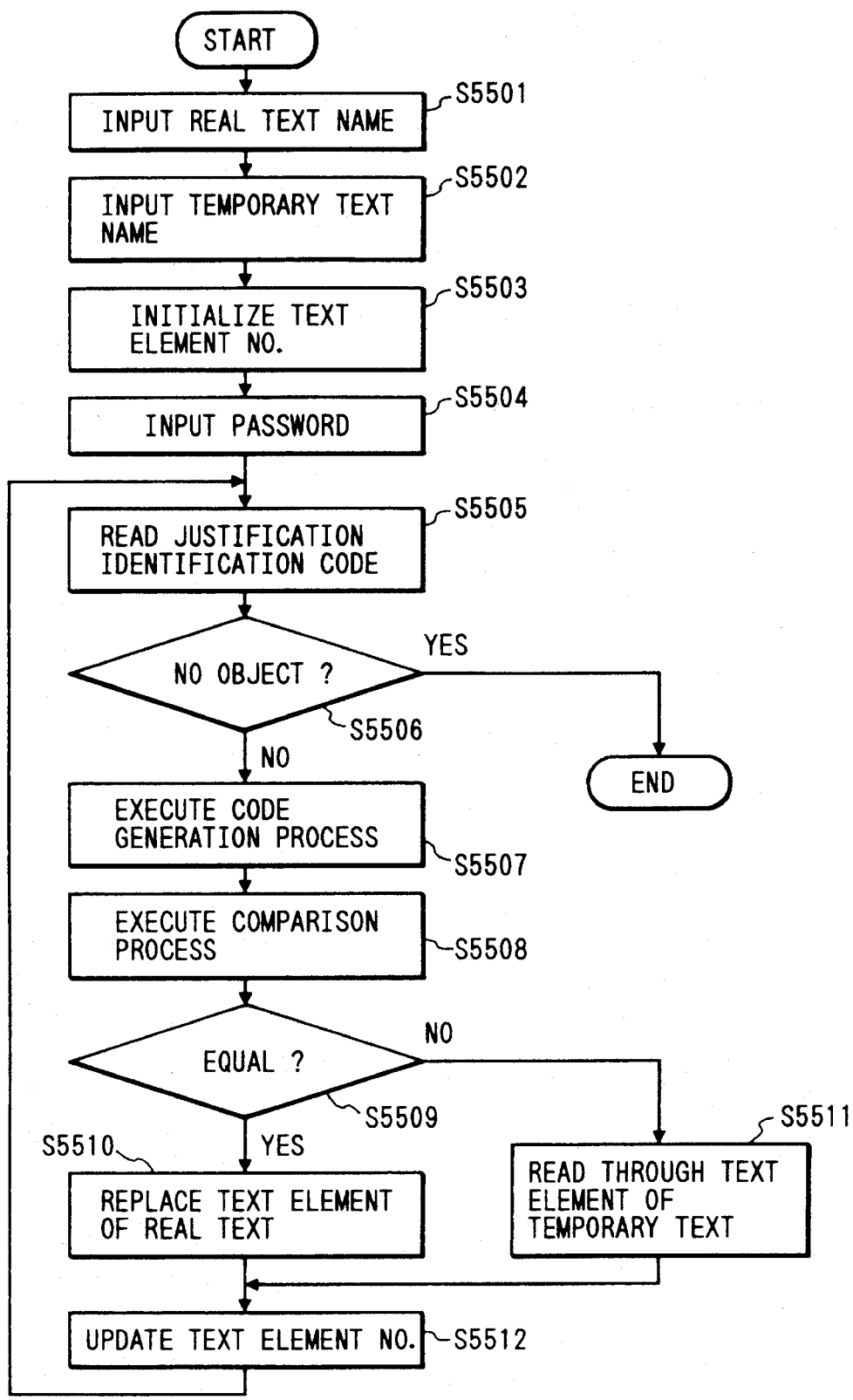
FIG. 55 is a flowchart for a document element replacement process in the twelfth example.

Note that the specific processing of each step is not different essentially from FIG. 54, and the explanation is omitted.

As shown in the figure, the trouble of inputting the password in the loop between steps S5505 to S5512 is eliminated, whereby it is unnecessary to make the response of password input for portions in charge of other persons to be read through, so that there is the effect that if a series of inputs are made at the first time, the collective processing is allowed thereafter.

Thirteenth example

Figure 56:
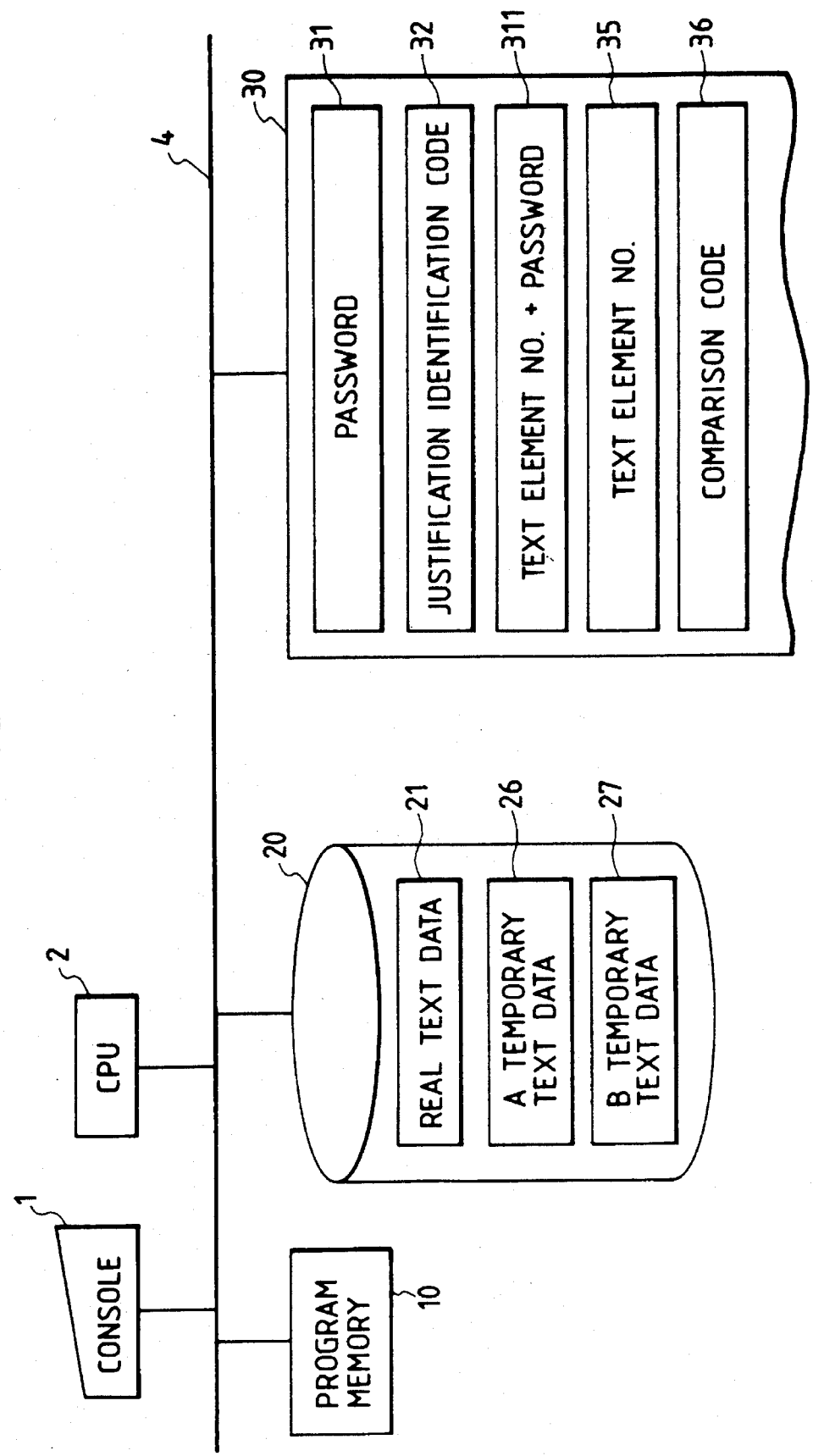
FIG. 56 is a system configuration diagram in the thirteenth example.

FIG. 56 shows a block configuration diagram of an apparatus in the thirteenth example. A different point from the eleventh and twelfth examples is that the justification identification code file 22 is not separately registered, but the justification identification code is provided on the real text data.

Figure 57:
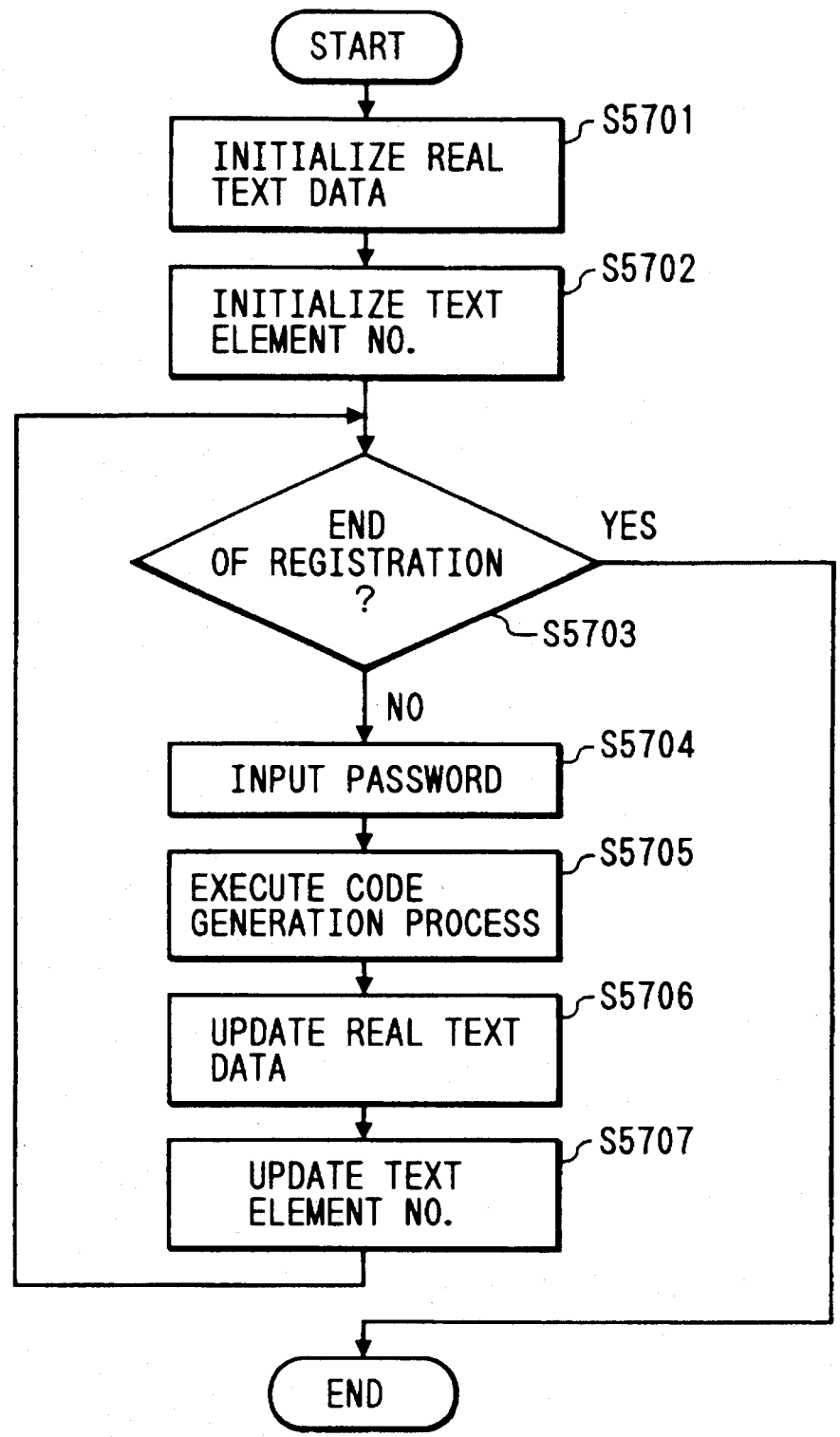
FIG. 57 is a flowchart for a justification identification code registration process in the thirteenth example.

The registration process of the justification identification code will be described with reference to a flowchart of FIG. 57. This process is essentially the same as the eleventh example, with the exception of steps S5701 and S5706.

In the initialization of the real text data file 21 at step S5701, the text creator is prompted for the input of the text name via the console 1. And the real text data file 21 having the input name is created. Note that the content thereof is naturally made empty.

The processing from steps S5702 to S5705 is the same as at steps S5202 to S5205.

At step S5706, the real text data file 21 is updated. In the eleventh example, the line consisting only of "<*code*>" is added, but in this example, the line consisting of a concatenation of a character string "<*code*>" and the content of the justification identification code 32 is added.

Turning back to step S5703 through step S5707, the above processing is repeated.

Figure 58:
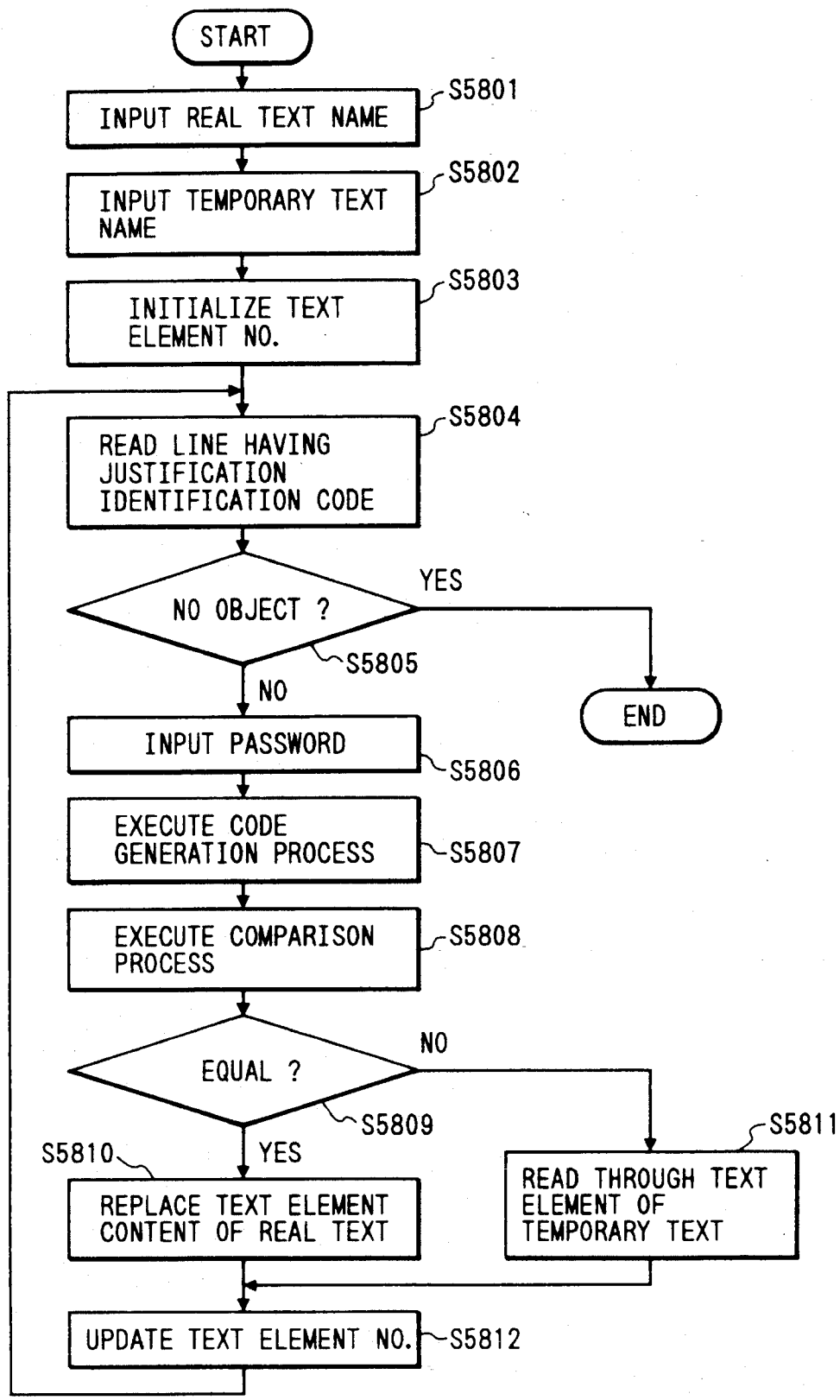
FIG. 58 is a flowchart for the document element replacement process in the thirteenth example.

Next, the replacement process of the text element in this example will be described with reference to a flowchart of FIG. 58. This process is essentially the same as the eleventh example, with the exception of steps S5804 and S5810.

Other steps, that is, steps S5801 to S5803, steps S5805 to S5809, and step S5811, are the same as steps S5201 to S5203, steps S5205 to S5209, and step S5211, respectively, and the explanation thereof is omitted.

At step S5804, one line from the real text data file 21 is read. And the first "<*code*>" is deleted, and the remaining character string portion is stored in the justification identification code 32. Up to step 5810, the same processing as in the eleventh example is performed. If the comparison code 36 generated from the currently input password and the text element identification information (text element number) and the justification identification code 32 are equal ate step S5809, the content of one text element of the real text data file 21 is replaced with the content of one text element read from the temporary text data file 26 at step S5810.

Here, the line starting with "<*code*>" in the real text data file 21 is not replaced. Even if the character string considered as the justification identification code may be written in the line starting with "<*code*>" in the temporary text data file 26, it is ignored.

With the above configuration, there is the effect that the registered text only needs one file, so that the management becomes easy. Further, it is unnecessary to distinguish between the real text data and the justification identification code by the use of the expander, so that the name can be unified without restriction in giving the name.

Fourteenth example

In the previous examples, the text element is separated from each other by the line starting with "<*code*>". In the fourteenth example, the text element is separated using a start tag with the text element name enclosed by "<" and ">" and an end tag with the text element name enclosed by "</" and ">", as shown in FIG. 9A. Each text element has its content enclosed by the start tag and the end tag.

Figure 59:
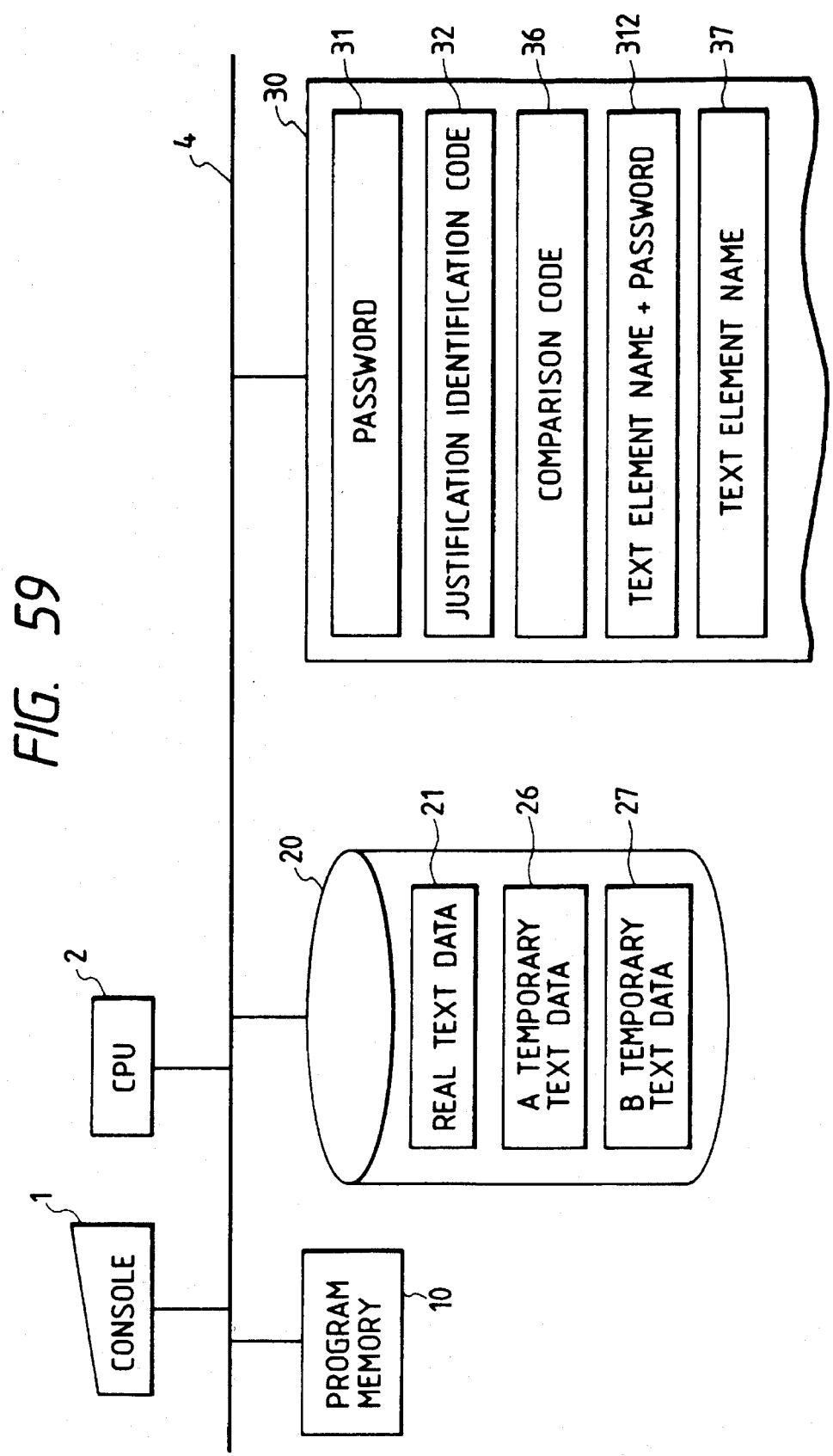
FIG. 59 is a system configuration diagram in the fourteenth example.

FIG. 59 shows a block configuration diagram of an apparatus in the fourteenth example. It is different from the eleventh example in that the text element name 37 is provided instead of the text element number 35, and the text element name+password 312 is provided instead of the text element number+password 311.

This example uses the text element name, instead of the text element number in the thirteenth example 13. The justification identification code is generated from the text element name and the password, and when replacing the text element, the replacement for correction is determined, depending on whether the comparison code generated from the input password and the text element name is equal to the registered justification identification code.

Figure 60:
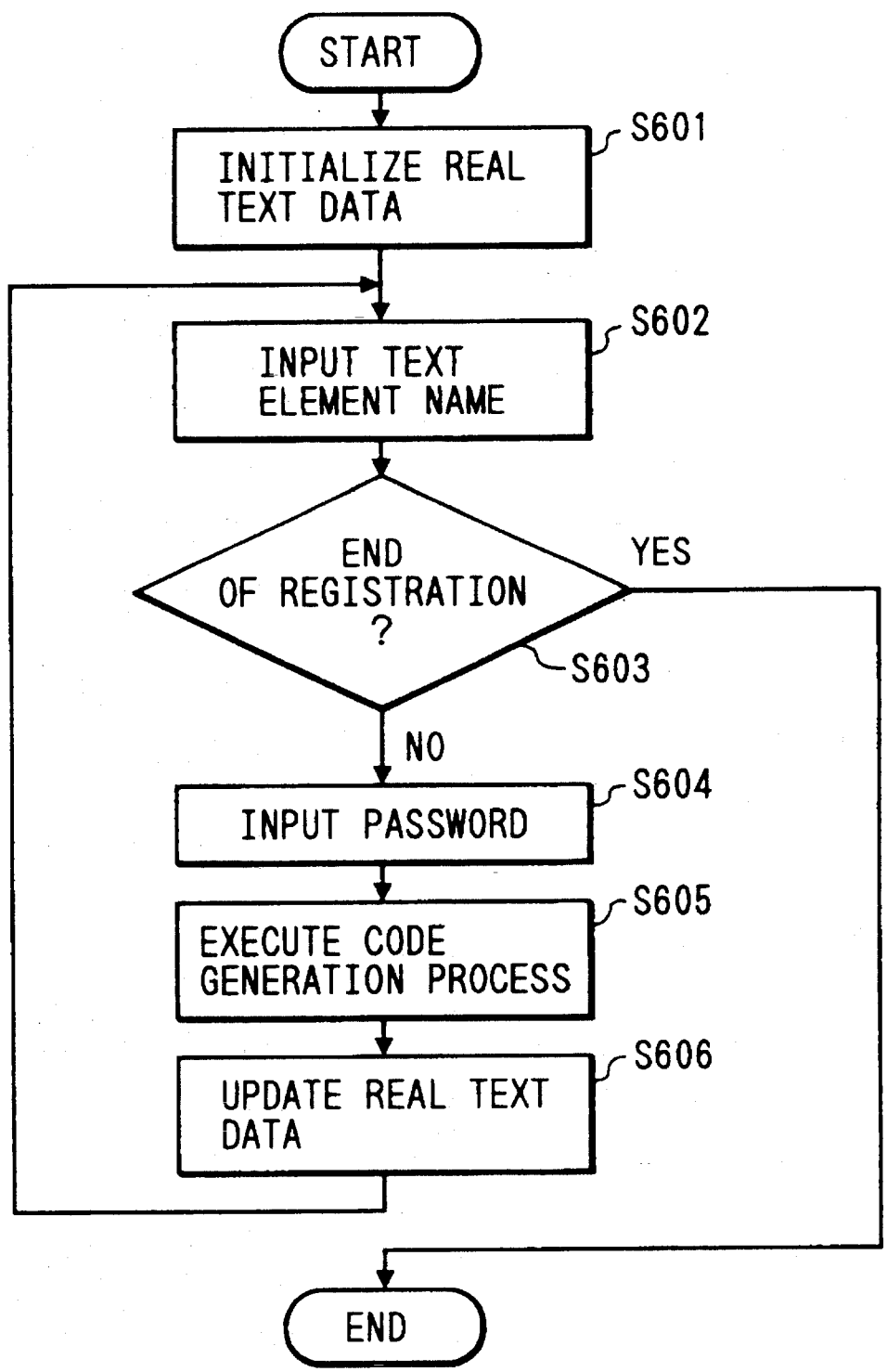
FIG. 60 is a flowchart for the justification identification code registration process in the fourteenth example.

Next, the registering method for the justification identification code will be described with reference to a flowchart of FIG. 60.

First, at step S601, the text creator is prompted for the input of text name via the console 1. And a real text data file 21 is reserved with the input text name as a file name, and made empty.

At step S602, the text creator is prompted for the input of text element name via the console 1. And the input text element name is stored in the text element name 37. If the null character is input, the registration is terminated at step S603, and thus the process is terminated. If the text element name is input, the process goes to step S604.

At step S604, the text creator is prompted for the input of password via the console 1, and the input password is stored in the password 31. Here, the person in charge of the text element having the text element name input at step S602 inputs the password for each text element assigned.

At step S605, the justification identification code is generated from the text element name and the password. The character string consisting of a concatenation of the content of the text element name 37 and the content of the password 31 is stored in the text element name+password 312. And the content of text element name+password 312 is encoded, and stored in the justification identification code 32 as the justification identification code.

Next, at step S606, a cahracter "<" is added to the real text data file 21, and subsequently, the content of the text element name 37, a blank character, and the content of the justification identification code 32 are added Then, three characters ">", "<" and "/", and the content of the text element name 312 are sequentially added, and finally a character ">" followed by the line feed symbol is added.

For example, when the text element name is "a", and the justification identification code "xxx", "<a xxx></a>" is added to the real text data file 21.

And returning to step S602, the above processing is repeated.

On the other hand, the temporary text data is created in the same way as in the previous examples, using the text editor, but the text element is enclosed by the start tag and the end tag to represent it, instead of separating the text element by the use of the start tag and the end tag.

Figure 61:
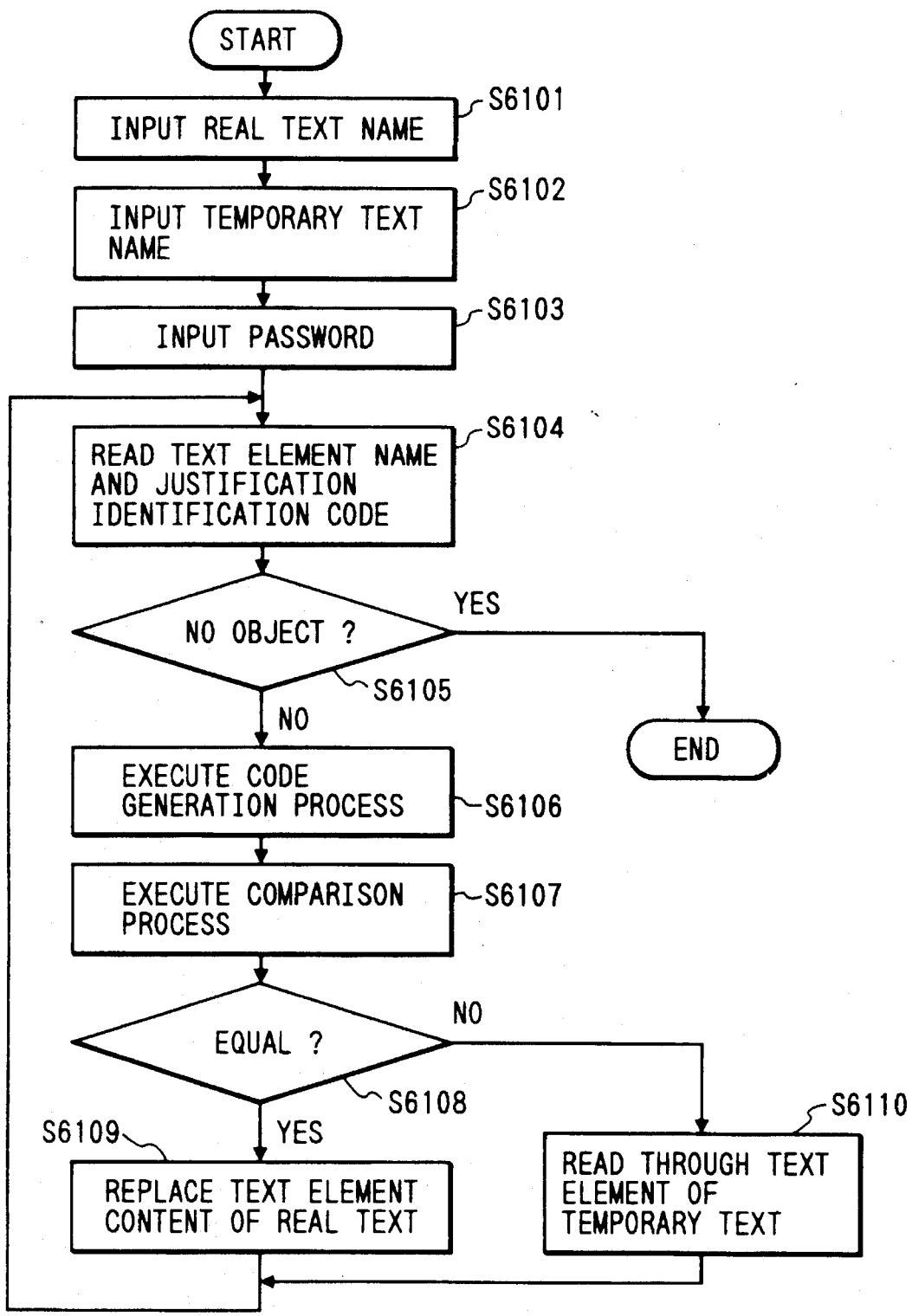
FIG. 61 is a flowchart for the document registration process in the fourteenth example.

The process (means) for registering the temporary text data thus created as the real text data will be described with reference to a flowchart of FIG. 61.

To begin with, at step S6101, the file name of the real text data file 21 to be rewritten is input from the console 1. Next, at step S6102, the text creator A inputs the file name of the A temporary text data file 26, and the text creator B inputs the file name of the B temporary text data file 27.

At step S6106, the password is input. The input password is stored in the password 31.

At step S6104, the start tag from the real text data file 21 is read. This can be accomplished by reading through characters until the character "<" appears, and then reading the area from the character "<" to ">". And the character string from the character following "<" to immediately before the blank is stored in the text element name 37. Also, the character string from the next character of the blank to immediately before the character ">" is stored in the justification identification code 32.

When the start tag is not read, the contents of the text element name 37 and the justification identification code 32 are made empty.

Next, at step S6105, a determination is made whether the start tag is read or not, and if it is read, the process goes to step S6106. If there is no object to be read, the process is terminated. Note that this determination can be made depending on whether the text element name 37 is empty.

If the process goes to step S6106, the character string consisting of a concatenation of the content of the text element name 37 and the content of the password 31 is stored in the text element name+ password 312. Subsequently, the content of the text element name+password memory 312 is encoded, and its generated character string is stored in the comparison code 36.

And at step S6107, the comparison of the character string is made between the content of the justification identification code 32 and the content of the comparison code 36, as a result of the comparison, if they are equal, the process goes from step S6108 to step S6109, or conversely if they are unequal, the process goes to step S6110.

At step S6109 (i.e., the comparision result is equal), the characters from the current read position of the real text data file 21 to immediately before the next "<", are deleted, while the content of a portion enclosed by the start tag and the end tag in the temporary text data file 26 is copied, and inserted into the deleted portion. And the end tag of the real text data file 21 is read through.

On the other hand, at step S6110 (i.e., the comparison result is unequal), the real text data file 21 is read through until the end tag is read, while the temporary text data file 26 is also read through by the amount of one text element from the start tag through the content of the text to the end tag.

Returning to step S6104, the above process is repeated.

With the above configuration, since the text element can be distinguished by the use of the name, rather than the description position of the text element, there is the effect that each person in charge can detect the assigned portion readily even if the text element number may be altered in the editing.

Note that in the above examples, the justification identification code is placed in the start tag, but can be placed in the end tag.

In the above example, the text elements other than assigned are also contained in the temporary text data. However, in the flow of each example, if the justification identification code and the justification comparison code are unequal, the temporary text data is read through by the amount of one text element, but instead, it will be appreciated that the text element of the temporary text data is read only if the justification identification code and the justification comparison code are equal, which text element is substituted for the content of corresponding text element of the real text data.

By doing so, each person in charge only needs to write the assigned text element into the temporary text data file, and the management is facilitated.

As above described, with the eleventh to fourteenth examples, the justification identification code generated from the identification information of the text element and the password is registered in correspondence to each partial text (text element) constituting the text, and when the text is corrected, the password is input again, and the comparison code is generated from that password and the text element identification information in the same way, whereby the permission for the replacement can be determined for each text element, depending on the comparison result. That is, since the whole of the text created by a plurality of persons in charge can be dealt with in a unity, and each person in charge is given the permission for the replacement, there is the effect that it is assured that the alteration for other than permitted portions is not made.

Note that the present invention may be adapted to the system constituted of one or more devices. Also, it is adapted to the system to which the program is supplied.

In the above examples, the data to be determined as to whether the content is altered is the text dada, but the program data may be dealt with. That is, the present invention is applicable to the justification identification for the program source.

What is claimed is:

1. A method for determining whether or not an improper rewrite of stored data in a file comprising a plurality of blocks of data has been made for each block of data other than by the writer of that block of data, comprising the steps of:

(A) in storing the data:

designating a block of data;

inputting a password;

generating a first code by converting a combination of the input password and the designated block of data in a pre-determined procedure; and storing said first code in correspondence to the designated block of data;

(B) in reading the stored data:

designating the block of data;

inputting the password;

generating a second code by converting a combination of the input password and the designated block of data in said predetermined procedure;

comparing the generated second code and the first code stored in correspondence to said designated block of data; and determining that an improper rewrite of said designated block of data has been made, if the comparison result is unequal.

2. The method according to claim 1, wherein said data comprises a text.

3. The method according to claim 1, wherein said data comprises a program.

4. The method according to claim 1, wherein the block of data is separated by punctuation information.

5. The method according to claim 1, wherein said first code is stored in the same file as a blocked data corresponding to said code so as to be distinguishable.

6. The method according to claim 4, wherein the punctuation information belongs to each block of data, and said first code is stored by being included in the punctuation information belonging to a block of data corresponding to said first code.

7. The method according to claim 4, wherein said punctuation information includes attribute information of each block of data to be converted upon generation of said first and second codes.

8. The method according to claim 1, wherein the designation of said block of data is made by designating positional information of said block of data in the whole body of data.

9. The method according to claim 1, wherein each block of data is given a name, and the designation of the block of data is made using the name of the block of data.

10. The method according to claim 9, wherein said first code is stored in a file having a file name which is a name of a block of data corresponding to said code followed by an expander.

11. The method according to claim 9, wherein said block of data is separated by punctuation information, and the name of said block of data is included in the punctuation information.

12. A method for determining whether or not an improper rewrite of stored data in a file comprising a plurality of blocks of data, written by a plurality of persons, has been made for each block of data, by a person other than the writer of the block of data, and performing a processing in accordance with a result of that determination, comprising the steps of:

(A) in storing each block of data;

inputting a password for each block of data;

generating first codes by converting combination of each input password and each block of data in a predetermined procedure; and storing the first codes in correspondence to the block of data;

(B) in processing the stored data;

inputting the password for each designated block;

generating a second code by converting a combination of the designated block of data and the input password therefor in said predetermined procedure;

comparing the generated second code and one of the first codes stored in correspondence to the designated block of data; and including the designated block of data in a subject of processing if and only if a result of the comparison is equal.

13. The method according to claim 12, wherein the password comprises information corresponding to the user.

14. The method according to claim 12, wherein the data comprises a text.

15. The method according to claim 12, wherein the data comprises a program.

16. The method according to claim 12, further comprising the step of executing a second process different from a process to be executed when the comparison result is equal for a block of data for which the comparison is unequal.

17. A method for determining whether or not an improper rewrite of stored data in a file comprising a plurality of blocks of data written by a plurality of persons has been made for each block of data by a person except for the writer thereof, comprising the steps of:

(A) in storing the data:

designating a block of data;

inputting and registering a password for the designated block;

generating a first code by converting a combination of the input password and the designated block of data in a predetermined procedure; and storing said first code in correspondence to the designated block of data;

(B) in reading the stored data:

designating the block of data;

generating a second code by converting a combination of the designated block of data and the password registered therefor in said predetermined procedure;

comparing the generated second code and the first code stored in correspondence to said designated block of data; and determining that the improper rewrite of said designated block of data has been made if the comparison result is equal.

18. The method according to claim 17, wherein the data comprises a text.

19. The method according to claim 17, wherein the data comprises a program.

20. The method according to claim 17, wherein the password is registered in correspondence to each block of data.

21. The method according to claim 17, wherein the passwords are registered in correspondence to each other.

22. A method for preventing an improper rewrite of stored data in a file comprising a file name and a plurality of blocks of data written by a plurality of persons has been made for each block of data by a person except for the writer thereof, comprising the steps of:

(A) in storing each block of data:

inputting a password for each block of data;

generating first codes by converting combinations of each input password and a corresponding block of data in a predetermined procedure, respectively; and storing said first codes in correspondence to their respective blocks of data;

(B) in rewriting a block of data in the file:

reading out the file with a file name;

designating the block of data;

inputting the password for the designated block;

generating a second code by converting a combination of the designated block of data and the input password therefor in said predetermined procedure;

comparing the generated second code and the first code stored in correspondence to said designated block of data; and prohibiting a rewrite of the designated block if the comparison result if unequal.

23. The method according to claim 22, wherein the data comprises a text.

24. The method according to claim 22, wherein the data comprises program.

25. The method according to claim 22, wherein the identification information comprises positional information of each block of data.

26. The method according to claim 22, wherein the identification information comprises a name of each block of data.

* * * * *

UNITED STATES PATENT AND TRADEMARK OFFICE
CERTIFICATE OF CORRECTION

PATENT NO. : 5,455,941

DATED : October 3, 1995

INVENTOR(S) : YASUHIRO OKUNO, ET AL.

It is certified that error appears in the above-indentified patent and that said Letters Patent is hereby corrected as shown below:

On title page, item [54] Title should read --SYSTEM FOR DETECTING IMPROPER REWRITES OF DATA USING SEPARATE READER/WRITER PASSWORDS--.

COLUMN 1:

Line 2, "SYSTEM FOR" should be deleted.

Line 3, "READER WRITER" should read --READER/WRITER--.

COLUMN 3:

Line 19, "1 which forms" should read --which form--.

Line 20, "example," should read --examples,--.

Line 21, "an" should read --are--.

COLUMN 5:

Line 53, "an" should read --a--.

UNITED STATES PATENT AND TRADEMARK OFFICE
CERTIFICATE OF CORRECTION

PATENT NO. : 5,455,941
DATED : October 3, 1995
INVENTOR(S) : YASUHIRO OKUNO, ET AL.

It is certified that error appears in the above-indentified patent and that said Letters Patent is hereby corrected as shown below:

COLUMN 6:

Line 51, "string" should read --strings--.

Line 56, "unix," should read --UNIX,--.

COLUMN 7:

Line 5, "for fill" should read --for filling--.

Line 45, "test" should read --text--.

COLUMN 8:

Line 67, "inhibited" should read --prohibited--.

COLUMN 10:

Line 49, "inhibited" should read --prohibited--.

Line 50, "of" should be deleted.

COLUMN 21:

Line 49, "an" should read --a--.

UNITED STATES PATENT AND TRADEMARK OFFICE
CERTIFICATE OF CORRECTION

PATENT NO. : 5,455,941            Page 3 of 7
DATED : October 3, 1995
INVENTOR(S) : YASUHIRO OKUNO, ET AL.

It is certified that error appears in the above-indentified patent and that said Letters Patent is hereby corrected as shown below:

COLUMN 22:

Line 39, "determined" should read --determine--.

COLUMN 23:

Line 4, "Justification" should read --justification--.

Line 7, "us" should read --is--.

COLUMN 26:

Line 65, "string" should read --strings--.

COLUMN 27:

Line 51, "there-from" should read --therefrom--.

COLUMN 31:

Line 31, "ate" should read --at--.

Line 49, "element is" should read --elements are--.

UNITED STATES PATENT AND TRADEMARK OFFICE
CERTIFICATE OF CORRECTION

PATENT NO. : 5,455,941
DATED : October 3, 1995
INVENTOR(S) : YASUHIRO OKUNO, ET AL.

It is certified that error appears in the above-indentified patent and that said Letters Patent is hereby corrected as shown below:

COLUMN 32:

Line 30, "cahracter" should read --character--.

COLUMN 34:

Line 13, "dada" should read --data--.

Line 23, "storing the data;" should read --storage of the data by the writer;--.

Line 25, "password;" should read --first password--;

Line 27, "password" should read --first password--.

Line 32, "the stored data;" should read --of the stored data by the writer;--

Line 34, "the" should read --a second--.

Line 37, "input: should read --input second--.

Line 43, "made," should read --made other than by the writer of that block of data,--.

UNITED STATES PATENT AND TRADEMARK OFFICE
CERTIFICATE OF CORRECTION

PATENT NO. : 5,455,941
DATED : October 3, 1995
INVENTOR(S) : YASUHIRO OKUNO, ET AL.

It is certified that error appears in the above-indentified patent and that said Letters Patent is hereby corrected as shown below:

COLUMN 35:

Line 13, "data, written by" should read --data, each of the blocks having been written by a respective writer from among--.

Line 18, "storing" should read --storage of--; and "data;" should read --data by respective writers;--.

Line 19, "a password" should read --respective first passwords--.

Line 21, "password" should read --first password--.

Line 24, "to the block" should read --to each of the blocks--.

Line 26, "processing" should read --processing of--; and "data" should read --data by respective writers--.

Line 27, "the password" should read --respective second passwords--.

Line 29, "the input password" should read --one of the input second passwords--.

Line 50, "persons" should read --writers--.

Line 53, "storing the data:" should read --storage of the data by one of the plurality of writers:--.

UNITED STATES PATENT AND TRADEMARK OFFICE
CERTIFICATE OF CORRECTION

PATENT NO. : 5,455,941
DATED : October 3, 1995
INVENTOR(S) : YASUHIRO OKUNO, ET AL.

It is certified that error appears in the above-indentified patent and that said Letters Patent is hereby corrected as shown below:

COLUMN 35:

Line 54, "data;" should read --data written by the one of the plurality of writers;--.

COLUMN 36:

Line 3, "reading" should read --reading of--; and "data:" should read --data by one of the plurality of writers:--.

Line 4, "data;" should read --data written by that one of the plurality of writers;--.

Line 12, "made if" should read --made by a person other than the writer of the designated block, if--.

Line 13, "equal." should read --unequal.--.

Line 25, "persons" should read --writers--.

Line 28, "storing" should read --storage of--; and "data:" should read --data by respective writers:--.

Line 29, "a password" should read --respective first passwords--.

Line 32, "input password" should read --one of the input first passwords--.

UNITED STATES PATENT AND TRADEMARK OFFICE
CERTIFICATE OF CORRECTION

PATENT NO. : 5,455,941
DATED : October 3, 1995
INVENTOR(S) : YASUHIRO OKUNO, ET AL.

It is certified that error appears in the above-indentified patent and that said Letters Patent is hereby corrected as shown below:

COLUMN 36:

Line 36, "file:" should read --file by one of the plurality of writers:--.

line 38, "the: should read --a--.

Line 39, "the password" should read --a respective second password--.

Line 41, "password" should read --second password--.

Line 47, "if" should read --is--;

Line 51, "program" should read --a program--.

Signed and Sealed this

Nineteenth Day of March, 1996

Attest:

BRUCE LEHMAN

Attesting Officer    Commissioner of Patents and Trademarks